(12) United States Patent
Gotardo et al.

(10) Patent No.: US 8,280,136 B2
(45) Date of Patent: Oct. 2, 2012

(54) METHOD AND APPARATUS FOR DETECTING INTRAVENTRICULAR DYSSYNCHRONY

(75) Inventors: Paulo F. U. Gotardo, Columbus, OH (US); Kim L. Boyer, Columbus, OH (US); Subha V. Raman, Columbus, OH (US)

(73) Assignee: The Ohio State University, Columbus, OH (US)

( * ) Notice: Subject to any disclaimer, the term of this patent is extended or adjusted under 35 U.S.C. 154(b) by 1154 days.

(21) Appl. No.: 12/067,093

(22) PCT Filed: Sep. 18, 2006

(86) PCT No.: PCT/US2006/036385
§ 371 (c)(1),
(2), (4) Date: Mar. 17, 2008

(87) PCT Pub. No.: WO2007/035688
PCT Pub. Date: Mar. 29, 2007

(65) Prior Publication Data
US 2008/0260230 A1    Oct. 23, 2008

Related U.S. Application Data

(60) Provisional application No. 60/718,115, filed on Sep. 16, 2005, provisional application No. 60/728,958, filed on Oct. 21, 2005, provisional application No. 60/744,058, filed on Mar. 31, 2006, provisional application No. 60/744,056, filed on Mar. 31, 2006.

(51) Int. Cl.
*G06K 9/00* (2006.01)
*A61B 6/00* (2006.01)

(52) U.S. Cl. .................................. 382/131; 378/4; 378/8

(58) Field of Classification Search .................. 382/128, 382/131; 378/8
See application file for complete search history.

(56) References Cited

U.S. PATENT DOCUMENTS
4,573,197 A * 2/1986 Crimmins ..................... 382/197
(Continued)

FOREIGN PATENT DOCUMENTS
EP          1102199 A2      5/2001
(Continued)

OTHER PUBLICATIONS

Huang et al., A content-based image retrieval system, Image and Computing, vol. 16, 1998, pp. 149-163.*

(Continued)

*Primary Examiner* — Alexander H Taningco
(74) *Attorney, Agent, or Firm* — Calfee, Halter & Griswold, LLP

(57) ABSTRACT

A method and apparatus for detecting intraventricular dyssynchrony is provided. In one embodiment, the method includes: a) receiving information from an observer viewing a source image to define a plurality of points associated with muscle boundaries of a ventricle, b) extracting muscle boundaries for a series of source images to define a corresponding series of contour shape images using a Fourier descriptor model, and c) deforming each contour shape based at least in part on image forces, external forces, and internal forces to track movement of the muscle boundaries over time. In another embodiment, the method includes: a) characterizing the series of source images as a corresponding series of contour shape images representative of movement of muscle boundaries of the ventricle over time, b) classifying the series of contour shape images in a dyssynchronous class or a non-dyssynchronous class, and c) pre-diagnosing the ventricle as dyssynchronous or non-dyssynchronous.

50 Claims, 27 Drawing Sheets

U.S. PATENT DOCUMENTS

| | | | |
|---|---|---|---|
| 5,107,838 A | | 4/1992 | Yamaguchi |
| 5,435,310 A | * | 7/1995 | Sheehan et al. ............ 600/416 |
| 5,622,174 A | | 4/1997 | Yamazaki |
| 5,785,654 A | | 7/1998 | Iinuma et al. |
| 5,797,396 A | | 8/1998 | Geiser et al. |
| 6,070,100 A | | 5/2000 | Bakels et al. |
| 6,231,518 B1 | | 5/2001 | Grabek et al. |
| 6,243,603 B1 | | 6/2001 | Ideker et al. |
| 6,327,499 B1 | | 12/2001 | Alt |
| 6,411,840 B1 | | 6/2002 | Bardy |
| 6,453,192 B1 | | 9/2002 | Ding et al. |
| 6,487,443 B2 | | 11/2002 | Olson et al. |
| 6,497,655 B1 | | 12/2002 | Linberg et al. |
| 6,636,764 B1 | | 10/2003 | Fain et al. |
| 6,662,032 B1 | | 12/2003 | Gavish et al. |
| 6,801,661 B1 | * | 10/2004 | Sotak et al. ................ 382/203 |
| 6,810,282 B2 | | 10/2004 | Taha et al. |
| 6,816,266 B2 | | 11/2004 | Varshneya et al. |
| 6,871,088 B2 | | 3/2005 | Chinchoy |
| 6,885,889 B2 | | 4/2005 | Chinchoy |
| 6,978,184 B1 | | 12/2005 | Marcus et al. |
| 7,041,061 B2 | | 5/2006 | Kramer et al. |
| 7,043,063 B1 | * | 5/2006 | Noble et al. ................ 382/128 |
| 7,421,101 B2 | | 9/2008 | Georgescu et al. |
| 7,613,500 B2 | | 11/2009 | Vass et al. |
| 2001/0024516 A1 | * | 9/2001 | Yoshioka et al. ........... 382/128 |
| 2002/0016550 A1 | * | 2/2002 | Sweeney et al. ............ 600/515 |
| 2002/0072934 A1 | | 6/2002 | Ross et al. |
| 2002/0087072 A1 | | 7/2002 | Breeuwer |
| 2002/0156389 A1 | | 10/2002 | Kalgren et al. |
| 2003/0031385 A1 | * | 2/2003 | Elad et al. .................. 382/300 |
| 2003/0144700 A1 | | 7/2003 | Brown et al. |
| 2003/0153823 A1 | | 8/2003 | Geiser et al. |
| 2003/0204212 A1 | | 10/2003 | Burnes et al. |
| 2004/0006265 A1 | | 1/2004 | Alhussiny |
| 2004/0015081 A1 | * | 1/2004 | Kramer et al. .............. 600/439 |
| 2004/0077934 A1 | * | 4/2004 | Massad ...................... 600/300 |
| 2004/0106960 A1 | | 6/2004 | Siejko et al. |
| 2004/0220625 A1 | | 11/2004 | Silvestri et al. |
| 2005/0004615 A1 | | 1/2005 | Sanders |
| 2005/0010120 A1 | | 1/2005 | Jung et al. |
| 2005/0075542 A1 | | 4/2005 | Goldreich |
| 2005/0096522 A1 | | 5/2005 | Reddy et al. |
| 2005/0100203 A1 | | 5/2005 | Fujisawa |
| 2005/0102002 A1 | | 5/2005 | Salo et al. |
| 2005/0107838 A1 | | 5/2005 | Lovett et al. |
| 2005/0115561 A1 | | 6/2005 | Stahmann et al. |
| 2005/0137634 A1 | | 6/2005 | Hall et al. |
| 2005/0142070 A1 | | 6/2005 | Hartley et al. |
| 2005/0149137 A1 | | 7/2005 | Chinchoy et al. |
| 2005/0256417 A1 | | 11/2005 | Fischell et al. |
| 2006/0020294 A1 | | 1/2006 | Brockway et al. |
| 2006/0095085 A1 | * | 5/2006 | Marcus et al. ............... 607/17 |
| 2006/0116581 A1 | | 6/2006 | Zdeblick et al. |
| 2006/0262988 A1 | * | 11/2006 | Tek et al. .................... 382/256 |
| 2007/0014452 A1 | | 1/2007 | Suresh et al. |
| 2007/0275083 A1 | | 11/2007 | Xu et al. |

FOREIGN PATENT DOCUMENTS

| | | |
|---|---|---|
| EP | 0653224 B1 | 1/2004 |
| EP | 1470836 A1 | 10/2004 |
| EP | 1470836 B1 | 1/2007 |
| WO | 01/36046 A1 | 5/2001 |
| WO | 01/70104 A2 | 9/2001 |
| WO | 2003/003905 A2 | 1/2003 |
| WO | 2003/047690 A2 | 6/2003 |
| WO | 2004/091720 A2 | 10/2004 |
| WO | 2004/103184 A2 | 12/2004 |
| WO | 2005/037355 A1 | 4/2005 |
| WO | 2005/046788 A2 | 5/2005 |
| WO | 2006/042039 A2 | 2/2006 |
| WO | 2006/050385 A2 | 5/2006 |
| WO | 2006/056221 A1 | 6/2006 |

OTHER PUBLICATIONS

Jouan, Analysis of Sequence of Cardiac Contours by Fourier Descriptors for Plane Closed Curves, IEEE Transactions on Medical Imaging, vol. M1-6, No. 2, Jun. 1987, pp. 176-180.*

Abraham et al., Cardiac resynchronization in chronic heart failure, N Engl J Med, 346: pp. 1845-1853 (2002).

Abraham et al., Cardiac resynchronization therapy for heart failure, Circulation, 108: pp. 2596-2603 (2003).

Adigun et al., Cardiac Resynchronization Therapy for Treatment of Congestive Heart Failure, Hospital Physician, pp. 15-17 and 24 (Jan. 2005).

Aletras et al., AIR-SPAMM: alternative inversion recovery spatial modulation of magnetization for myocardial tagging, J Magn Reson, 166: pp. 236-245 (2004).

Aletras et al., Mixed echo train acquisition displacement encoding with stimulated echoes: an optimized DENSE method for in vivo functional imaging of the human heart, Magnetic Resonance Medicine, 46: pp. 523-534 (2001).

Bax et al., Echocardiographic Evaluation of Cardiac Resynchronization Therapy: Ready for Routine Clinical Use?, Journal of the American College of Cardiology, vol. 44, No. 1, pp. 1-9 (Jul. 7, 2004).

Bellenger et al., Reduction in sample size for studies of remodeling in heart failure by the use of cardiovascular magnetic resonance, J Cardiovasc Magn Reson, 2: pp. 271-278 (2000).

Bristow et al., Cardiac-resynchronization therapy with or without an implantable defibrillator in advanced chronic heart failure, N Engl J Med, 350: pp. 2140-2150 (2004).

Chakraborty et al., Deformable boundary finding in medical images by integrating gradient and region information, IEEE Transactions on Medical Imaging, vol. 15, No. 6, pp. 859-870 (1996).

Cohen et al., Finite-element methods for active contour models and balloons for 2-D and 3-D images, IEEE Transactions on Pattern Analysis and Machine Intelligence, vol. 15, No. 11, pp. 1131-1147 (1993).

Cootes et al., Active appearance models, European Conference on Computer Vision, 2: pp. 484-498 (1998).

Cootes et al., Active shape models: Their training and application, Computer Vision and Image Understanding, 61: pp. 38-59 (1995).

Dekker et al., Epicardial left ventricular lead placement for cardiac resynchronization therapy: Optimal pace site selection with pressure-volume loops, The Journal of Thoracic and Cardiovascular Surgery, vol. 127, No. 6 pp. 1641-1647 (2004).

Dohi et al., Utility of Echocardiographic Tissue Synchronization Imaging to Redirect Left Ventricular Lead Placement for Improved Cardiac Resynchronization Therapy, PACE, vol. 28, pp. 461-465 (May 2005).

Duncan et al., Medical image analysis: Progress over two decades and the challenges ahead, IEEE Transactions on Pattern Analysis and Machine Intelligence, vol. 22, No. 1, pp. 85-106 (Jan. 2000).

Etesami et al., Automatic dimensional inspection of machine part cross-sections using Fourier analysis, Computer Vision, Graphics, and Image Processing, vol. 29, pp. 216- 247 (1985).

Folkers et al., Content-based image retrieval using Fourier descriptors on a logo database, in Proc. ICPR, III: pp. 521-524 (2002).

Ghio et al., Interventricular and intraventricular dyssynchrony are common in heart failure patients, regardless of QRS duration, European Heart Journal, vol. 25, pp. 571-578 (2004).

Int'l App. No. PCT/US06/36384, International Search Report, 2 pages, mailed Sep. 13, 2007.

Int'l App. No. PCT/US06/36384, Written Opinion of the International Searching Authority, 3 pages, mailed Sep. 13, 2007.

Int'l App. No. PCT/US06/36385, International Search Report, 2 pages, mailed Apr. 2, 2007.

Int'l App. No. PCT/US06/36385, Written Opinion of the International Searching Authority, 4 pages, mailed Apr. 2, 2007.

Jain et al., Deformable template models: A review, Signal Processing, vol. d71, No. 2, pp. 109-129 (1998).

Jain et al., Statistical pattern recognition: A review, IEEE Trans. on PAMI, vol. 22, No. 1, pp. 4-37 (2000).

Kass et al., Snakes: Active contour models, International Journal on Computer Vision, vol. 1, No. 4, pp. 321-331 (Jan. 1988).

McInerney et al., Deformable models in medical image analysis, Medical Image Analysis, vol. 1, No. 2, pp. 91-108 (1996).

Mitchell et al., Multistage hybrid active appearance model matching: segmentation of left and right ventricles in cardiac MR images, IEEE Transactions on Medical Imaging, 20: pp. 415-423 (2001).

Molhoek et al., Effectiveness of resynchronization therapy in patients with end-stage heart failure, American Journal of Cardiology; 90: pp. 379-383 (2002).

Mule et al., Assessment of dyssynchrony in patients with severe heart failure by nuclear imaging: paradise lost and regained or lost and gone forever?, International Heart Journal, 6: pp. 96-105 (2005).

Procedures: Biventricular Pacemakers—What you need to know about biventricular pacing to treat heart failure, www.clevelandclinic.org/ heartcenter/ pub/ guide/ tests/ procedures/ biventricular_pm.htm, printed Jul. 3, 2006, Cleveland Clinic Foundation, Cleveland, OH, 10 pages (Jun. 2002).

Ranganath, Contour extraction from cardiac MRI studies using snakes, IEEE Transactions on Medical Imaging, vol. 14, No. 2, pp. 328-338 (1995).

Reichek, MRI myocardial tagging, Journal of Magnetic Resonance Imaging, 10: pp. 609-616 (1999).

Sarkar et al., Optimal infinite impulse response zero crossing based edge detectors, Computer Vision, Graphics and Image Processing, 54: pp. 224-243 (1991).

Schnurrenberger, Hierarchical classification and grouping of map spot symbols characterized by Fourier descriptors, M.S. thesis, Graduate School of The Ohio State University, Columbus, OH, 236 pages (1988).

Sogaard et al., Sequential Versus Simultaneous Biventricular Resynchronization for Severe Heart Failure—Evaluation by Tissue Doppler Imaging, Circulation, pp. 2078-2084 (Oct. 15, 2002).

Staib et al., Boundary finding with parametrically deformable models, IEEE Transactions on Pattern Analysis and Machine Intelligence, vol. 14, No. 11, pp. 1061-1075 (1992).

Stellbrink et al., The importance of being synchronous: On the prognostic value of ventricular conduction delay in heart failure, Journal of the American College of Cardiology, vol. 40, No. 11, pp. 2022, 2032, and 2033 (2002).

Suri et al., Shape recovery algorithms using level sets in 2-D/3-D medic: A state-of-the-art review, IEEE Transactions on Information Technology in Biomedicine, vol. 6, No. 1, pp. 8-28 (Mar. 2002).

Székely et al., Segmentation of 2-D and 3-D objects from MRI volume data using constrained elastic deformations of flexible Fourier contour and surface models, Medical Image Analysis, vol. 1, No. 1, pp. 19-34 (1996).

Xu et al., Snakes, shapes, and gradient vector' flow, IEEE Transactions on Image Processing, vol. 7, No. 3, pp. 359-369 (Mar. 1998).

Yu et al., A novel tool to assess systolic asynchrony and identify responders of cardiac resynchronization therapy by tissue synchronization imaging, J Am Coll Cardiol, 45: pp. 677-684 (2005).

Yu et al., Understanding Nonresponders of Cardiac Resynchronization Therapy—Current and Future Perspectives, Journal of Cardiovascular Electrophysiology, vol. 16, No. 10, pp. 1117-1124 (Oct. 2005).

Zhong et al., Object tracking using deformable templates, IEEE Transactions on Pattern Analysis and Machine Intelligence, vol. 22, No. 5, pp. 544-549 (May 2000).

Zhu et al., Selecting Principal Components in a Two-Stage Lda Algorithm, Proceedings of the IEEE Conference on Computer Vision and Pattern Recognition, vol. 1, pp. 132-137 (2006).

Fukunaga, pp. 1-10 from Introduction to Statistical Pattern Recognition, copyright 1990.

Jain et al., pp. 55-142 from Algorithms for Clustering Data, copyright 1988.

Russell et al., pp. 111-114 from Artificial Intelligence a Modern Approach, copyright 2003, 1995.

Sonka et al., pp. 238 and 240-242 from Image Processing, Analysis, and Machine Vision, copyright 1999.

Duda et al., pp. 6-13, 117-124 and 568-569 from Pattern Classification, copyright 2001.

Notice of Allowance and Fees Due for U.S. Appl. No. 12/067,092 dated Oct. 31, 2011.

Non-Final Office Action for U.S. Appl. No. 12/067,092, issued Jun. 16, 2011.

Ng et al., Prognostic implications of left ventricular dyssynchrony early after non-ST elevation myocardial infarction without congestive heart failure, Clincal research, European Heart Journal, Nov. 18, 2009, pp. 298-308.

* cited by examiner

  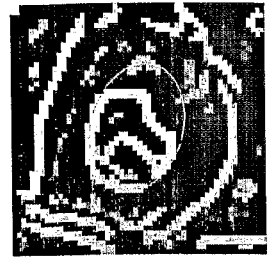 
FIG. 1A  FIG. 1B  FIG. 1C  FIG. 1D
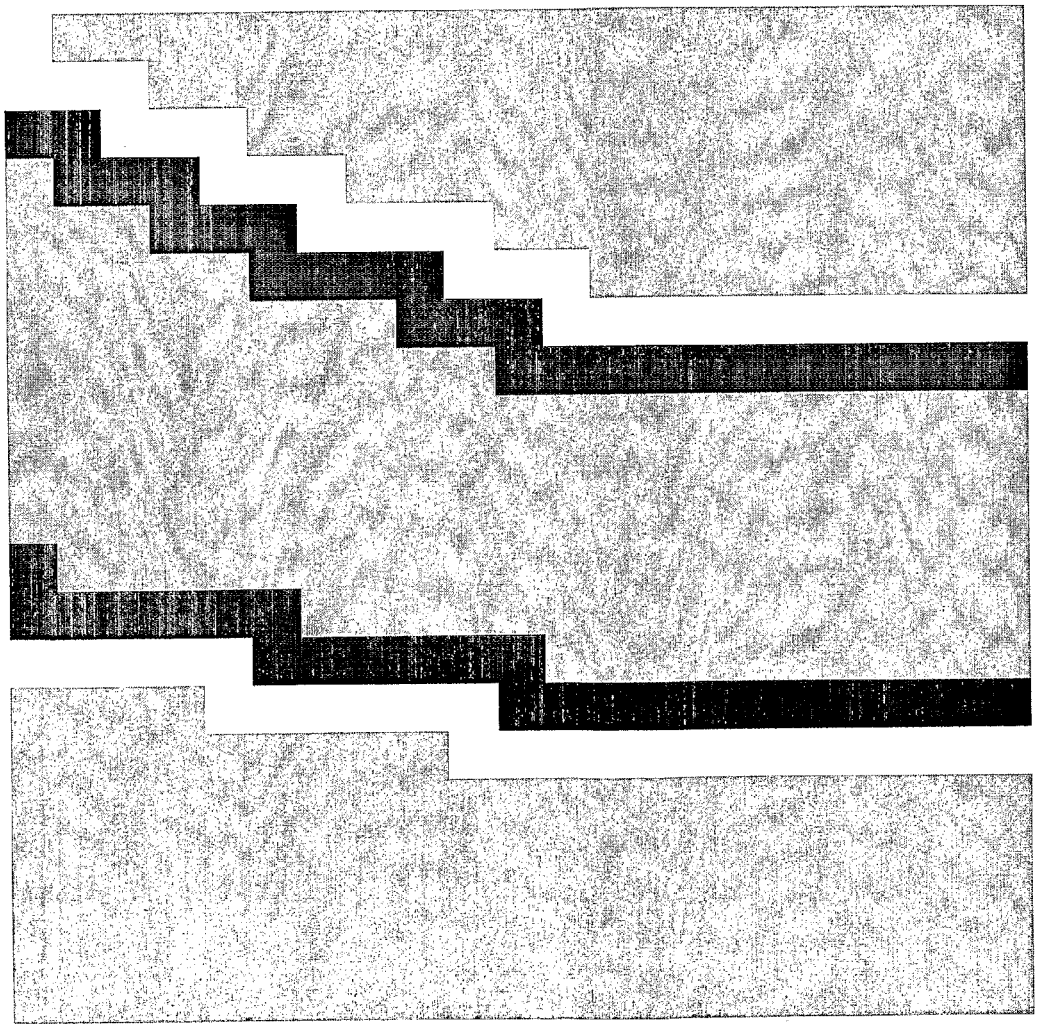
FIG. 2A

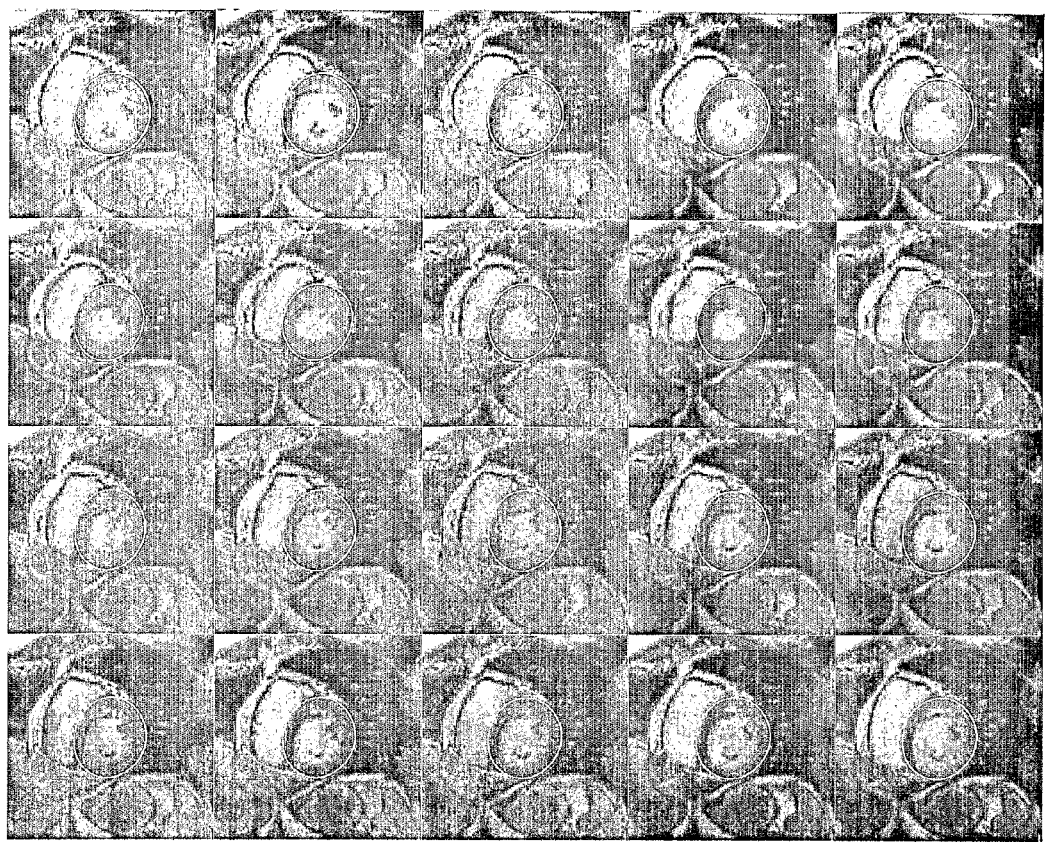
FIG. 7A
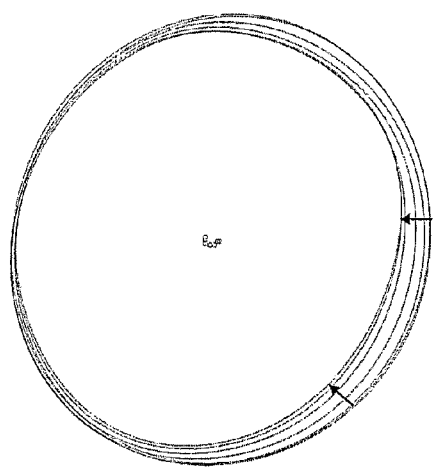 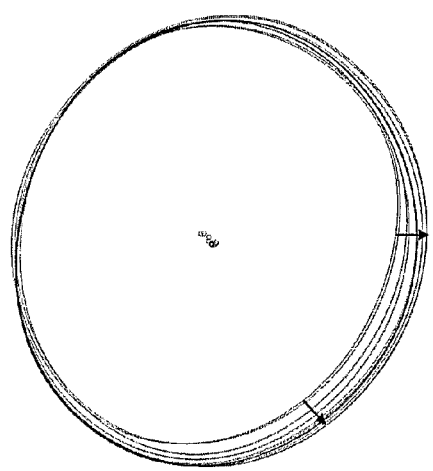
FIG. 7B  FIG. 7C

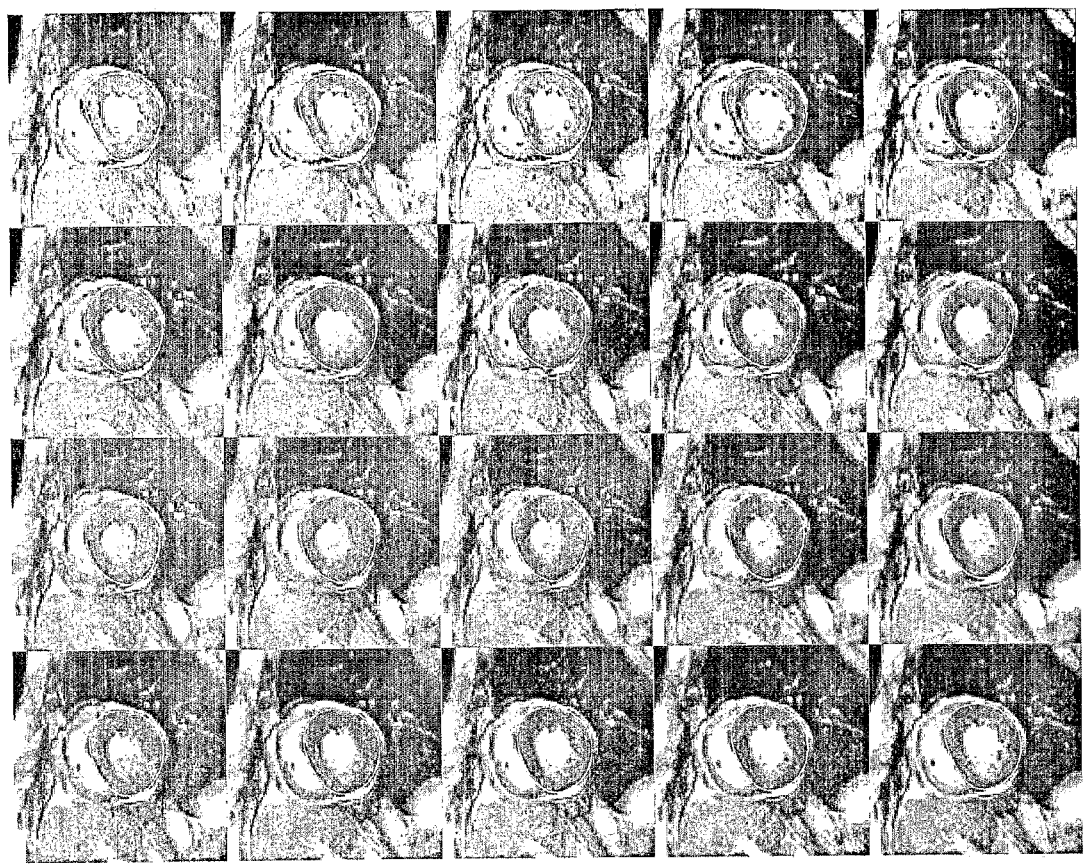
FIG. 8A
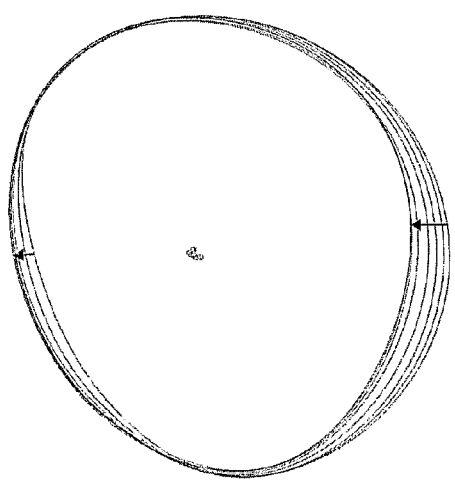 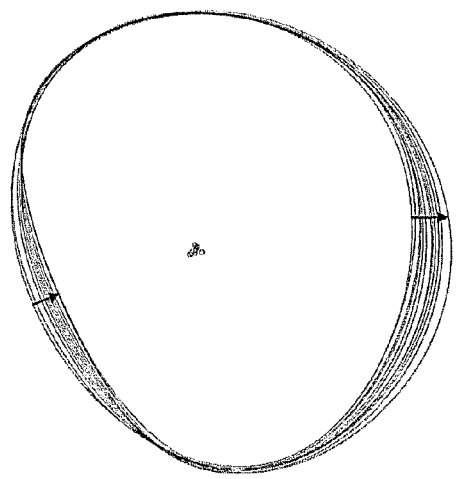
FIG. 8B FIG. 8C

METHOD AND APPARATUS FOR DETECTING INTRAVENTRICULAR DYSSYNCHRONY

CROSS-REFERENCE TO RELATED APPLICATIONS

This application claims the benefit of four U.S. provisional patent applications, including Ser. No. 60/718,115, filed Sep. 16, 2005 Ser. No. 60/728,958, filed Oct. 21, 2005 Ser. No. 60/744,058, filed Mar. 31, 2006 and Ser. No. 60/744,056, filed Mar. 31, 2006. This application is also related to co-pending PCT patent application entitled "Method and Apparatus for Detecting Interventricular Dyssynchrony" by Philip F. Binkley and Subha V. Raman filed with the U.S. Patent and Trademark Office (USPTO) the same day as this application. The contents of all above-identified patent application(s) and patent(s) are fully incorporated herein by reference.

BACKGROUND

Intraventricular dyssynchrony corresponds to the non-uniform activation (i.e., contraction) of, for example, left ventricle (LV) walls and has been shown to be predictive of major cardiac events, such as asymmetric muscle hypertrophy, caused by the increased work in late-activated regions. Other consequences include reductions in contractility, filling time, and ejection fraction. Increased recognition of the relationship between dyssynchrony and heart failure has led to cardiac resynchronization therapy (CRT), which has provided positive results in restoring ventricular function. By restoring coordinated contraction through multiple pacing sites, CRT can dramatically improve survival and quality of life for some patients. Response to CRT, however, is variable and, in the past, has been difficult to predict. For example, studies have shown that over 30 percent of patients receiving CRT may not respond to the treatment.

Based on the foregoing, accurate detection of intraventricular dyssynchrony is not well established. This may be in part due to insufficient characterization of intraventricular dyssynchrony by current diagnostic techniques. For example, selection of patients for CRT has been based on electrocardiography measurements of QRS duration ($\geq 130$ ms) and ejection fraction ($\leq 35\%$). Clinical issues associated with CRT have also arisen, for example, in conjunction with determining the appropriate number of pacing leads and lead placement.

Information related to attempts to address these problems can be found, for example, in PCT Patent Application Publication Number WO 2006/042039 and U.S. Pat. Nos. 6,978,184 and 7,041,061. However, each one of these references requires insertion of a medical instrument (e.g., catheter) or implantation of a medical device (e.g., pacemaker, CRT device, etc.) in the patient in order to test for dyssynchrony. Based at least on the foregoing, there is a need for an improved method and apparatus for detecting intraventricular dyssynchrony.

SUMMARY

In one aspect, a method of detecting intraventricular dyssynchrony is provided. In one embodiment, the method includes: a) receiving initialization information from an observer viewing a first source image of a series of source images of a ventricle of a beating heart over at least one cardiac cycle to define a plurality of points associated with muscle boundaries of the ventricle, b) extracting muscle boundaries for each source image of the series of source images to define a corresponding series of contour shape images with contour shapes corresponding to the muscle boundaries using a Fourier descriptor model, and c) deforming each contour shape in each contour shape image based at least in part on image forces, external forces, and internal forces to track movement of the muscle boundaries for the ventricle over time in the series of contour shape images.

In another embodiment, the method includes: a) characterizing a series of source images of a ventricle of a beating heart over at least one cardiac cycle as a corresponding series of contour shape images representative of movement of muscle boundaries of the ventricle over time, b) classifying the series of contour shape images in a dyssynchronous class or a non-dyssynchronous class, and c) pre-diagnosing the ventricle as dyssynchronous or non-dyssynchronous based at least in part on the classifying.

In still another embodiment, the method includes: a) observing a series of contour shape images representative of movement of muscle boundaries of a ventricle of a beating heart over at least one cardiac cycle, wherein the series of contour shape images is classified in a dyssynchronous class, b) diagnosing the ventricle as dyssynchronous based at least in part on the observing, c) planning treatment of the dyssynchronous ventricle to include epicardial implantation of a cardiac resynchronization therapy device, d) identifying a dyssynchronous region of the ventricle based at least in part on the observing, and e) planning lead placement for the cardiac resynchronization therapy device based at least in part on the dyssynchronous region of the ventricle.

In yet another embodiment, the method includes: a) characterizing a series of source images of a ventricle of a beating heart over at least one cardiac cycle as a corresponding series of contour shape images representative of movement of muscle boundaries of the ventricle over time, b) classifying the series of contour shape images in at least one of a plurality of dyssynchronous subclasses or in a non-dyssynchronous class, each dyssynchronous subclass associated with a different region of the ventricle, and e) pre-diagnosing the ventricle as having at least one dyssynchronous region or as non-dyssynchronous based at least in part on the classifying.

In still yet another embodiment, the method includes: a) capturing movement of a ventricle of a beating heart over at least one cardiac cycle in a series of source images for a subject, b) extracting muscle boundaries for each source image of the series of source images to define a corresponding series of subject contour shape images with subject contour shapes corresponding to the muscle boundaries, c) deforming each subject contour shape in each subject contour shape image to track movement of the muscle boundaries for the ventricle over time in the subject series of contour shape images, d) observing the subject series of contour shape images, e) comparing the subject series of contour shape images to other series of contour shape images from other cases, and f) pre-diagnosing the subject ventricle as dyssynchronous or non-dyssynchronous based at least in part on the observing and comparing.

In another aspect, an apparatus for detecting intraventricular dyssynchrony is provided. In one embodiment, the apparatus includes a contour image processor and an image classifier in operative communication with the contour image processor. The contour image processor extracting muscle boundaries for each source image of a series of source images of a ventricle of a beating heart over at least one cardiac cycle to define a corresponding series of contour shape images with contour shapes corresponding to muscle boundaries of the ventricle using a Fourier descriptor model and deforming each contour shape in each contour shape image based at least in part on image forces, external forces, and internal forces to track movement of the muscle boundaries for the ventricle over time in the series of contour shape images. The image classifier classifying the series of contour shape images in a dyssynchronous class or a non-dyssynchronous class.

In another embodiment, the apparatus includes a contour image processor and an image classifier in operative communication with the contour image processor. The image contour processor characterizing a series of source images of a ventricle of a beating heart over at least one cardiac cycle as a corresponding series of contour shape images representative of movement of muscle boundaries of the ventricle over time using a Fourier descriptor model. The image classifier classifying the series of contour shape images in a dyssynchronous class or a non-dyssynchronous class.

In still another embodiment, the apparatus includes a contour image processor and an image classifier in operative communication with the contour image processor. The contour image processor characterizing a series of source images of a ventricle of a beating heart over at least one cardiac cycle as a corresponding series of contour shape images representative of movement of muscle boundaries of the ventricle over time. The image classifier classifying the series of contour shape images in at least one of a plurality of dyssynchronous subclasses or in a non-dyssynchronous class, each dyssynchronous subclass associated with a different region of the ventricle.

In another aspect, a method for monitoring an internal area of a subject is provided. In one embodiment, the method includes: a) receiving initialization information from an observer viewing a first source image of a series of source images of the internal area over a predetermined time to define a plurality of points associated with boundaries within the internal area, b) extracting boundaries for each source image of the series of source images to define a corresponding series of contour shape images with contour shapes corresponding to the boundaries using a Fourier descriptor model, and c) deforming each contour shape in each contour shape image based at least in part on image forces, external forces, and internal forces to track movement of the boundaries within the internal area over time in the series of contour shape images.

In another aspect, an apparatus for monitoring an internal area of a subject is provided. In one embodiment, the apparatus includes: a contour image processor extracting boundaries for each source image of a series of source images of the internal area over a predetermined time to define a corresponding series of contour shape images with contour shapes corresponding to boundaries within the internal area using a Fourier descriptor model and deforming each contour shape in each contour shape image based at least in part on image forces, external forces, and internal forces to track movement of the boundaries within the internal area over time in the series of contour shape images and an image classifier, in operative communication with the contour image processor, classifying the series of contour shape images in a first class or a second class based at least in part on detection of predetermined discriminating characteristics for the first and second classes in the contour shape images.

DRAWINGS

These and other features, aspects, and advantages of the present invention will become better understood with regard to the accompanying drawings, following description, and appended claims.

FIG. 1 shows an example of the blending effect between papillary muscles and endocardial contour in an exemplary LV. FIG. 1A is an exemplary short-axis image of LV showing papillary muscles. FIG. 1B shows an exemplary desired endocardial boundary. FIG. 1C depicts an exemplary desired boundary and edge strength at locations of zero crossings in a bandpass filtered image. FIG. 1D shows an example of a poor result caused by the interference of papillary muscles.

FIG. 2 shows an exemplary embodiment of a procedure for building image forces. FIG. 2A is an exemplary view of double edge chains at the positive (white) and negative (black) sides of zero crossing positions. FIG. 2B shows an exemplary product of gradient vectors for the zero crossing (ZC) map of FIG. 2A. FIG. 2C shows an example of resulting image forces after spreading initial forces.

FIG. 3 shows an example of texture vectors used to build image forces acting along the contour's normal direction. FIG. 3A shows an example of the user's initial points (contour) and corresponding texture vectors. FIG. 3B is an example of gradually changing texture images (interpolated to the same number of rows $L_0$) from ten images depicting cardiac contraction (systole)—the vertical line in the first image shows the endocardial contour between the regions immediately inside (to the left) and outside (to the right) of the LV.

FIG. 4 is an example of a portion of a LV endocardial boundary. As shown by example in FIG. 4A, despite the implicit smoothness imposed by the Fourier descriptors, self crossings of the contour can still occur during the deformation process. Defining an additional internal force, as shown by example in FIG. 4B, addresses this problem.

FIG. 5 is an exemplary result for a normal heart. FIG. 5A shows an example of extracted endocardial contours over a cardiac cycle. FIGS. 5B and 5C show examples of overlays of shapes during systole and diastole (centroids are also plotted), respectively.

FIG. 6 is an exemplary result for a dyssynchronous heart. FIG. 6A shows an example of extracted endocardial contours over a cardiac cycle. FIGS. 6B and 6C show examples of overlays of shapes during systole and diastole (centroids are also plotted), respectively.

FIG. 7 is an exemplary result for a normal heart. FIG. 7A shows an example of extracted epicardial contours over a cardiac cycle. FIGS. 7B and 7C show examples of overlays of shapes during systole and diastole (centroids are also plotted), respectively.

FIG. 8 is an exemplary result for a dyssynchronous heart. FIG. 8A shows an example of extracted epicardial contours over a cardiac cycle. FIGS. 8B and 8C show examples of overlays of shapes during systole and diastole (centroids are also plotted), respectively.

DESCRIPTION

Figure 2B:
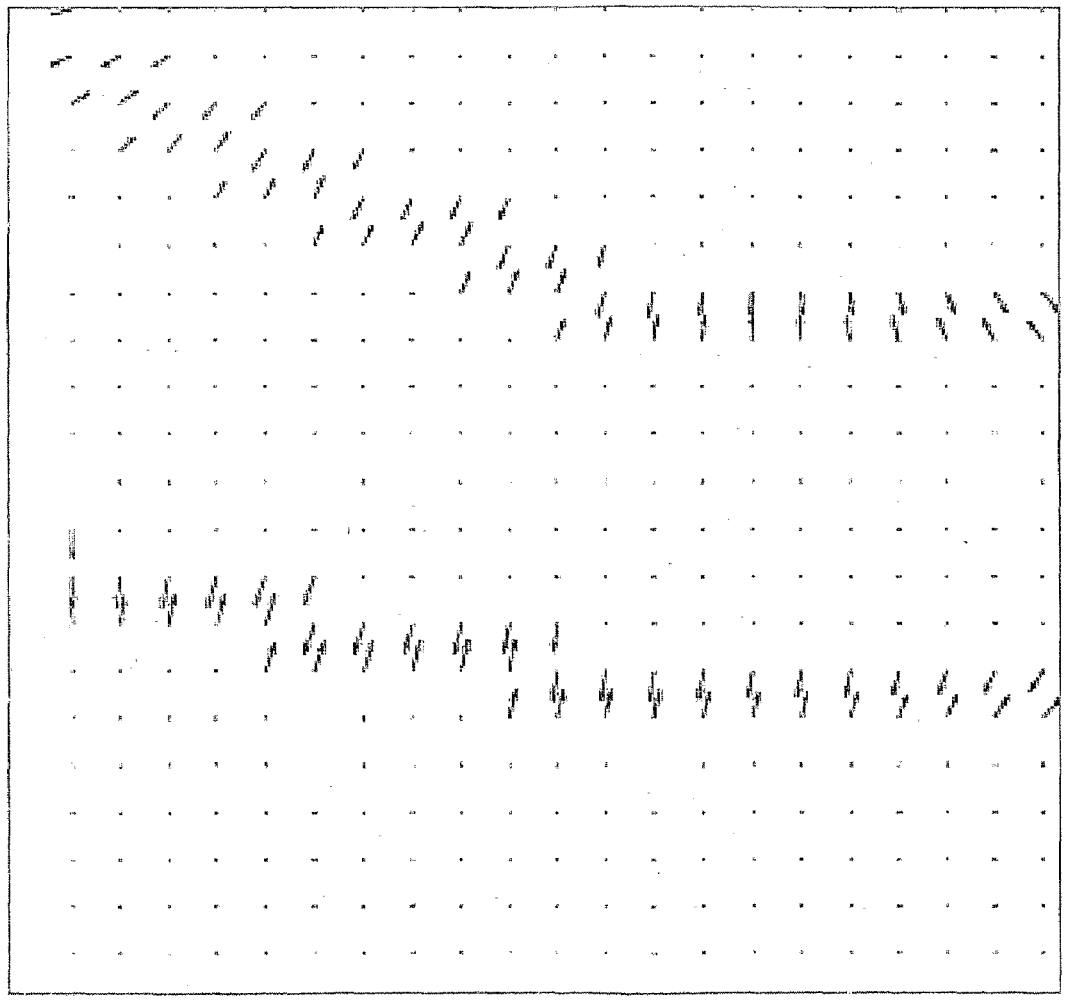

The following paragraphs include definitions of exemplary terms used within this disclosure. Except where noted otherwise, variants of all terms, including singular forms, plural forms, and other affixed forms, fall within each exemplary term meaning. Except where noted otherwise, capitalized and non-capitalized forms of all terms fall within each meaning.

"Circuit," as used herein includes, but is not limited to, hardware, firmware, software or combinations of each to perform a function(s) or an action(s). For example, based on a desired feature or need, a circuit may include a software controlled microprocessor, discrete logic such as an application specific integrated circuit (ASIC), or other programmed logic device. A circuit may also be fully embodied as software. As used herein, "circuit" is considered synonymous with "logic."

"Comprising," "containing," "having," and "including," as used herein, except where noted otherwise, are synonymous and open-ended. In other words, usage of any of these terms (or variants thereof) does not exclude one or more additional elements or method steps from being added in combination with one or more enumerated elements or method steps.

"Computer component," as used herein includes, but is not limited to, a computer-related entity, either hardware, firmware, software, a combination thereof, or software in execution. For example, a computer component can be, but is not limited to being, a process running on a processor, a processor, an object, an executable, a thread of execution, a program and a computer. By way of illustration, both an application running on a server and the server can be computer components. One or more computer components can reside within a process or thread of execution and a computer component can be localized on one computer or distributed between two or more computers.

"Computer communication," as used herein includes, but is not limited to, a communication between two or more computer components and can be, for example, a network transfer, a file transfer, an applet transfer, an email, a hypertext transfer protocol (HTTP) message, a datagram, an object transfer, a binary large object (BLOB) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Controller," as used herein includes, but is not limited to, any circuit or device that coordinates and controls the operation of one or more input or output devices. For example, a controller can include a device having one or more processors, microprocessors, or central processing units (CPUs) capable of being programmed to perform input or output functions.

"Logic," as used herein includes, but is not limited to, hardware, firmware, software or combinations of each to perform a function(s) or an action(s), or to cause a function or action from another component. For example, based on a desired application or need, logic may include a software controlled microprocessor, discrete logic such as an application specific integrated circuit (ASIC), or other programmed logic device. Logic may also be fully embodied as software. As used herein, "logic" is considered synonymous with "circuit."

"Measurement," as used herein includes, but is not limited to, an extent, magnitude, size, capacity, amount, dimension, characteristic or quantity ascertained by measuring. Example measurements are provided, but such examples are not intended to limit the scope of measurements the systems and methods described herein can employ.

"Operative communication," as used herein includes, but is not limited to, a communicative relationship between devices, logic, or circuits, including mechanical and pneumatic relationships. Direct electrical, electromagnetic, and optical connections and indirect electrical, electromagnetic, and optical connections are examples of such communications. Linkages, gears, chains, push rods, cams, keys, attaching hardware, and other components facilitating mechanical connections are also examples of such communications. Pneumatic devices and interconnecting pneumatic tubing may also contribute to operative communications. Two devices are in operative communication if an action from one causes an effect in the other, regardless of whether the action is modified by some other device. For example, two devices separated by one or more of the following: i) amplifiers, ii) filters, iii) transformers, iv) optical isolators, v) digital or analog buffers, vi) analog integrators, vii) other electronic circuitry, viii) fiber optic transceivers, ix) Bluetooth communications links, x) 802.11 communications links, xi) satellite communication links, and xii) other wireless communication links. As another example, an electromagnetic sensor is in operative communication with a signal if it receives electromagnetic radiation from the signal. As a final example, two devices not directly connected to each other, but both capable of interfacing with a third device, e.g., a central processing unit (CPU), are in operative communication.

"Or," as used herein, except where noted otherwise, is inclusive, rather than exclusive. In other words, "or" is used to describe a list of alternative things in which one may choose one option or any combination of alternative options. For example, "A or B" means "A or B or both" and "A, B, or C" means "A, B, or C, in any combination." If "or" is used to indicate an exclusive choice of alternatives or if there is any limitation on combinations of alternatives, the list of alternatives specifically indicates that choices are exclusive or that certain combinations are not included. For example, "A or B, but not both" is used to indicate use of an exclusive "or" condition. Similarly, "A, B, or C, but no combinations" and "A, B, or C, but not the combination of A, B, and C" are examples where certain combination of alternatives are not included in the choices associated with the list.

"Processor," as used herein includes, but is not limited to, one or more of virtually any number of processor systems or stand-alone processors, such as microprocessors, microcontrollers, central processing units (CPUs), and digital signal processors (DSPs), in any combination. The processor may be associated with various other circuits that support operation of the processor, such as random access memory (RAM), read-only memory (ROM), programmable read-only memory (PROM), erasable programmable read-only memory (EPROM), clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or other drawings.

"Signal," as used herein includes, but is not limited to, one or more electrical signals, including analog or digital signals, one or more computer instructions, a bit or bit stream, or the like.

"Software," as used herein includes, but is not limited to, one or more computer readable or executable instructions that cause a computer or other electronic device to perform functions, actions, or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system, or other types of executable instructions. It will be appreciated by one of ordinary skill in the art that the form of software is dependent on, for example, requirements of a desired application, the environment it runs on, or the desires of a designer/programmer or the like.

"Software component," as used herein includes, but is not limited to, a collection of one or more computer readable or executable instructions that cause a computer or other electronic device to perform functions, actions or behave in a desired manner. The instructions may be embodied in various forms like routines, algorithms, modules, methods, threads, or programs. Software components may be implemented in a variety of executable or loadable forms including, but not limited to, a stand-alone program, a servlet, an applet, instructions stored in a memory, and the like. Software components can be embodied in a single computer component or can be distributed between computer components.

The following table includes long form definitions of exemplary acronyms used within this disclosure. Except where noted otherwise, variants of all acronyms, including singular forms, plural forms, and other affixed forms, fall within each exemplary acronym meaning. Except where noted otherwise, capitalized and non-capitalized forms of all acronyms fall within each meaning.

| Acronym | Long Form |
| --- | --- |
| 2D | Two-Dimensional |
| 3D | Three-Dimensional |
| AAM | Active Appearance Model |
| ASIC | Application Specific Integrated Circuit |
| ASM | Active Shape Model |
| BLOB | Binary Large Object |
| CBE | Cardiovascular Bioengineering Enterprise |
| CMR | Cardiac Magnetic Resonance |
| CPU | Central Processing Unit |
| CRT | Cardiac Resynchronization Therapy |
| CT | Computed Tomography |
| DICOM | Digital Imaging And Communications In Medicine |
| DSP | Digital Signal Processor |
| echo | Echocardiography or Echocardiogram |
| EKG | Electrocardiography or Electrocardiograph |
| EPROM | Erasable Programmable Read-Only Memory |
| FDA | Food and Drug Administration |
| FFE | Fast Field Echo |
| FISP | Fast Imaging With Steady Precession |
| GE | General Electric |
| GVF | Gradient Vector Flow |
| HTTP | Hypertext Transfer Protocol |
| IEEE | Institute of Electrical and Electronics Engineers |
| ISDN | Integrated Services Digital Network |
| LAN | Local Area Network |
| LDA | Linear Discriminant Analysis |
| LED | Light Emitting Diode |
| LV | Left Ventricle |
| MAP | Maximum A-Posteriori |
| MDA | Mixture Discriminant Analysis |
| MDCT | Multi-Detector Computer Tomography |
| MLE | Maximum Likelihood Estimate |
| MR | Magnetic Resonance |
| MRI | Magnetic Resonance Imaging |
| ms | Millisecond |
| NYHA | New York Heart Association |
| OZCO | Optimal Zero Crossing Operator |
| PC | Personal Computer |
| PCA | Principal Component Analysis |
| PET | Positron Emission Tomography |
| POTS | Plain Old Telephone System |
| PROM | Programmable Read-Only Memory |

-continued

| Acronym | Long Form |
|---|---|
| QRS | Q, R, and S points in an electrical signal representing a cardiac cycle |
| RAM | Random Access Memory |
| RF | Radio Frequency |
| ROM | Read-Only Memory |
| RV | Right Ventricle |
| SPECT | Single Photon Emission Computer Tomography |
| SSFP | Steady-State Free Precession |
| true-FISP | True Fast Imaging With Steady Precession |
| V-V | Ventricle-to-Ventricle |
| WAN | Wide Area Network |
| ZC | Zero Crossing |

In general, a deformable model technique that follows a snake-like approach and uses a complex Fourier shape descriptor parameterization technique is provided herein to formulate the forces that constrain contour deformation in analyzing cardiac imaging. In one embodiment, the technique may track the endocardial and epicardial boundaries of a selected ventricle (e.g., left ventricle (LV)) in sequences of short-axis magnetic resonance (MR) images depicting complete cardiac cycles. Extracted shapes from the model appear to be robust with respect to weak contrast, noisy edge maps, and papillary muscle anatomy. A statistical pattern recognition approach for classification of the selected ventricle between dyssynchronous (i.e., asynchronous activation of the ventricle walls) and non-dyssynchronous is also provided. Ventricles in the dyssynchronous class may exhibit intraventricular dyssynchrony and may respond to CRT. The exemplary embodiments described herein often refer to the LV. However, it is understood that the exemplary embodiments may be implemented in conjunction with either the LV or the right ventricle (RV).

The deformable model technique provides spatio-temporal characterizations of ventricular wall motion. A combination of Principal Component Analysis (PCA) and Linear Discriminant Analysis (LDA) may be used to analyze the spatio-temporal characterizations to classify, for example, the LV as either dyssynchronous or non-dyssynchronous. For example, from a database comprising 33 patients, this approach provided a correct classification performance of 90.9%. Thus, this technique demonstrates improved intraventricular dyssynchrony characterization over existing techniques. Accordingly, this technique could be used for selecting patients for CRT as an adjunct to any combination of criteria used in existing techniques (or in place of such criteria).

Cardiac magnetic resonance imaging (MRI), for example, provides comprehensive cardiovascular assessment without radiation and with high signal-to-noise ratio as compared to other cardiac diagnostic modalities. Four-dimensional, short-axis cine MRI data sets routinely acquired during clinical examinations comprise high-resolution cardiac images throughout the cardiac cycle, for a number of parallel planes, "slices," through the human heart. However, due to the large amount of image data generated (e.g., 200-300 images), analysis of cardiac structures has become a laborious task and automatic segmentation methods have been investigated. Besides automating this task, researchers have also sought to improve quantitative evaluation of cardiac function and morphology. Measures of interest include, for example, LV wall motion and thickening, which require the correct delineation of the LV endocardial and epicardial boundaries in a sequence of images. Although human observers are able to identify the structures of interest based on prior knowledge, automated analysis of cardiovascular MRI remains desirable due to the difficulties presented to observers by the natural variability of the imaged structures, turbulent blood flows, or the interference of papillary muscles and other cardiac structures. Also, the presence of noise and other artifacts can cause image information to be unreliable or missing. For these reasons, under-constrained data-driven (i.e., bottom-up) approaches can also be expected to be unreliable or fail. It is well accepted in the computer vision and image analysis literature that high-level knowledge (i.e., prior experience) is required at some stage of data analysis—for instance, by integrating high-level (global) shape characterization and low-level (local) image evidence—to reduce the complexity of the problem at hand. However, if a model is applied too late, inconsistencies can still be created by early low-level methods (e.g., thresholding in edge detection). On the other hand, in medical image analysis, a problem faced by model-based (i.e., top-down) approaches is that, given a natural structure, how does one define a suitable model? This decision must take into account the characteristic, inter-sample variations found even among normal, healthy anatomical structures. Furthermore, in the case of tracking cardiac structures, the model must also tolerate intra-sample variations created by non-rigid motion.

This scenario has led researchers to the development and improvement of techniques known in the computer vision literature as deformable models. For additional information on existing deformable model techniques see, for example, T. McInerney and D. Terzopoulos, "Deformable models in medical image analysis," Medical Image Analysis, vol. 1, no. 2, pp. 91-108, 1996 and A. K. Jain, Y. Zhong, and M.-P. Dubuisson-Jolly, "Deformable template models: A review," Signal Processing, vol. 71, no. 2, pp. 109-129, 1998. The contents of the McInerney and Jain 1 documents are fully incorporated herein by reference.

Among existing deformable models, statistical techniques such as Active Shape Models (ASMs) and Active Appearance Models (AAMs) have provided promising results because they can capture high-level knowledge from manually generated results (i.e., results provided by experts) and accommodate variations in ways that characterize the class of the object of interest. The cost of using such models is that they require a great initial effort in carefully building the training data set with manually generated results—which is even more laborious when building a spatio-temporal model. Furthermore, consistency in these manual segmentations is a key factor for good performance. Inter- and intra-observer variations can introduce misleading information in the training data and will weaken the knowledge contained in the model, thereby compromising the quality of the resulting segmentations.

A deformable model technique for tracking cardiac contours through a complete cardiac cycle is provided herein. The model follows a snake-like approach and uses complex Fourier shape descriptors. The technique takes advantage of the properties of such a parameterization to efficiently formulate internal and external forces that constrain contour deformation during extraction and tracking. For additional information on existing techniques using Fourier shape descriptors see, for example, J. A. Schnurrenberger, "Hierarchical classification and grouping of map spot symbols characterized by Fourier descriptors," Master's thesis, Graduate School of The Ohio State University, Columbus, Ohio, 1988; A. Folkers and H. Samet, "Content-based image retrieval using Fourier descriptors on a logo database," in Proceedings of the International Conference on Pattern Recognition, 2002, pp. III: 521-524; and M. Sonka, V. Hlavac, and R. Boyle, Image Processing, Analysis, and Machine Vision, Brooks/Cole, 1998. The contents of the Schnurrenberger, Folkers, and Sonka documents are fully incorporated herein by reference.

Additionally, the approach described herein employs not only edge strength, but also the texture around the evolving contour to design image forces that guide the contour towards the desired structures in the images. A set of manual segmentations is not required and the model does not require training. Nevertheless, if available, the model can make use of such information. User-supplied initialization, for example, may be accomplished with as few as two points, generally four points, and sometimes as many as ten points on the desired boundary in one image of the MRI sequence. The actual number of points needed during initialization depends on the shape of the ventricle. The technique described herein was, for example, applied to track the endocardial boundary and epicardial boundary of the LV in short-axis cine MRI. However, other imaging modalities may also be used to capture source images of a patients heart, including nuclear cardiology, echocardiography, cardiovascular magnetic resonance (CMR), cardiac computed tomography (CT), positron emission computed tomography (PET), and coronary angiography.

The deformable model described herein may be used to provide data for the detection of intraventricular dyssynchrony, for example, in the LV. In one embodiment, detection of intraventricular dyssynchrony is provided from routine, short-axis cine MRI, without requiring specialized acquisitions, such as myocardial tagging or displacement encoding. In other embodiments, other imaging modalities may also be used to capture source images of a patients heart for detection of intraventricular dyssynchrony, including nuclear cardiology, echocardiography, CMR, cardiac CT, PET, and coronary angiography. The detection of intraventricular dyssynchrony in the LV may be formulated under the perspective of statistical pattern recognition. For additional information on statistical pattern recognition, see, for example, A. K. Jain, R. P. W. Duin, and J. Mao, "Statistical pattern recognition: A review," IEEE Transactions on Pattern Analysis and Machine Intelligence, vol. 22, no. 1, pp. 4-37, 2000; Duda, Hart, and Stork, Pattern Classification. John Wiley, 2001; and K. Fukunaga, Introduction to Statistical Pattern Recognition. Academic Press, 1990. The contents of the Jain 2, Duda, and Fukunaga documents are fully incorporated herein by reference.

The deformable model technique may be used to compute a spatio-temporal characterization of the LV over a complete cardiac cycle. PCA and LDA may be applied to define a classifier for discrimination between a dyssynchronous and a non-dyssynchronous ventricle. Classification results from the deformable model technique described herein may be compared to results using existing techniques (i.e., techniques using QRS duration and ejection fraction parameters) to determine patient eligibility for CRT. Ideally, a higher percentage of patients diagnosed with dyssynchrony using the deformable model technique described herein will respond to CRT than the percentage (e.g., about 62.5%) of patients responding to CRT that were diagnosed using existing techniques.

Deformable model techniques can be represented in a Bayesian formulation. For example, consider the case of extracting a 2D contour (or shape) described by a parameter vector θ, from an image I. Prom Bayes rule, the conditional probability distribution of THETA (θ), given I, is $$P(\theta | I) = \frac{P(\theta)P(I | \theta)}{P(I)} = \alpha P(\theta) P(I | \theta) \qquad (1)$$

where $\alpha = P(I)^{-1}$ is just a normalizing constant that ensures $P(\theta|I) \in [0, 1]$. The goal is to find the contour θ that maximizes the posterior $P(\theta|I)$ or, equivalently, its logarithm. The maximum a-posteriori (MAP) estimate is then given by:

$$\hat{\theta} = \underset{\theta}{\operatorname{argmax}}\{\ln P(\theta) + \ln P(I | \theta)\}. \qquad (2)$$

The first term in Equation (2), the parameter vector's (a priori) distribution, represents the domain knowledge about the class of contours being sought (i.e., expected shape). The second term accounts for the image evidence that supports each possible contour instance. Thus, in maximizing the sum of these two terms—representing high-level domain information and low-level observation data—there is a tradeoff between how well the extracted contour $\hat{\theta}$ agrees with general expectations and how well it agrees with the specific instance (image data) being considered.

In many applications, the prior information on the parameter distribution may be obtained from manual segmentations provided by experts (e.g., cardiologists). In other cases, the parameters may initially be assumed to be uniformly distributed and Equation (2) becomes a maximum likelihood estimate (MLE) because the first term is constant. Since the resulting MLE relies more heavily on image evidence, the data are assumed to provide sufficient information to support the decision on the underlying θ. Thus, this second approach (uniform prior) may be applied to a training set and the results, which play the same role as the manual results provided by experts, may be used to estimate the prior shape distribution—or, in prototype-based techniques, a "mean shape" and a few allowed "modes of deformation".

Another way of understanding deformable models, or snakes, is under the energy minimization framework. The desired contour $\hat{\theta}$ is the one that minimizes the sum of three kinds of (potential) energy:

$$\hat{\theta} = \underset{\theta}{\operatorname{argmin}}\{E_{int}(\theta) + E_{ext}(\theta) + E_{img}(\theta)\}. \qquad (3)$$

The internal and external energies, $E_{int}$ and $E_{ext}$, are constraints that play a role similar to the first term prior) in Equation (2), while the image energy $E_{img}$ acts as the second term (data evidence). In finding $\hat{\theta}$, these metaphorical potential energies are often related to corresponding metaphorical forces. The contour (snake) is considered to be under the effect of image forces $F_{img}$ trying to deform it, while internal and external forces, $F_{int}$ and $F_{ext}$, constrain its deformation. Usually, $F_{int}$ corresponds to tension and stiffness forces, providing general smoothness constraints on the contour's shape; $F_{ext}$ can optionally represent additional high-level knowledge; and $F_{img}$ often deforms the contour based on edge strength measures.

Since snakes were designed as interactive tools, the user supplies (e.g., draw) an initial contour $\theta_0$ close to the desired boundary. Then, this snake deforms as if placed in a viscous medium with no inertia—so that moving at a constant velocity requires forces to be applied constantly—and the final state $\hat{\theta}$ of the snake is achieved when the forces are in balance:

$$F_{int}(\hat{\theta})+F_{ext}(\hat{\theta})+F_{img}(\hat{\theta})=0 \quad (4).$$

L. Staib and J. Duncan, "Boundary finding with parametrically deformable models," IEEE Transactions on Pattern Analysis and Machine Intelligence, vol. 14, no. 11, pp. 1061-1075, 1992, for example, presents a parametrically deformable model based on the elliptical Fourier representation:

$$\begin{bmatrix} x(t) \\ y(t) \end{bmatrix} = \begin{bmatrix} \alpha_0 \\ \gamma_0 \end{bmatrix} + \sum_{k=1}^{N} \begin{bmatrix} \alpha_k & \beta_k \\ \gamma_k & \delta_k \end{bmatrix} \begin{bmatrix} \cos kt \\ \sin kt \end{bmatrix} \quad (5)$$

where the real values $\alpha_0$ and $\gamma_0$ are the coordinates of the contour's centroid and $\alpha_k, \beta_k, \gamma_k, \delta_k$ are the Fourier series coefficients of the (periodic) x(t) and y(t) projections, with $t \in [0, 2\pi]$. The contents of the Staib document are fully incorporated herein by reference. For each k in the summation above, the corresponding matrix of coefficients defines a rotated ellipse with a certain phase shift (i.e., starting point position). Thus, contour described by parameters $\theta=(\alpha_0, \gamma_0, \ldots \alpha_k, \gamma_k, \delta_k, \ldots)$ is represented as a combination ellipses. This truncated Fourier series representation accounts exclusively for a few lower spatial frequency components of a contour's shape and, since those structures found in medical images are typically characterized by smooth contours, the number N of ellipses considered in the model is usually small (e.g., from five to ten).

For each hypothetical contour $\theta$, the Staib document identified above considered a corresponding template image $\tau_\theta$ having ones along the contour and zeros elsewhere. So, analogous to matched filtering, the conditional term ln P(I|$\theta$) in Equation (2) is approximated by a correlation between template $\tau_\theta$ and an image $I_e$ of edge strength values obtained from the original image I. This corresponds to integrating the edge strength values along the contour. Then, assuming (a priori) independently distributed Gaussian parameters $\theta_i \sim N(\mu_i, \sigma_i^2)$, the contour estimate $\hat{\theta}$ is the one maximizing $$f(\theta) = -\sum_{i=1}^{2+4N} \frac{(\theta_i - \mu_i)^2}{2\sigma_i^2} + \int_0^{2\pi} I_{e|(x(t;\theta),y(t;\theta))} dt. \quad (6)$$

The Staib document also considered comparing image edge orientation with the contour normal at each pixel. However, for simplicity that discussion is omitted here.

Starting from a user-supplied initial contour, $\hat{\theta}$ is found by performing gradient ascent optimization using a local search technique also known as steepest-ascent hill climbing. For additional information on the steepest-ascent hill climbing technique, see, for example, S. Russell and P. Norwig, Artificial Intelligence: A Modern Approach, $2^{nd}$ ed. Prentice Hall, 2003. The contents of the Russell document are fully incorporated herein by reference. From Equation (6), the gradient vector $\nabla f(\bullet)$ is given by:

$$\begin{bmatrix} \vdots \\ \frac{\partial f}{\partial \theta_i} \\ \vdots \end{bmatrix} = \begin{bmatrix} \vdots \\ \frac{\theta_i - \mu_i}{\sigma_i^2} \\ \vdots \end{bmatrix} + \quad (7)$$

$$\int_0^{2\pi} \frac{\partial I_e}{\partial x}\bigg|_{(x(t;\theta),y(t;\theta))} \begin{bmatrix} \vdots \\ \frac{\partial x(t;\theta)}{\partial \theta_i} \\ \vdots \end{bmatrix} + \frac{\partial I_e}{\partial y}\bigg|_{(x(t;\theta),y(t;\theta))} \begin{bmatrix} \vdots \\ \frac{\partial y(t;\theta)}{\partial \theta_i} \\ \vdots \end{bmatrix} dt.$$

The first vector in Equation (7) on the right side of the equation can be thought of as external forces that keep the contour from deforming too far away from the "expected shape." The external forces are directed towards the means of the parameters with magnitudes inversely proportional to the variances. In the integrand above, the partial derivatives of $I_e$ represent the image forces that deform the contour towards edge locations. Additionally, the smoothness constraint imposed by the model (a truncated Fourier series) can also be regarded as an implicit internal force. A balance of these forces is obtained at a local maximum of the objective function $f(\bullet)$, where the magnitude of the gradient vector (i.e., the resulting net force) goes to zero.

Image analysis is often simplified by looking into invariant properties of shape, as isolated from (varying) pose information. Thus, normalizing the shape representation with respect to scale, rotation and starting point is often necessary. In the case of the elliptical Fourier descriptors discussed above, such normalization can make the gradient terms $$\frac{\partial x(t)}{\partial \theta_i} \text{ and } \frac{\partial y(t)}{\partial \theta_i}$$

in Equation (7) so complex as to discourage further development of the technique.

In this context, the technique described herein is based on the complex Fourier representation:

$$s(t) = x(t) + jy(t) = \sum_{k=-N}^{N} S_k e^{jkt}, \text{ with } j = \sqrt{-1} \quad (8)$$

where each complex number $S_k = a_k + jb_k$, with $a_k, b_k \in \mathbb{R}$, is treated as a rotating phasor with magnitude $|S_k| = \sqrt{a_k^2 + b_k^2}$ and phase angle $$\phi_k = \tan^{-1}\left(\frac{b_k}{a_k}\right).$$

Phasors with positive frequencies (k>0) rotate counterclockwise in the complex plane; phasors with negative frequencies (k<0) rotate clockwise. The frequency index k is the number of complete (360 degree) rotations performed by the corresponding phasor in one circumnavigation of the complete contour. Each pair of descriptors $S_k$ and $S_{-k}$—or, equivalently, the four real numbers $\{a_k, b_k, a_{-k}, b_{-k}\}$—describes an ellipse. The shape is still seen as a combination of N ellipses, centered at $(x_c, y_c) \equiv (a_0, b_0)$. In analyzing exemplary results, four ellipses (N=4) or, equivalently, eight (complex) rotating phasors may be visually sufficient to model the ventricular shapes in the database (described in more detail below). Increasing the number of ellipses may merely produce additional phasors of insignificant magnitude.

By replacing $S_k$ by the real parameters $a_k$ and $b_k$, Equation (8) becomes $$\begin{bmatrix} x(t) \\ y(t) \end{bmatrix} = \sum_{k=-N}^{N} \begin{bmatrix} a_k, -b_k \\ b_k, a_k \end{bmatrix} \begin{bmatrix} \cos kt \\ \sin kt \end{bmatrix} = \begin{bmatrix} a_0 \\ b_0 \end{bmatrix} + \sum_{\substack{k=-N \\ k \neq 0}}^{N} \begin{bmatrix} a_k, -b_k \\ b_k, a_k \end{bmatrix} \begin{bmatrix} \cos kt \\ \sin kt \end{bmatrix} \quad (9)$$

which is very similar in form to the elliptical representation in Equation (5). In fact, Staib document identified that the above parameterization can be obtained from the complex descriptors as:

$$\begin{bmatrix} \alpha_k \beta_k \\ \gamma_k \delta_k \end{bmatrix} = \begin{bmatrix} a_k + a_{-k} & b_{-k} - b_k \\ b_k - b_{-k} & a_k - a_{-k} \end{bmatrix}. \quad (10)$$

The parameterization given by Equations (8) and (9) may be more intuitive and easier to work with, since the computer vision literature predominantly discusses the properties of Fourier descriptors in terms of phasor magnitudes and phase angles, especially when normalizing the parameters with respect to scale, rotation and starting point. This explicit parameterization also makes it simpler to impose shape constraints as compared to topology-adaptive level set techniques which are popularly used in the extraction of complex shapes in medical images.

Metaphorical image forces are responsible for deforming the initial contour towards the desired boundary locations. In one technique, these 2D force vectors may be defined by computing the magnitude of the image's brightness gradient ($I_e=|\nabla I|$) and taking x- and y-derivatives using finite differences. As a consequence, in the interior of homogeneous regions, where $I_e$ is negligible, there are no forces acting on the contour. Thus, in this technique, the user-provided initialization must be close to the desired boundary.

If an edge map is initially available, one technique suggests convolving it with a large derivative of Gaussian masks to spread forces to the interior of homogeneous regions. A similar technique is to assign to each pixel its distance to the closest edge (i.e., chamfering) to create a slope inside regions of non-edge pixels. Then, the distance derivatives, with inverted signs, yield forces that move the contour downhill, towards edges. One technique suggests scaling the force vectors to unit-length so that the contour evolves in small steps, avoiding large "jumps" that may lock onto erroneous edges. Approaches using an initial edge map; however, may be prone to incorrect edge marking, which can cause desired (but weak) edges to be incorrectly deleted. Another technique is to provide a large capture range and to guide the contour inside cavities (e.g., Gradient Vector Flow (GVF)).

Nevertheless, the design of image forces depends on the nature of the data being analyzed and on the desired structures. In segmentation of the LV endocardial boundary from MRI data, large portions of the desired contour often have weak or null contrast due to the interference of papillary muscles (see FIGS. 1A-1D). During heart contraction, papillary muscles move so close to the endocardium as to cause a "blending" effect, in which the desired endocardial boundary vanishes due to poor contrast and limited resolution (see FIGS. 1A-1B). Under these circumstances, there may not be any image forces available to attract the contour to the desired location. Furthermore, the papillary-muscle/blood-pool discontinuities may generate strong edge responses that yield a much smaller contour in the interior of the LV that only partially traces the endocardial boundary, while erroneously incorporating the boundaries of the papillary muscles (see FIGS. 1C-1D). So, even if user initialization is accurate, the contour may deform towards other edges in the vicinity. This suggests that, in these situations, the technique should give more importance to the other forces acting on the contour, as well as to the prior knowledge of the desired boundary captured by the initial contour, and not move too far from that position. Thus, strong edges should have a limited zone of attraction—i.e., the force magnitudes should decay quickly as the distance from the edge increases. This example supports not using the GVF technique to spread image forces too far from strong, but sometimes undesired, edges.

Figure 2C:
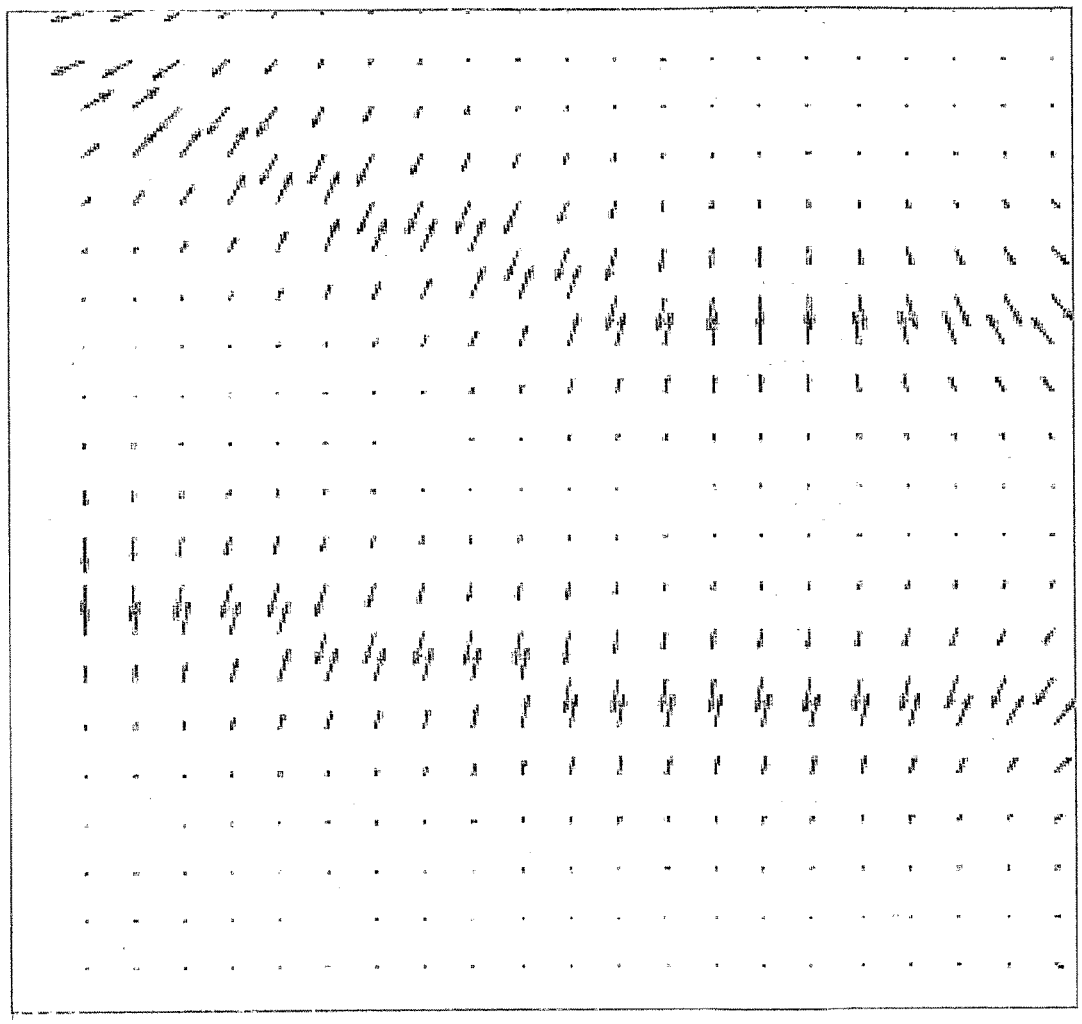

Accordingly, the technique described herein to build an image force field begins with an optimal zero crossing operator (OZCO). For additional information on existing OZCO techniques see, for example, S. Sarkar and K. Boyer, "Optimal infinite impulse response zero crossing based edge detectors," Computer Vision, Graphics and Image Processing, vol. 54, no. 2, pp. 224-243, 1991. The contents of the Sarker document are fully incorporated herein by reference. The zero crossing (ZC) operator tends to give continuous contours that are easier to identify, as compared to gradient-based edge detectors, because non-maximum suppression is not needed. Furthermore, in building image forces, edge thresholding is not needed with the ZC operator. Rather, the pixels to either side of ZC locations are considered. This builds a map in which image contours are indicated by double edge chains, a+1 edge chain along the positive side of the OZCO response and a−1 edge chain along the negative side with zeros elsewhere. This ZC map is illustrated in FIG. 2A. As a byproduct of computing the OZCO impulse response, gray level gradient vectors at each pixel are also obtained. By multiplying each gradient component, $$\frac{\partial I}{\partial x} \text{ and } \frac{\partial I}{\partial y},$$

by the ZC map pixel wise, vectors pointing towards edges with magnitudes indicating edge strength are obtained (see FIG. 2B). Next, given the considerations above, the initial vectors in FIG. 2B are scaled to unit length and the corresponding forces are spread to only a few pixels away from the ZC positions (e.g., 5 pixels). This may be done, for example, by repeatedly convolving a 3×3 averaging mask with the two force images (one for each force component), while preserving the magnitudes of the (unit-) vectors at the ZC positions. A small mask may be used so that only pixels in the same side of an edge, with similarly oriented image force vectors, are averaged. The resulting image force field is shown in FIG. 2C.

To identify the image forces acting on the contour, a number of equally spaced points $t_i \in [0, 2\pi]$, with $1 \leq i \leq L$, are sampled from the contour parameterization. The contour's length L is computed using the approximation:

$$L^2 = 4\pi^2 \sum_{k=-N}^{N} k^2 |S_k|^2 = 4\pi^2 \sum_{k=-N}^{N} k^2 (a_k^2 + b_k^2). \quad (11)$$

The approximation in Equation (11) is adapted from the Schnurrenberger document identified above and is discussed in additional detail below (see Equations (31-37)).

As in Equation (7), the resulting edge-based image forces acting on a contour with descriptor vector S are:

$$F_{img}(S) = \sum_{i=1}^{L} [I_x(x(t_i; S), y(t_i; S))\nabla x(t_i; S) + I_y(x(t_i; S), y(t_i; S))\nabla y(t_i; S)] \tag{12}$$

where $I_x$ and $I_y$ are the two components of the image force vectors and the gradient vectors $$\nabla x(t; S) = \begin{bmatrix} \vdots \\ \frac{\partial x(t; S)}{\partial a_k} + j\frac{\partial x(t; S)}{\partial b_k} \\ \vdots \end{bmatrix} \tag{13}$$

and $$\nabla y(t; S) = \begin{bmatrix} \vdots \\ \frac{\partial y(t; S)}{\partial a_k} + j\frac{\partial y(t; S)}{\partial b_k} \\ \vdots \end{bmatrix},$$

$$k = -N, \ldots, N$$

have its components computed from Equation (9) as:

$$\frac{\partial x(t; S)}{\partial a_k} = \cos kt \tag{14}$$

$$\frac{\partial x(t; S)}{\partial b_k} = -\sin kt$$

$$\frac{\partial y(t; S)}{\partial a_k} = \sin kt$$

$$\frac{\partial y(t; S)}{\partial b_k} = \cos kt.$$

To address the problem of weak contrast and noisy edge maps, some techniques propose the integration of more global appearance information by defining a homogeneity criterion for the region interior to the contour. When segmenting the LV endocardial contour, however, the presence of papillary muscles and a turbulent blood pool cause the region bounded by the contour to be considerably heterogeneous and, therefore, those criteria are not applicable to the technique described herein.

Since the technique described herein also performs tracking over a sequence of images $I_n$, with $n \in \{1, 2, 3, \ldots\}$, the boundary shape and the gray level pattern near it is expected to change only gradually from one image to the next over the cardiac cycle. Thus, besides using the final shape obtained from $I_{n-1}$ to automatically initialize the extraction procedure for $I_n$, the technique described herein can also enforce appearance consistency in the vicinity of the contour between subsequent images. For additional information on existing object tracking techniques see, for example, Y. Zhong, A. Jain, and M.-P. Dubuisson-Jolly, "Object tracking using deformable templates," IEEE Transactions on Pattern Analysis and Machine Intelligence, vol. 22, no. 5, pp. 544-549, May 2000. The contents of the Zhong document are fully incorporated herein by reference.

Figure 3A:
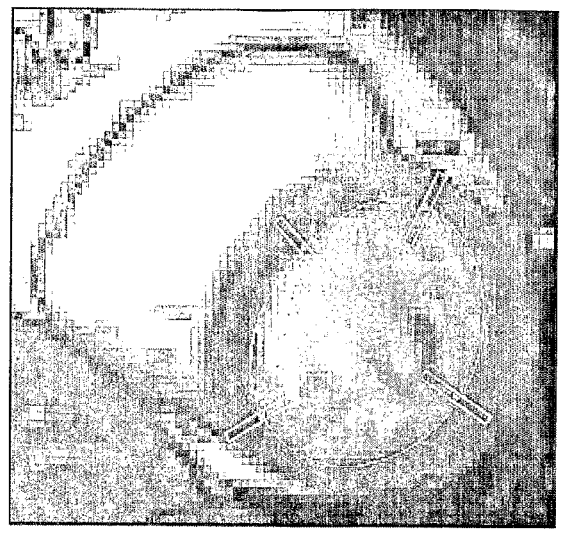

Once the final shape in $I_{n-1}$ is obtained, $W_0$ pixel values along the contour's normal direction are sampled:

$$s\perp(t) = \begin{bmatrix} u(t) \\ v(t) \end{bmatrix} = \sum_{k=-N}^{N} k \begin{bmatrix} a_k & -b_k \\ b_k & a_k \end{bmatrix} \begin{bmatrix} \cos kt \\ \sin kt \end{bmatrix} \tag{15}$$

at a number of locations $t_i \in [0, 2\pi]$, with $1 \leq i \leq L_0$ and $L_0$ the length of the final shape, to build reference texture vectors. FIG. 3A illustrates the extraction of four texture vectors, corresponding to four rows of the reference texture image $T_0$, with $L_0$ rows and $W_0$ columns.

In the subsequent image $I_n$, $T_0$ and the shape extracted from $I_{n-1}$ is used to automatically initialize the algorithm. From the initialization, the final shape in $I_{n-1}$ and the initial shape in $I_n$ have the same starting point (i.e., phase shift) $t_0$. Therefore, point correspondences between the two contours are easily determined. In each iteration of the contour evolution, L extended texture vectors are sampled, each one with W pixel values ($W > W_0$). Thus, the current texture image T has dimensions L×W. Since the contour's length L can vary during contour deformation, we perform linear interpolation to resize $T_0$ L rows, and obtain $T_0'$ with dimensions L×$W_0$. Then, the rows of $T_0'$ and T—the reference and current texture vectors—are matched independently at different overlaps. For each row i, $1 \leq i \leq L$, the position $p_i$ of best match, with $$|p_i| \leq \frac{W - W_0}{2},$$

is used to move the corresponding contour point $t_i$ inwards or outwards along its normal direction. This is done by adding sign $$(p_i) \frac{s\perp(t_i)}{\|s\perp(t_i)\|}$$

to the edge-based forces acting on $t_i$.

The Euclidean distance is used as the matching measure to define each $p_i$. This can be seen as assuming each texture sample to be a random vector following a Gaussian distribution whose mean is defined by the reference vector, with equal variances for the independent components. Thus, minimizing the Euclidean distance is equivalent to maximizing the likelihood of each texture sample in the current image.

In one embodiment, for example, $W_0=10$ and $W=20$ settings are established to track the endocardial boundary and $W_0=20$ and $W=30$ settings are established when tracking the epicardial boundary. Smaller values may be set for $W_0$ and $W$ when tracking the endocardial boundary because, for cardiac ventricular imaging, the inner region defined by the contour is smaller, while the contrast along the boundary is relatively stronger, as compared to the epicardial boundary.

Figure 3B:
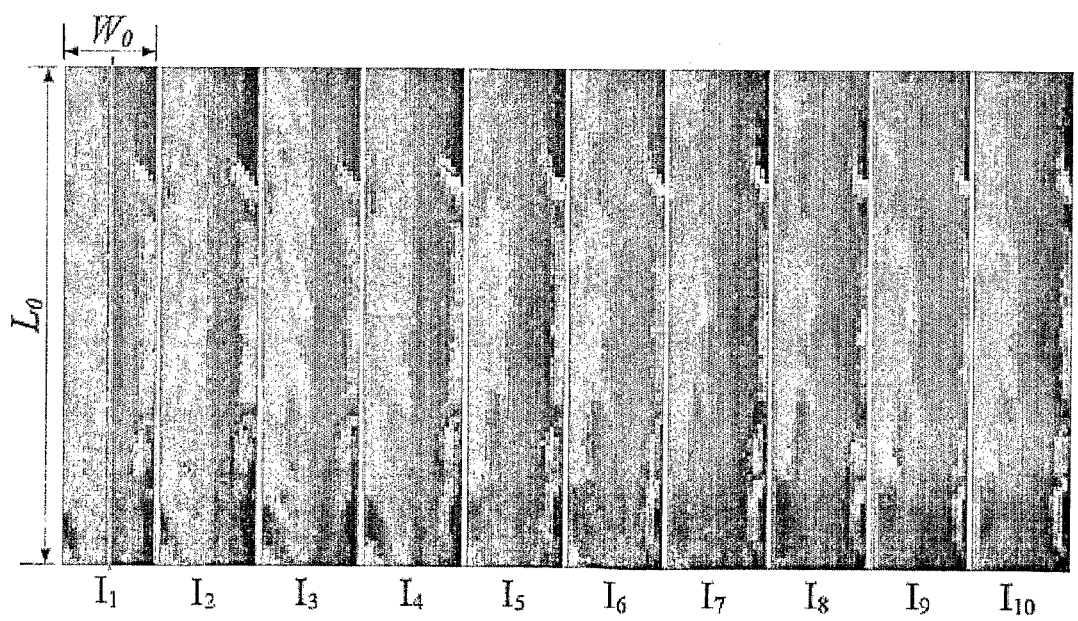

The use of the texture vectors decreases the dependence on edge maps, which are typically noisy. This approach, in fact, takes advantage of the gradually changing gray-level pattern of papillary muscles to guide contour deformation during tracking—FIG. 3B illustrates a set of ten (10) reference texture images, built from final contours in ten (10) consecutive phases of a cardiac cycle, stacked alongside one another. The cost of doing so is the requirement of a more precise user initialization. However, as shown in FIG. 3A, the user is usually asked for four points on the desired boundary in just one image of the MRI sequence, to define an accurate delineation of the initial endocardial or epicardial shape—other points and all texture vectors are generated automatically. However, depending on the shape of the ventricle, the user may be asked for as few as two points or as many as ten points. Finally, we note that the initialization provides high-level knowledge not only about texture, but also on the expected shape for processing the subsequent image.

In many applications of deformable models, the integration of additional constraints on the contour's deformation, using prior knowledge about the task to be performed, is required. When performing non-rigid object tracking over an MRI sequence, if data evidence in image $I_n$ is missing or corrupted by imaging artifacts, it is reasonable to give more importance to the contour previously extracted from $I_{n-1}$, $$S_k^{(n-1)} = a_k^{(n-1)} + jb_k^{(n-1)}, \quad k = -N, \ldots, N \tag{16}$$

and to consider as unlikely any large departure from this initial shape. That is, given the automatic initialization of the shape descriptors extracted from $I_{n-1}$, detection of a "very similar" shape in $I_n$ is expected.

One way of introducing this bias towards an expected shape is by considering a prior parameter distribution in the definition of external forces. Similar to the approach in the Staib document identified above, the Fourier descriptors may be assumed to be independent Gaussian random variables. In the Staib document, the probability density functions are estimated from a set of manual segmentations provided by experts, for a single image per patient. For tracking, this would become even more burdensome since 20 manual segmentations (throughout the cardiac cycle) would be required, per patient, for a single-slice, short-axis cine MRI sequence. Therefore, the technique described herein seeks to automate this task as much as possible, while still incorporating useful, user-provided information.

Another departure from the Staib document is that the technique described herein considers a prior distribution for the scale-normalized Fourier descriptors $$\frac{S_k}{|S_1|}.$$

Since the heart's movement is characterized mainly by its contraction and expansion, subsequent ventricular shapes extracted for a complete cardiac cycle are assumed to be "similar" up to a scaling factor. This also means that the technique described herein may require stronger image evidence in order to allow larger departures from the expected shapes. In the context of intraventricular dyssynchrony detection, this may reduce the number of false positives arising from missing information or imaging artifacts.

When processing $I_n$, we assume the scale-normalized shape descriptors $$\alpha_k^{(n)} = \frac{a_k^{(n)}}{|S_1^{(n)}|}$$

and $$\beta_k^{(n)} = \frac{b_k^{(n)}}{|S_1^{(n)}|}$$

are distributed as:

$$\alpha_k^{(n)} \approx N\left(\alpha_k^{(n-1)}, \frac{\sigma^2}{|k|}\right), k \notin \{0, 1\} \text{ and} \tag{17}$$

$$\beta_k^{(n)} \approx N\left(\beta_k^{(n-1)}, \frac{\sigma^2}{|k|}\right), k \notin \{0, 1\} \tag{18}$$

By definition, $|\alpha_k| < 1$ and $|\beta_k| < 1$ since the magnitude of $S_1$ is always the largest among all the shape descriptors and is usually considered to be a measure of scale.

At any tracking step $n \in \{2, 3, \ldots, 20\}$, the mean values are given by the shape obtained from $I_{n-1}$. The (diagonal) covariance matrix, used to limit departures from the expected shape, is the same for all $I_n$. It is defined in terms of the user-specified constant $\sigma^2 \in [0,1]$, which is empirically set using a few test cine MRI sequences—or, alternatively, the variances can be estimated from manual segmentations when those are available.

Note that: 1) smaller variances may be enforced for higher frequency components, whose magnitudes are expected to be smaller; 2) although $\sigma^2$ is set so as to suppress large shape deformations from $I_{n-1}$ to $I_n$ shapes extracted from non-consecutive images may still present considerable differences; and 3) the distributions above are assumed for $k \notin \{0,1\}$. The first positive frequency component (k=1) captures the changes in scale among the different phases of the cardiac cycle and is only adjusted by the image forces defined above. Also, there is no need to impose any additional constraints on the centroid (DC component, k=0) because, with gradient ascent optimization, the net deformation force acting on the evolving contour will make it converge to the closest local optimum, and the resulting shape is not allowed to differ considerably from the initial one, the expected shape. Furthermore, early experimental results indicated that, in the case of a dyssynchronous LV, the centroid may translate in a different pattern over the cardiac cycle, as compared to a non-dyssynchronous LV.

Finally, given the initial shape descriptors $S^{(n-1)}$, the external forces act to maximize the log likelihood of the descriptors $\alpha^{(n)}$ and $\beta^{(n)}$, $$\ln P(\alpha^{(n)}, \beta^{(n)} | S^{(n-1)}) = \tag{19}$$

$$-\sum_{\substack{k=-N \\ k \notin \{0,1\}}}^{N} \frac{(\alpha_k^{(n)} - \alpha_k^{(n-1)})^2}{2\sigma^2 |k|^{-1}} - \sum_{\substack{k=-N \\ k \notin \{0,1\}}}^{N} \frac{(\beta_k^{(n)} - \beta_k^{(n-1)})^2}{2\sigma^2 |k|^{-1}}$$

and are given by the gradient vector:

$$F_{ext}(S) = \nabla \ln P = \begin{bmatrix} \vdots \\ \frac{\partial \ln P}{\partial a_k} + j \frac{\partial \ln P}{\partial b_k} \\ \vdots \end{bmatrix}, k = -N, \ldots, N \tag{20}$$

where $S = S^{(n)}$ and the gradient components are:

$$\frac{\partial \ln P}{\partial a_k} = -\frac{|k|}{\sigma^2}(\alpha_k^{(n)} - \alpha_k^{(n-1)}) \frac{\partial \alpha_k^{(n)}}{\partial a_k} = -\frac{|k|}{\sigma^2} \frac{(\alpha_k^{(n)} - \alpha_k^{(n-1)})}{|S_1|} \tag{21}$$

$$\frac{\partial \ln P}{\partial b_k} = -\frac{|k|}{\sigma^2}(\beta_k^{(n)} - \beta_k^{(n-1)})\frac{\partial \beta_k^{(n)}}{\partial a_k} = -\frac{|k|}{\sigma^2}\frac{(\beta_k^{(n)} - \beta_k^{(n-1)})}{|S_1|} \quad (22)$$

for $k \notin \{0,1\}$. Note that the higher the absolute value of k (frequency index) and the lower the user-defined parameter $\sigma^2$, the stronger the external forces acting on the corresponding descriptor. The descriptors $S_0$ and $S_1$ are not affected, $$\frac{\partial \ln P}{\partial a_0} = \frac{\partial \ln P}{\partial b_0} = \frac{\partial \ln P}{\partial a_1} = \frac{\partial \ln P}{\partial b_1} = 0 \quad (23)$$

For example, after a few test sequences using the technique described herein, $\sigma^2$ was set to 0.005. Small changes in this value had little effect on the results. However, it appears that if $\sigma^2$ is set too low, the algorithm will tolerate only translations and changes in scale during tracking.

Figure 4A:
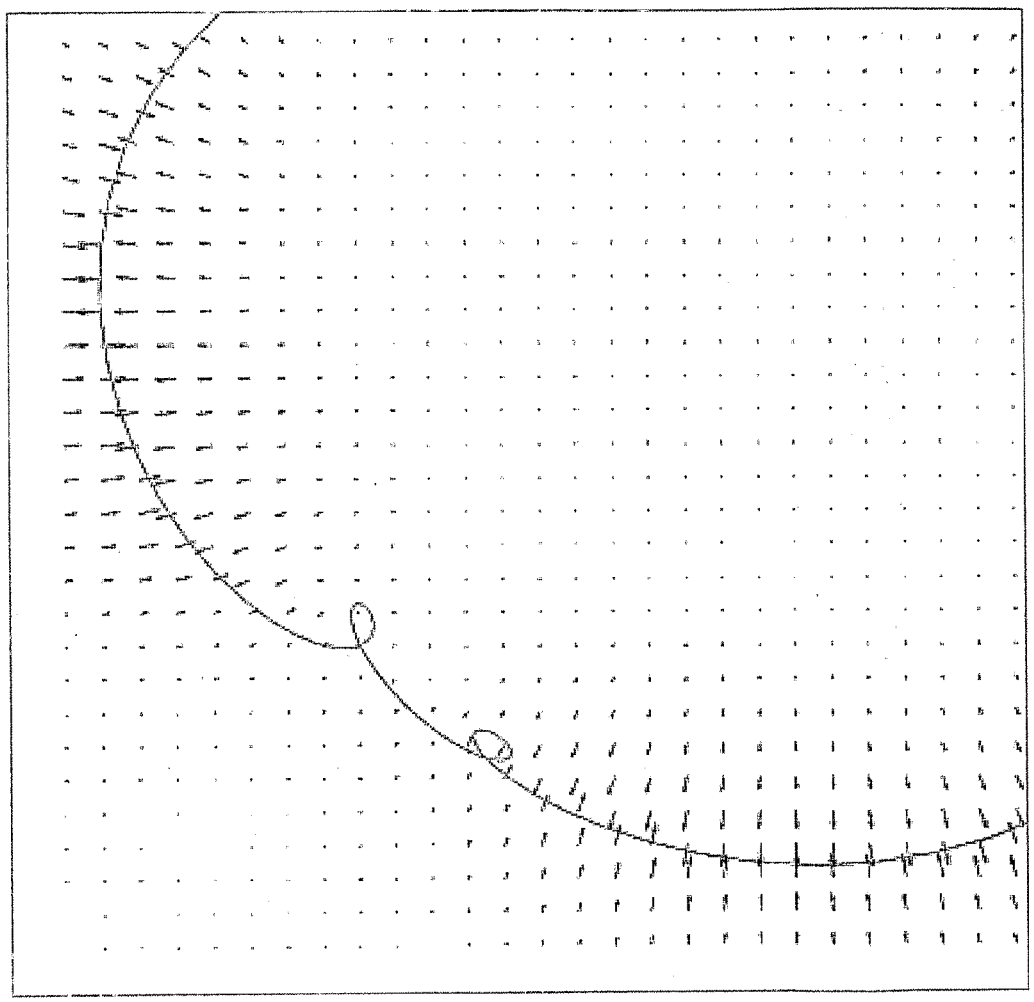

As previously observed, for example, in the Schnurrenberger document identified above and G. Székely, A. Kelemen, Brechbühler, and G. Gerig, "Segmentation of 2D and 3D objects from MRI volume data using constrained elastic deformations of flexible Fourier contour and surface models," Medical Image Analysis, vol. 1, no. 1, pp. 19-34, 1996, despite the implicit smoothness constraint given by the Fourier series parameterization: 1) the model can still generate sharp corners or 2) the contour can cross itself as shown in FIG. 4A. Therefore, an additional internal force may be used to regularize the evolution of the deforming contour. Like the Schnurrenberger document, the contents of the Szeékely document are fully incorporated herein by reference. In the Székely document, for example, the two cases above are addressed by constraining the contour's curvature derivative. This, however, makes gradient ascent computation considerably more complex.

Figure 4B:
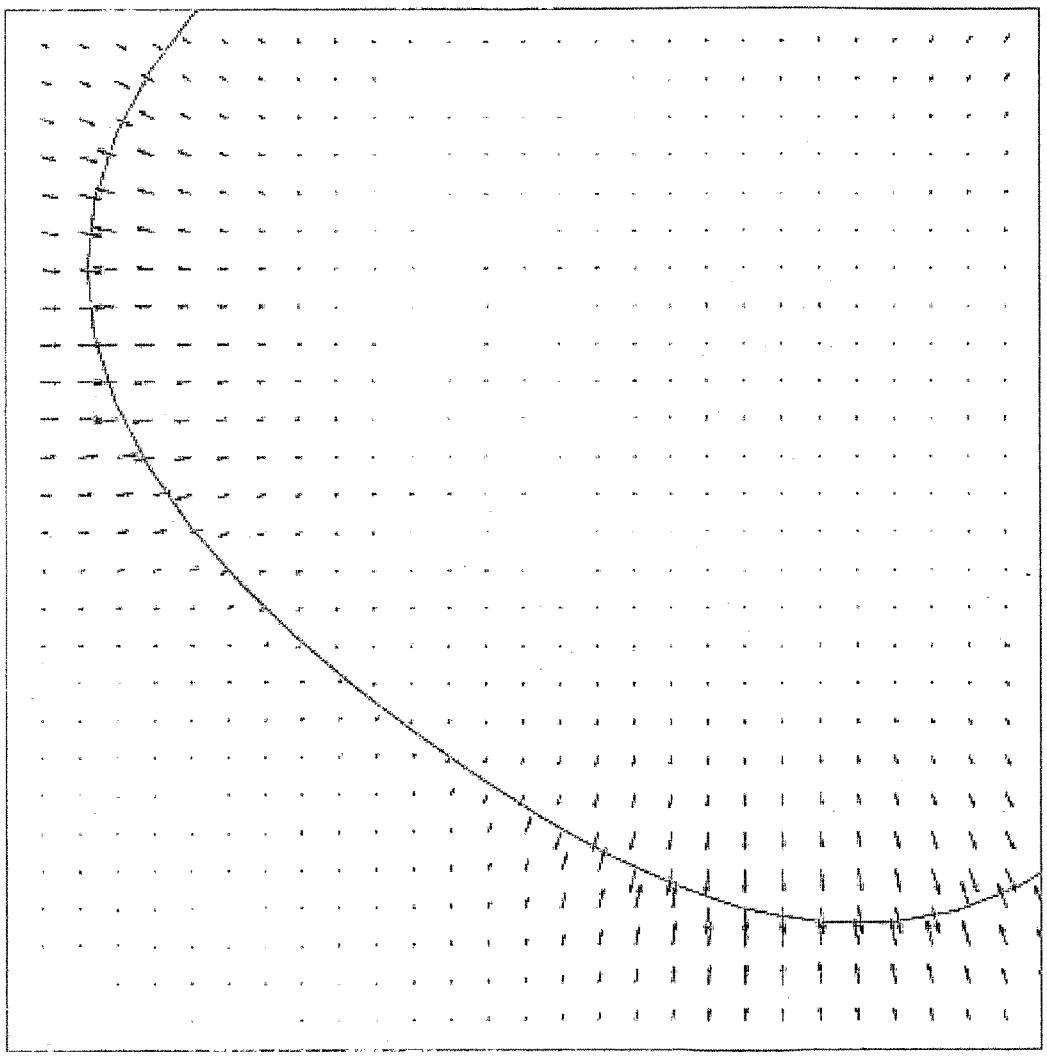

Therefore, the technique described herein does not constrain the bending of the contour—this, in a certain way, is addressed by the external force defined above. Rather, an additional internal (tension) force is defined to avoid self-crossings. First, it may be noted that even when the contour crosses itself, convergence to the correct edge location is usually obtained. Also, at those locations, the net image forces are relatively small since the forces on either side of the edge will cancel. Thus, it is possible to apply an internal force (i.e., a tension force) that seeks to minimize the contour's length but weaker than the image forces. In this way, the contour is still allowed to deform under the influence of image forces, while the internal (tension) force ensures there are no self-crossings as the contour approaches the desired boundary (see FIG. 4B).

Unlike other snake-like methods which compute tension forces based on finite differences between the contour's points, the technique described herein is analytically computed using the approximation for the contours squared length $L^2$ given in Equation (11). To make the magnitude of the internal tension force independent of contour scale, the descriptor vector $$\frac{S}{S_1}$$

is considered in computing $L^2$. Then, at a given point of the contour deformation process, the internal force is:

$$F_{int}(S) = -\nabla(L^2) = -\begin{bmatrix} \vdots \\ \frac{\partial(L^2)}{\partial a_k} + j\frac{\partial(L^2)}{\partial b_k} \\ \vdots \end{bmatrix}, k = -N, \ldots, N \quad (24)$$

where:

$$\frac{\partial(L^2)}{\partial a_k} = 8\pi^2 \frac{k^2 a_k}{a_1^2 + b_1^2}, k \notin \{0, 1\} \quad (25)$$

$$\frac{\partial(L^2)}{\partial b_k} = 8\pi^2 \frac{k^2 b_k}{a_1^2 + b_1^2}, k \notin \{0, 1\} \quad (26)$$

$$\frac{\partial(L^2)}{\partial a_1} = 8\pi^2 \frac{-a_1}{(a_1^2 + b_1^2)^2} \sum_{k \notin \{0,1\}} k^2(a_k^2 + b_k^2) \quad (27)$$

$$\frac{\partial(L^2)}{\partial b_1} = 8\pi^2 \frac{-b_1}{(a_1^2 + b_1^2)^2} \sum_{k \notin \{0,1\}} k^2(a_k^2 + b_k^2) \quad (28)$$

By simply dropping the $8\pi^2$ constant, the resulting internal force was found, empirically, to be relatively weaker than the image forces.

Two additional observations include: 1) since the contour length is to be minimized, the internal force updates the current parameter values in the opposite direction of the gradient vector above (i.e., the sign of internal force is inverted); and 2) since the gradient components for the $k^{th}$ positive and negative frequencies have magnitudes proportional to $k^2$, the effect of this force can be (intuitively) considered as redistributing the energy from higher to lower frequency Fourier descriptors.

The deformable model technique described above may be applied to extracting and tracking the LV endocardial and epicardial boundaries. The input MRI data for each patient corresponds to one slice of the 3D short-axis data over a complete cardiac cycle. This sequence of, for example, 20 images is acquired so that the initial heart phase corresponds to the end of diastole (i.e., a ventricle fully expanded).

As already mentioned, in just one image of the sequence, the user is required to provide an initial contour by clicking over a few points along the boundary to be tracked. Usually only four points are enough to define an accurate delineation of either the endocardial or the epicardial shapes. Since the first image in the sequence depicts a fully expanded ventricle, papillary muscles are often clearly distinguishable and proper initialization for tracking the endocardial boundary is also made easier. The user-supplied contour is then used to initialize tracking in the subsequent image.

Given the MRI data and the initial vector of shape descriptors S and the corresponding reference texture vectors, an exemplary objective is to maximize the contour's likelihood function, here denoted $f(S)$, as discussed for Equations (2-4). During contour evolution, the gradient of $f(\bullet)$ corresponds to the net deformation force acting on S, $$\nabla f(S) = F_{img}(S) + F_{ext}(S) + F_{int}(S) \quad (29)$$

with forces defined as above. While $\nabla f(S)$ has significant magnitude, we iteratively update S as $$S = S + \alpha \nabla f(S) \quad (30)$$

with a=0.25, a small constant giving the size of each step in the direction of the gradient. When the magnitude of $\nabla f(S)$ is negligible, a balance of forces is reached. The final shape S and a new set of reference texture vectors are then used to initialize the process for the next image.

Tracking can be performed in either direction in the (periodic) time sequence. In fact, it is more efficient to perform tracking in the two directions and stop when a common point, or agreement, is reached. This can be seen as tracking two different, complementary (sub) sequences, each approximately half the length of the original one. This reduces the chances of propagating errors. Also, by starting the two (independent) tracking processes from a fully expanded LV, going in opposite directions in time, the ventricle appears to be predominantly contracting. This limits the propagation of errors caused by papillary muscles, whose interference is more difficult to avoid during expansion, when these muscles may stay between the endocardium and the evolving contour.

Because "expansion" may still appear in the last images of each subsequence, the two subsequences may be defined to have five images in common, and a merging point may be defined as that image for which the two tracking processes give the most similar shape parameters. For example, the similarity measure used here may be the Euclidean distance between the magnitudes of the complex Fourier descriptors, often employed in shape matching using this kind of parameterization. Since the systole is faster than the diastole, the subsequences are defined by the image indexes n=1, 2, ..., 10, for systole, and n=20, 19, ..., 6, for reverse diastole. Finding the best merging point n E [6,10] helps to reject incorrect segmentations occurring during "expansion".

Figure 5A:
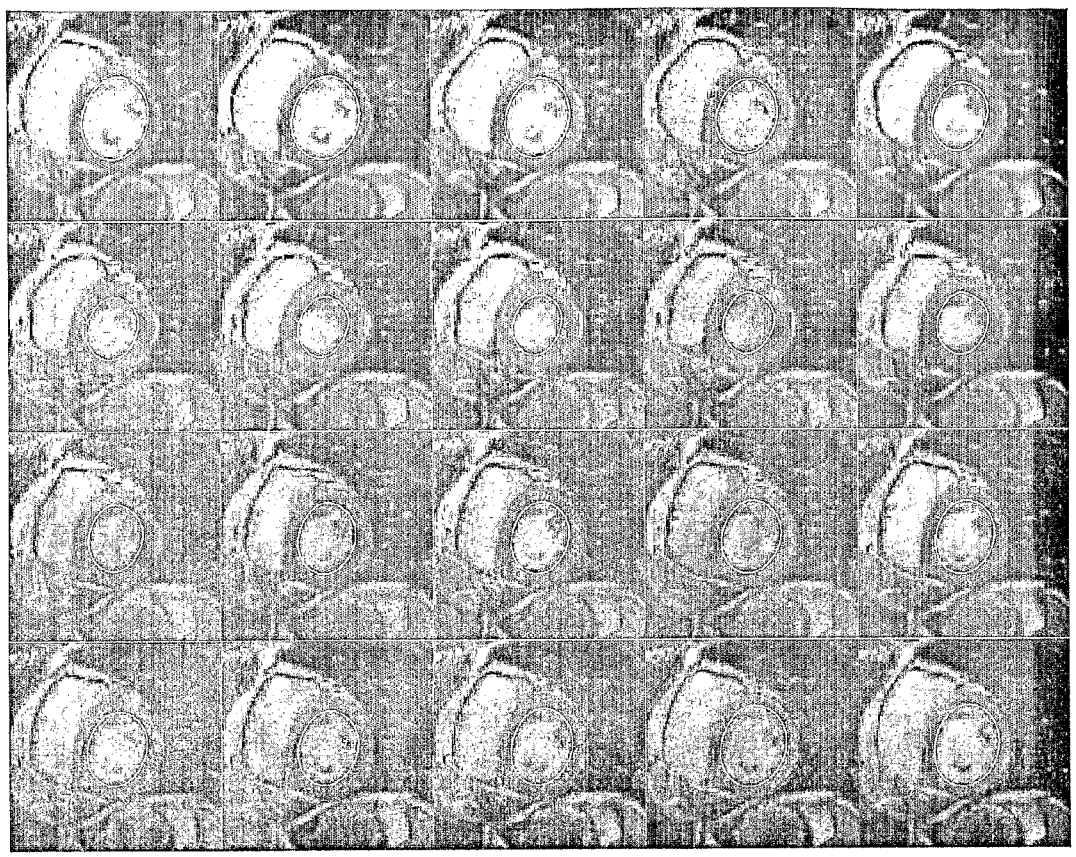
Figure 5B:
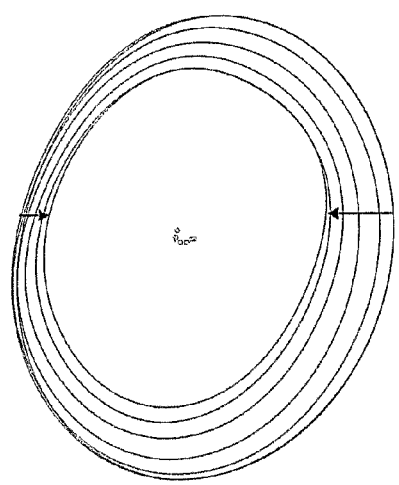
Figure 5C:
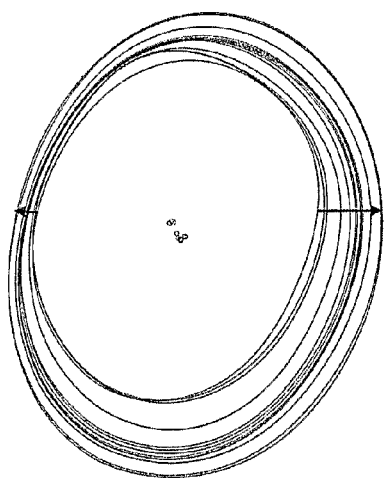
Figure 6A:
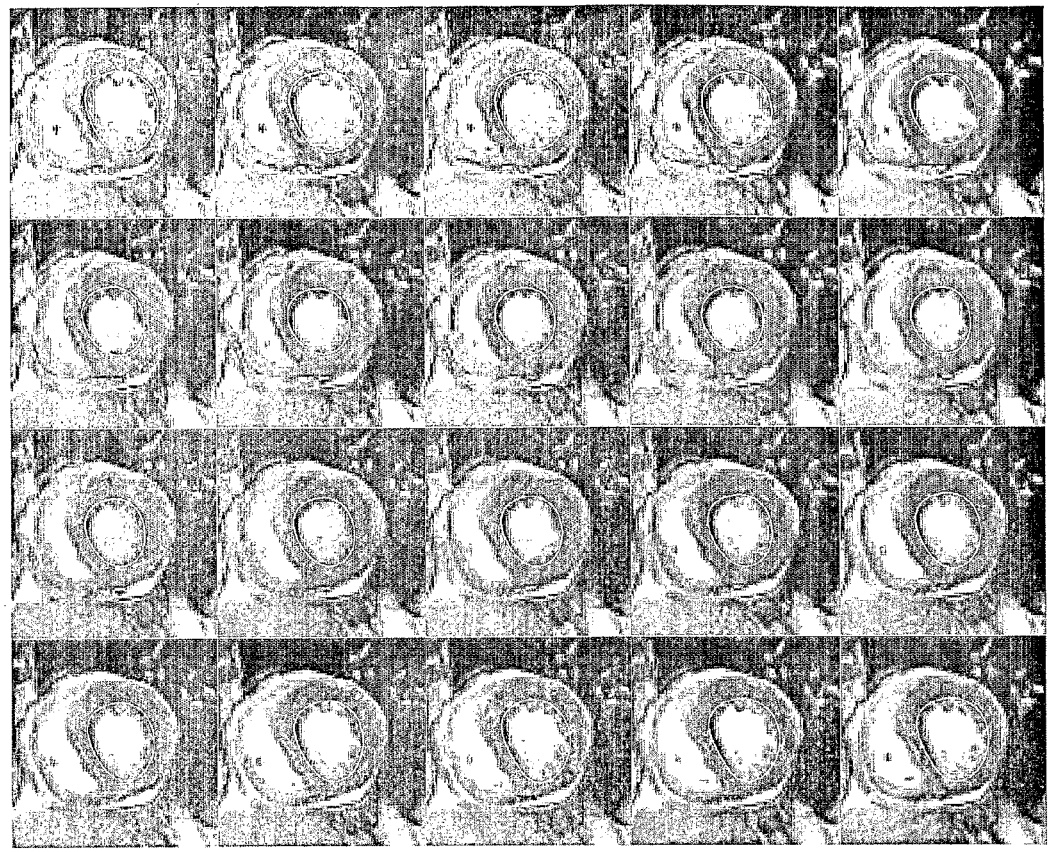
Figure 6B:
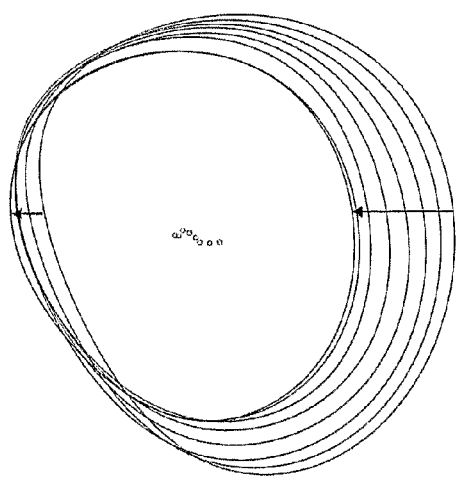
Figure 6C:
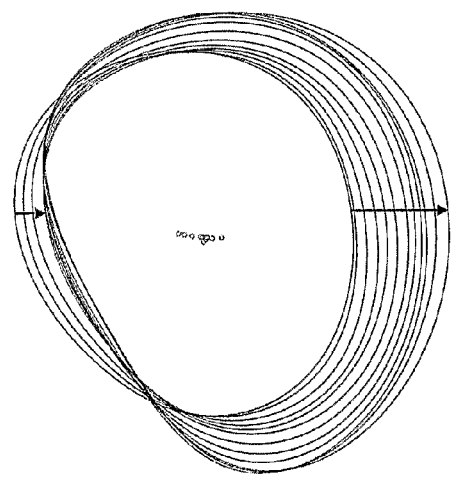

FIGS. 5 and 6 show exemplary results of extracting and tracking the LV endocardial boundary for one normal LV and one dyssynchronous LV, respectively. Overlays of all shapes extracted during systole and diastole, with corresponding centroids, are also shown. FIGS. 7 and 8 show exemplary results for tracking the epicardial boundary for the same hearts shown in FIGS. 5 and 6.

In conjunction with the technique described herein, the detection of intraventricular dyssynchrony in the LV may be formulated as a problem in statistical pattern recognition. Starting from a number of training samples, each one describing contraction and relaxation of an LV during a complete cardiac cycle and acquired from either a dyssynchronous or non-dyssynchronous LV, a statistical analysis to learn a linear classifier for these two classes of interest may be performed.

Initially, the deformable model technique described herein may be applied to extract, independently, the endocardial and epicardial boundaries of the LV from, for example, a number of short-axis cine MRI sequences. From the resulting shape parameterizations, each sample cardiac cycle may be represented as a vector constructed by concatenating the Fourier shape descriptors extracted from the 20 images in a sequence. If only endocardial shapes are considered, for instance, with each shape defined by a combination of four ellipses (eight rotating phasors), plus a centroid, then the result characterization of the LV wall motion during a complete cardiac cycle may be represented by a vector with 20×9=180 complex descriptors. When epicardial shapes are also considered, each vector may include 360 complex components. Each sample cardiac cycle may therefore be represented as a point in a high-dimensional, spatio-temporal shape space. An exemplary goal is to analyze how the samples (points) for the two classes being considered are distributed in this feature space. For example, intraventricular dyssynchrony may be detected by identifying different deformation patterns during a cardiac cycle. The different deformation patterns may be associated with different clusters of points in the spatio-temporal shape space.

Since the MRI sequences in the database may depict the LV in different poses (i.e., at varying locations, scales and rotations), each sample undergoes a normalization step to remove any useless or misleading pose information from the shape descriptors.

Normalization of Fourier descriptors is often performed in shape matching applications to provide invariance to translation, scaling, rotation, and the contour's starting point. The goal is to remove pose information, which does not characterize intrinsic shape, from the descriptors. In statistical shape analysis, normalization is seen as aligning the shape samples to a common pose, before computing the statistics of corresponding shape components. The samples may be assumed to already be aligned in time—that is, the initial shape always corresponds to a fully expanded LV—and that this alignment is performed either by the user or as part of the image acquisition protocol.

To analyze a single shape, translation invariance is typically accomplished by discarding the shape's centroid, or DC component (k=0), considering only the other descriptors. Since a sequence of shapes throughout the cardiac cycle is analyzed in the technique described herein, and since the relative translation of the centroids may carry useful information for intraventricular dyssynchrony detection, a slightly different normalization may be adopted. For example, the centroid of the initial shape may be subtracted from the other centroids in the cycle. This preserves the relative centroid displacements with respect to the initial centroid, which is taken to be zero and can then be discarded.

When matching a single shape, scale invariance is typically obtained by dividing (scaling) the descriptors by the magnitude of the first positive component, $|S_1|=\sqrt{a_1^2+b_1^2}$, which is the largest component. In the technique described herein, this value may be obtained from the initial shape, a fully expanded ventricle, and used to scale the subsequent shapes in the sequence, including the normalized centroids of the subsequent shapes.

To provide invariance with respect to rotation and to the contour's starting point, a common approach is to consider the magnitudes of the complex descriptors, the magnitude spectrum, while neglecting the phase spectrum, which captures the information on rotation and starting point. Although the phase spectrum represents useful shape information, the magnitude-spectrum has been used successfully in shape analysis and recognition.

Another approach is to normalize the phase spectrum by: 1) considering the shape's best approximating ellipse, defined by the first positive and negative frequency components (k=±1); 2) aligning its major axis to the real coordinate axis in the complex plane (i.e., the horizontal direction in the image plane); and 3) applying a phase shift to the starting point so that it also starts on the (positive) real axis. This procedure, however, may not suffice to provide an adequate shape normalization, since there is an ambiguity of 180 degrees in the resulting normalized ellipse. For instance, in the case of an ellipse approximating an LV endocardial shape, aligning its major axis to the horizontal direction in the image plane may not guarantee that other structures, such as the RV, will always be in the same relative location (e.g., always above the LV) due to this 180 degree ambiguity.

For the classifier technique described herein, both approaches for rotation and starting point normalization were considered. For example, results obtained when using the magnitude spectrum were compared to those obtained when also using the normalized phase spectrum. To deal with the 180 degree ambiguity in the second approach, the user was asked to mark a single reference point anywhere inside the RV, to indicate its location.

A pattern recognition system may operate in two modes: 1) training (i.e., learning) and 2) classification (i.e., testing). In training, after the preprocessing stage of the input sample feature vectors—what corresponds here to the normalization of the Fourier shape descriptors—a feature extraction procedure is applied to determine a new low-dimensional feature space that best represents the input data or best discriminates between samples of different classes. For example, the magnitude of the Fourier descriptors may be used, rather than the real-imaginary representation, to create a representation of the input data in a lower dimensional feature space. Then, a classification criterion is used to partition the resulting feature space. For additional details on pattern recognition systems, see, for example, the Jain 2 document which is cited and incorporated by reference above.

PCA is a well-established technique for dimensionality reduction that is often used in statistical pattern recognition. PCA includes learning a compact representation for a data set by projecting it onto a lower dimensional subspace that captures its most representative features. This is done by fitting a multidimensional Gaussian distribution, or a hyperellipsoid, whose probability distribution is completely determined by the mean sample vector and the sample covariance (or total scatter) matrix. The extracted features, the principal components, are the vectors defining the largest axes of the hyperellipsoid. These are the directions capturing most of the variance in the initial feature space. The principal components are computed as the eigenvectors of the covariance matrix defining the Gaussian distribution. The associated eigenvalues give the variance in each direction. The resulting projection matrix has the first few eigenvectors associated with the largest eigenvalues as columns, so that the sum of these values corresponds (typically) to about 90% of the total variance. PCA can also include finding the p basis vectors that minimize the representation error of a d-dimensional data set, with p<d, in a least-squares sense. For additional information on PCA, see, for example, the Duda and Fukunaga documents which are cited and incorporated by reference above.

Another commonly used technique for dimensionality reduction is Fisher's LDA. Unlike PCA, LDA is a supervised technique that requires a class label to be provided for each sample. Another difference is that the lower dimensional subspace found by LDA is determined by the data's most discriminative features. LDA assumes that the samples in each class follow a Gaussian distribution and that all these distributions share the same covariance matrix $S_w$ and differ only in their means (i.e., the data are homoscedastic). The idea is to find a projection to a low-dimensional subspace in which the Euclidean distance between samples in different classes is maximized, while the distance between samples in the same class is minimized. These measures are captured, respectively, by the between-class scatter matrix $S_b$ and the within-class scatter matrix $S_w$ as defined in the Duda and Fulunaga documents. The resulting projection matrix is built similarly to PCA, but has the leading eigenvectors of matrix $S_w^{-1}S_b$ as its columns. This matrix has at most C−1 non-zero eigenvalues, where C is the number of classes in the data set. For instance, the most discriminating subspace for a two-class problem is defined by a single vector (i.e., a line). For additional information on LDA, see, for example, the Duda and Fukunaga documents which are cited and incorporated by reference above.

When the number of samples is relatively small, as compared to the dimension of the sample space, matrix $S_w$ may be singular and it may not be possible to compute $S_w^{-1}S_b$. For this reason, an initial PCA step is often applied to project the training data onto an intermediary subspace in which LDA is performed. This PCA step also discards small perturbations in the initial feature values that may mislead classification. The resulting projection matrix is then the product of the matrices given by PCA and LDA. This method may be referred to as PCA+LDA and is the method used in training the intraventricular dyssynchrony classifier. For additional information on PCA+LDA, see, for example, Zhu and Martinez, Selecting Principal Components in a Two-Stage LDA Algorithm, Proceedings of the IEEE Conference on Computer Vision and Pattern Recognition, Vol. 1, pp. 132-137, 2006. The contents of the Zhu document are fully incorporated herein by reference.

Finally, classification is performed by projecting a (normalized) test sample, not in the training set, onto the low-dimensional classification space, using the matrix obtained as above, and assigning the label of the nearest class mean. For LDA, this criterion is optimal in the sense of minimizing the Bayes risk (with uniform costs), assuming the classes are Gaussian and homoscedastic.

The short-axis, cine MRI database used in our experiments comprises 33 studies: samples labeled as dyssynchronous correspond to 14 patients presenting intraventricular dyssynchrony in the LV; samples labeled as non-dyssynchronous correspond to ten patients with normal hearts plus another nine patients with dysfunctions other than intraventricular dyssynchrony. To insure development of a classifier that identified true dyssynchrony as opposed to any abnormal ventricular contraction, samples with segmental wall motion abnormalities due to previous myocardial infarction, as well as those showing dilated cardiomyopathy without dyssynchrony, were included among the non-dyssynchronous samples. For each case, the LV activation pattern was labeled dyssynchronous or non-dyssynchronous based on a visual assessment of each short-axis sequence by the consensus review of two qualified cardiologists.

Current selection of patients for CRT is based on QRS duration ($\geq$130 ms) and LV ejection fraction ($\leq$35%) on electrocardiography. On the 33 studies, these current determinants of patient eligibility for CRT provided a classification accuracy of 62.5%. Due to the small number of samples currently available for each class, to evaluate our classifier, designed using PCA+LDA, we used the leave-one-out cross-validation method. Here, we analyzed the 33 classifications resulting from training the classifier with 32 samples and then testing it on the sample that was left out.

As already mentioned, our deformable model technique was first applied to each study above to track the LV endocardial and epicardial boundaries, independently, over a complete cardiac cycle. The resulting contours were used to build the samples for training and evaluating the classifier. We performed classification using the endocardial and epicardial shapes separately, and also in combination. We also experimented with different data representations corresponding to combining the magnitude spectrum, the phase spectrum, and the real and imaginary parts of the complex Fourier descriptors. All these representations corresponded to a concatenation of real numbers computed from the shape descriptors obtained for a complete cardiac cycle. Although the phase and the magnitude spectra capture shape information similar to that captured by the real and the imaginary parts, the existence of a nonlinear mapping between these two representations can provide different results regarding separation of the classes in the initial feature space, since our classifier can only project the data using linear combinations of the initial features.

Table 1 identifies classification performance for different boundary information and data representations. Accuracy corresponds to the best classification rate obtained by varying the percentage of the total variance captured by the intermediary PCA space (see also FIG. 9).

TABLE 1

| | Boundaries | Representation | Dimensions | Accuracy |
|---|---|---|---|---|
| 1 | Endocardial | magnitude spectrum | 180 | 90.9% |
| 2 | Endocardial | magnitude and phase spectra | 360 | 69.7% |
| 3 | Endocardial | real and imaginary parts | 360 | 90.9% |
| 4 | Endocardial | magnitude, phase, real imaginary | 720 | 69.7% |
| 5 | Epicardial | magnitude spectrum | 180 | 81.8% |
| 6 | Epicardial | magnitude and phase spectra | 360 | 69.7% |
| 7 | Epicardial | real and imaginary parts | 360 | 84.8% |
| 8 | Epicardial | magnitude, phase, real, imaginary | 720 | 66.7% |
| 9 | Endo & Epicardial | magnitude spectrum | 360 | 90.9% |
| 10 | Endo & Epicardial | magnitude and phase spectra | 720 | 66.7% |
| 11 | Endo & Epicardial | real and imaginary parts | 720 | 87.9% |
| 12 | Endo & Epicardial | magnitude, phase, real, imaginary | 1440 | 66.7% |

Figure 9A:
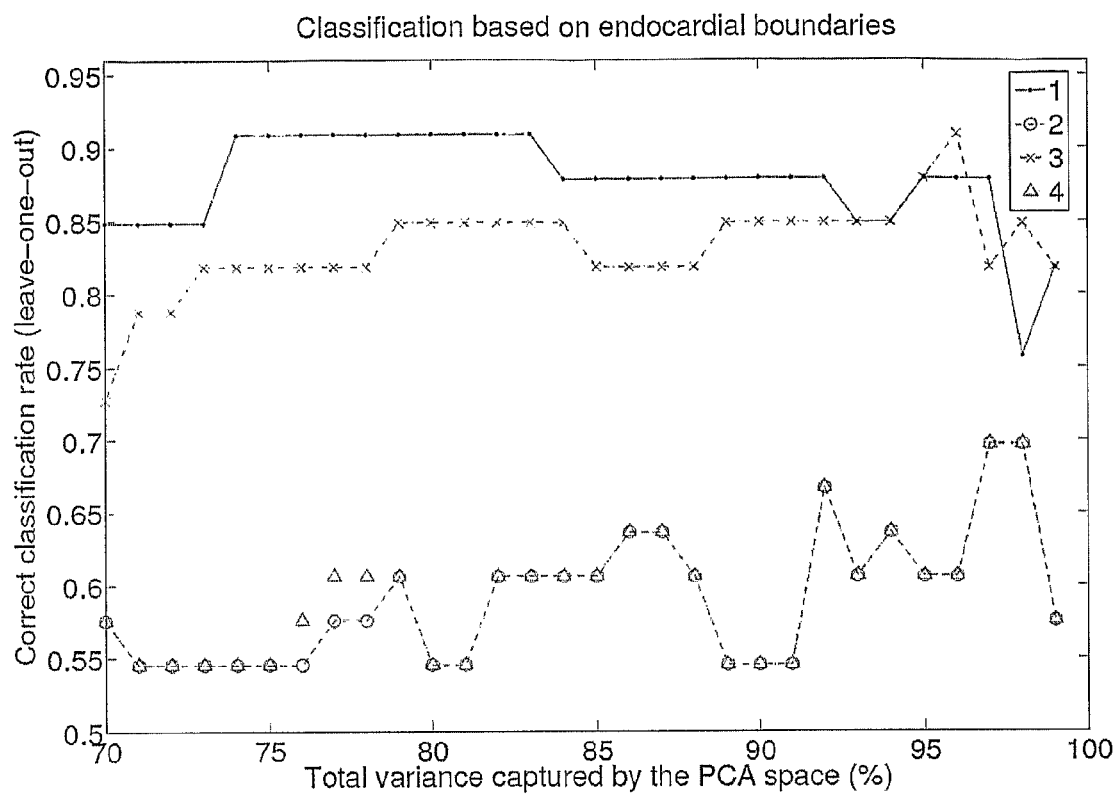
FIG. 9 shows the correct classification rates as a function of the variance captured by the intermediary principal component analysis (PCA) space for the different boundary information and data representations in Table 1.
Figure 9B:
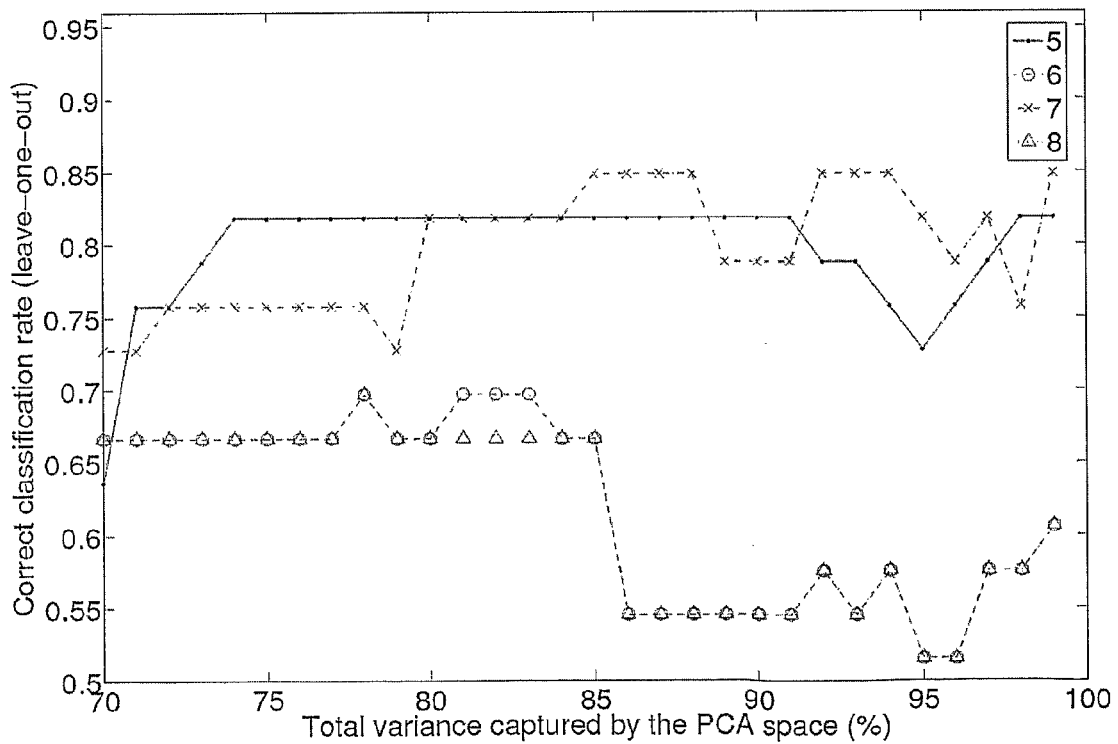
Figure 9C:
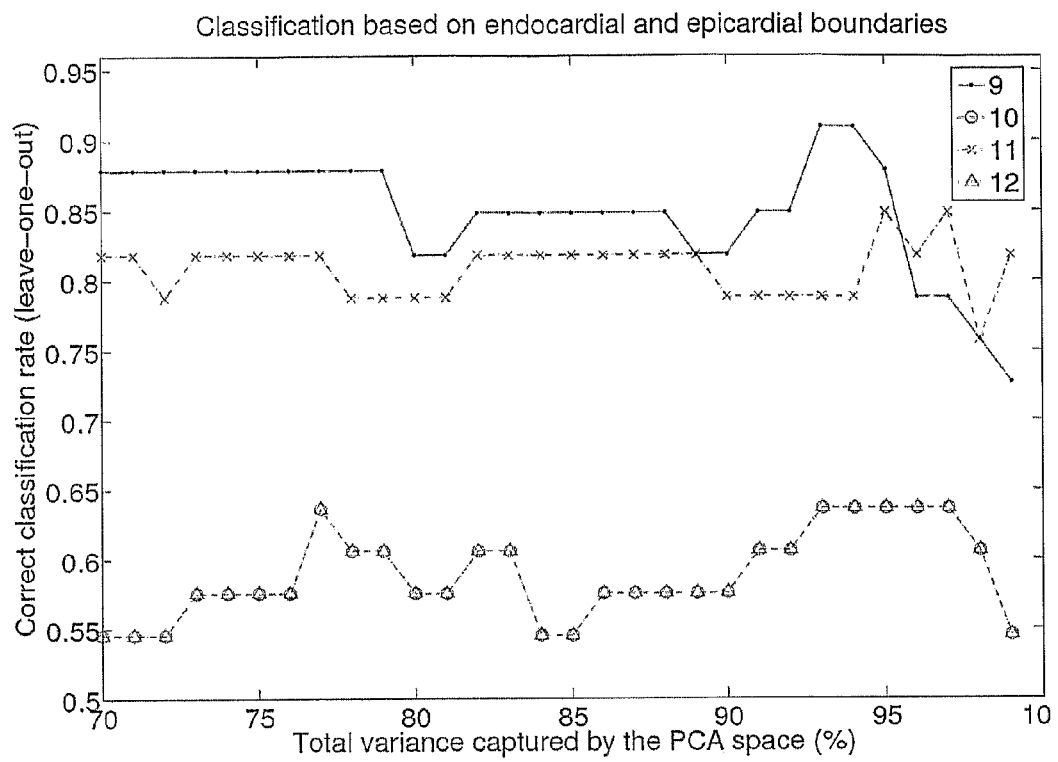

Table 1 shows the dimensions of the initial feature space for each data representation and the best correct classification ratio obtained by varying the percentage of the total variance in the data captured by the intermediary PCA space, computed prior to performing LDA. Correct classification performance as a function of this percentage is plotted in FIG. 9 for each data representation in Table 1. The representations providing the best performance in intraventricular dyssynchrony detection were numbers 1, 3 and 9, each with 90.9% correct classification; this corresponds to misclassifying 3 out of the 33 samples. In small sample size problems like this one, it is important to keep the dimensions of the initial feature space low. Therefore, the magnitude spectrum of endocardial shapes—representation 1, with 180 dimensions—can be considered as the best representation in this case. As shown in FIG. 9A, this representation also provides relatively stable correct classification rates for percentages of the total variance between 74% and 92%, being always above the correct detection level of 87.9%. These results indicate the potential of our approach in providing improved dyssynchrony characterization, obtained from routine MRI sequences, in selecting patients for CRT as an adjunct to current criteria, which provided a classification accuracy of just 62.5%.

Figure 10:
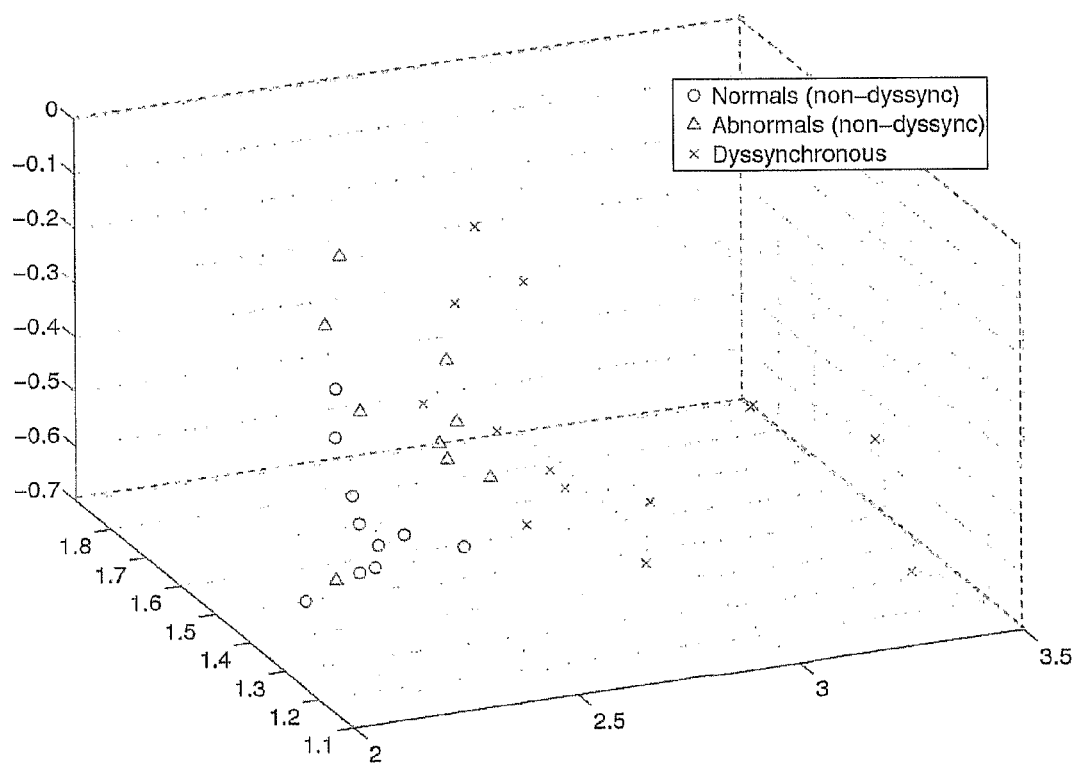
FIG. 10 shows the most representative three-dimensional (3D) PCA subspace, capturing 72% of the total variance in the data set (using representation 1), and showing a good separation between the two classes of interest, dyssynchronous and non-dyssynchronous.

For illustrative purposes, using representation 1, FIG. 10 shows all the 33 samples projected onto the most representative 3D PCA space, which in this case captures 72% of the total variance in the data set. We notice that even in this subspace of considerably lower dimensionality (3 vs. 180), the samples of the two classes appear to be well separated. If we remove the abnormal hearts from the non-dyssynchronous class, the separation between the dyssynchronous and normal hearts is even more evident. However, using a homoscedastic mixture of Gaussians with two components to model the non-dyssynchronous class—one Gaussian for the normal cases and another for the abnormal, but non-dyssynchronous hearts—did not improve classification accuracy, almost certainly due to the small number of samples available. As more samples become available, additional investigations may include modeling the classes using more complex distributions, such as mixtures of Gaussians, and methods such as Mixture Discriminant Analysis (MDA) (see the Duda and Fukanaga documents for additional information on MDA). This may lead to identification of subclasses of intraventricular dyssynchrony, which could in turn lead to better intraventricular dyssynchrony characterization, improved prediction of patient response to CRT, and modified or additional therapeutics based on subclass.

An approach for the spatio-temporal characterization of ventricular wall motion from routinely acquired short-axis MRI sequences is described herein. In one aspect, a semi-automatic deformable model technique with a shape parameterization based on complex Fourier descriptors is provided and used to track the LV boundaries over a complete cardiac cycle. The user-supplied initialization may include four points on the desired boundary in one image of the MRI sequence. Exemplary results indicate that this process is robust to weak contrast, noisy edge maps, and to the interference of papillary muscles. The process is not limited to the mid-ventricular slice shown in FIGS. 5-8 and can be also applied to extract the contours in other slices of the MRI data. Additional initialization may be necessary per plane for different slices. In one embodiment, LV boundary extraction may be automated and the process may track boundaries across different planes. In another embodiment, for example, extraction of the RV's endocardial boundary may be accomplished in conjunction with detection of intraventricular dyssynchrony in the RV.

The feasibility of detecting intraventricular dyssynchrony in the LV using only one mid-ventricular, short-axis MRI sequence obtainable on any cardiac MRI system with no special acquisition techniques, such as tagging, was demonstrated. By adopting a statistical pattern recognition approach, a classifier for intraventricular dyssynchrony detection was developed from the shape descriptors extracted using the deformable model technique described herein. The results were quite accurate: 90.9% (30 of 33 samples) were correctly classified as dyssynchronous or non-dyssynchronous, compared to just 62.5% using the QRS duration $\geq 130$ ms and LV ejection fraction $\leq 35\%$ criteria for the same samples, the latter being an existing technique for determining patient eligibility for CRT. Additionally, performing segmentation of a contiguous set of slices of the short-axis data may improve classification due to additional global information on LV deformation. Additionally, collection of more samples and modeling of classes using more complex distributions, such as a mixture of Gaussians, and classification by MDA may improve certain aspects of classification. This may lead to identification of subclasses of intraventricular dyssynchrony, which in turn could lead to better intraventricular dyssynchrony characterization and improved prediction of response to CRT. A natural extension of the approach described herein would be to extract RV shapes as well, and to investigate the detection of interventricular dyssynchrony by considering the Fourier shape descriptors of both the LV and the RV together.

The approximate contour length L can be computed from the complex Fourier descriptors using:

$$L = \frac{4\pi^2}{L} \sum_{k=-N}^{N} k^2 |S_k|^2 \quad (31)$$

The proof given in the following equations (32-37) was adapted from the Schnurrenberger document identified above.

If a curve s(1) is parameterized by its arch length l∈[0, L], the tracing speed of the curve at a point 1 may be defined as the magnitude of the tangent vector field at that point and is unity:

$$\left|\frac{ds(l)}{l}\right| = 1 \quad (32)$$

The length L can then be determined from $$L = \int_0^L \left|\frac{ds(l)}{dl}\right|^2 dl = \int_0^L \left[\frac{ds(l)}{dl}\frac{ds*(l)}{dl}\right] dl \quad (33)$$

where s*(l) is the complex conjugate of s(l). From the complex Fourier series expansion of s(l), its derivative can be written as:

$$\frac{ds(l)}{dl} = \frac{2\pi}{L} \sum_{k=-\infty}^{\infty} jk S_k e^{jk\frac{2\pi}{L}l} \quad (34)$$

Substituting Equation (34) into Equation (33):

$$L = \frac{4\pi^2}{L^2} \int_0^L \sum_n \sum_k nk S_n S_k^* e^{jn\frac{2\pi}{L}l} e^{-jk\frac{2\pi}{L}l} dl \quad (35)$$

Then, using the following orthogonality relation $$\int_0^L e^{j(n-k)\frac{2\pi}{L}l} dl = \begin{cases} 0 & \text{if } n \neq k \\ L & \text{if } n = k \end{cases} \quad (36)$$

and considering a truncated series, Equation (35) becomes:

$$L = \frac{4\pi^2}{L} \sum_{k=-N}^{N} k^2 |S_k|^2 \quad (37)$$

Since a finite sum is used to compute the approximate contour length, L is always less than or equal to the actual length of the contour. As N approaches infinity, the length computed from Equation (31) converges to the actual length.

In one embodiment, a process for detecting a dyssynchronous heart includes extracting and tracking heart muscle boundaries over time and identifying sets of heart muscle boundaries that belong to a dyssynchronous class. An exemplary embodiment of a process for identifying a dyssynchronous region of a dyssynchronous heart includes selecting a region within the dyssynchronous heart that is dyssynchronous with respect to other regions. Thus, there may be dyssynchrony, for example, between left and right ventricle (LV and RV), between the interventricular septum and the LV lateral wall, or between the interventricular septum and the RV lateral wall. Selection of dyssynchronous regions may be performed by an observer with experience in cardiac imaging who reviews a cine loop that depicts endocardial and epicardial deformation over a cardiac cycle.

Figure 11:
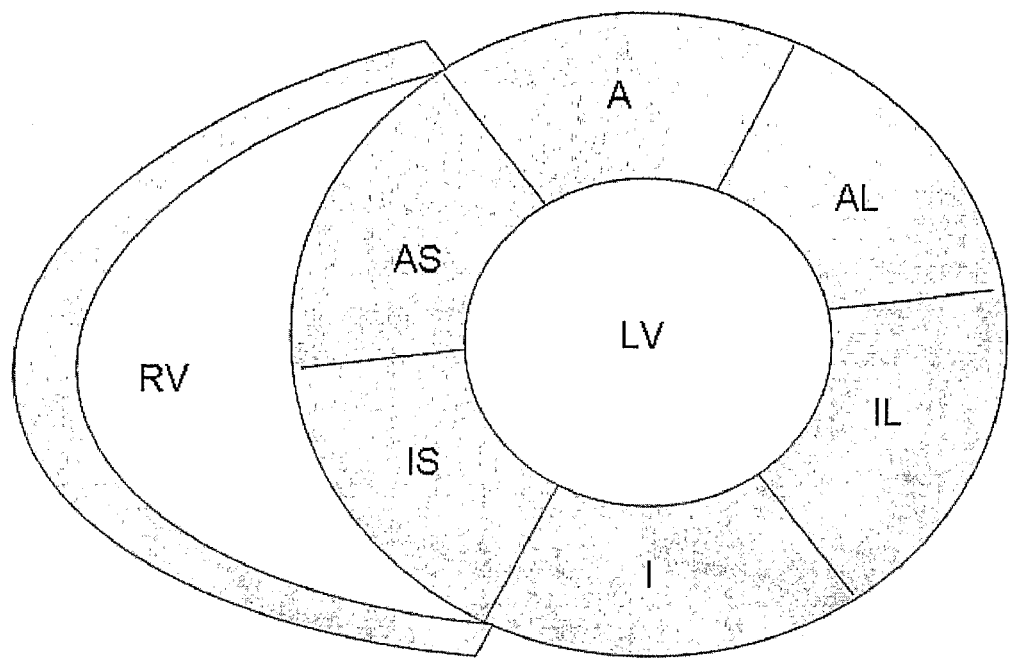
FIG. 11 shows an example of segmentation of a heart image for a mid-ventricular short-axis image slice.

With reference to FIG. 11, from a single mid-ventricular short axis slice (i.e. midway between the mitral valve plane and apex), the LV, for example, can be divided into six segments, including anteroseptal (AS), inferoseptal (IS), anterior (A), anterolateral (AL), inferolateral (IL), inferior (I). Myocardial thickening during systolic contraction is defined as an increase in distance between endocardial and epicardial boundaries, and results from a series of well-defined electrical and cellular processes that produce myofibril shortening. In a dyssynchronous heart, thickening of certain regions occurs out of the normal sequence of apex-to-base and septum-to-lateral wall activation. The most common pattern of dyssynchrony is delayed septal activation due to block in the bundle branches of Purkinje fibers that form the heart's intrinsic system for electrical depolarization. This can be recognized by measurement of the QRS duration (ventricular depolarization) on the surface electrocardiogram. Visual inspection of extracted heart muscle boundaries allows superior recognition of regional dyssynchronous activation patterns that may be present in the absence of significant QRS prolongation. Thus, the user may review the cyclic displacement of the extracted boundaries from a heart belonging to a dyssynchronous class and determine which cardiac segments thicken late compared to overall myocardial thickening. Those segments form the dyssynchronous regions of the heart.

Using the complex (i.e., Fourier) frequency characterization (i.e., feature space) of heart wall motion through a complete cardiac cycle, the subclasses of the dyssynchronous class may be refined based on further analysis of cardiac motion.

Figure 12:
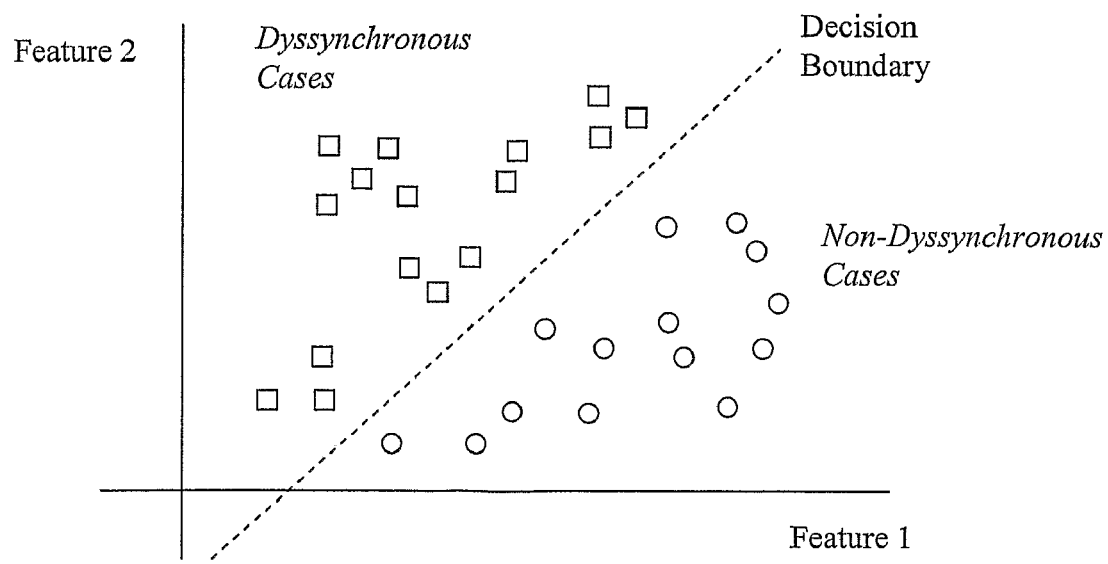
FIG. 12 shows an example of a scatter plot of two primary classes (e.g., dyssynchronous and non-dyssynchronous) in feature space. Feature space is shown as two-dimensional (2D) for illustration and the classes are presumed to be linearly separable.
Figure 13:
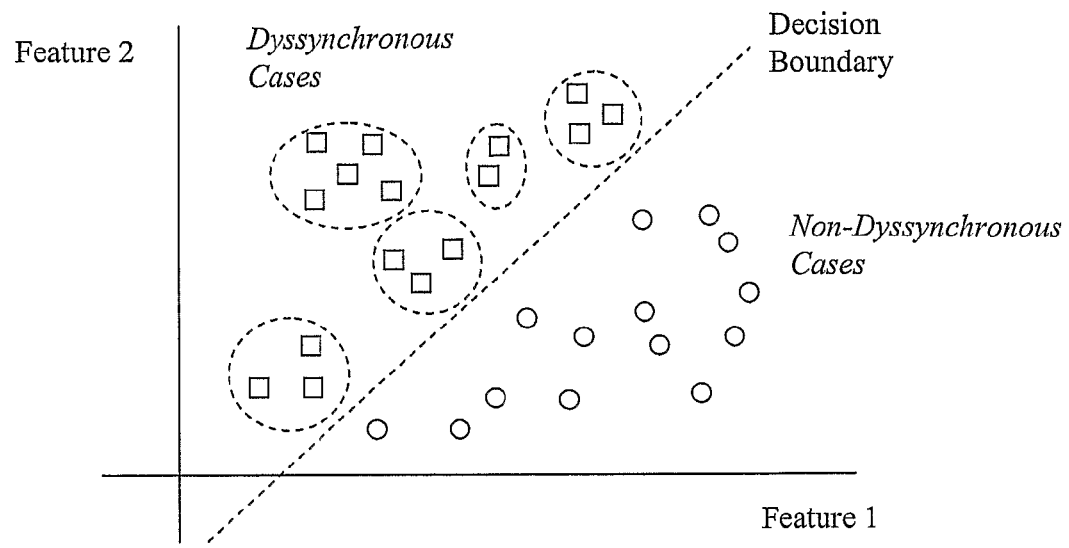
FIG. 13 shows an example of clustering of dyssynchronous cases into subclasses of behavior for the scatter plot of FIG. 12. In this example, five clusters (i.e., subclasses) are shown within the dyssynchronous class.
Figure 14:
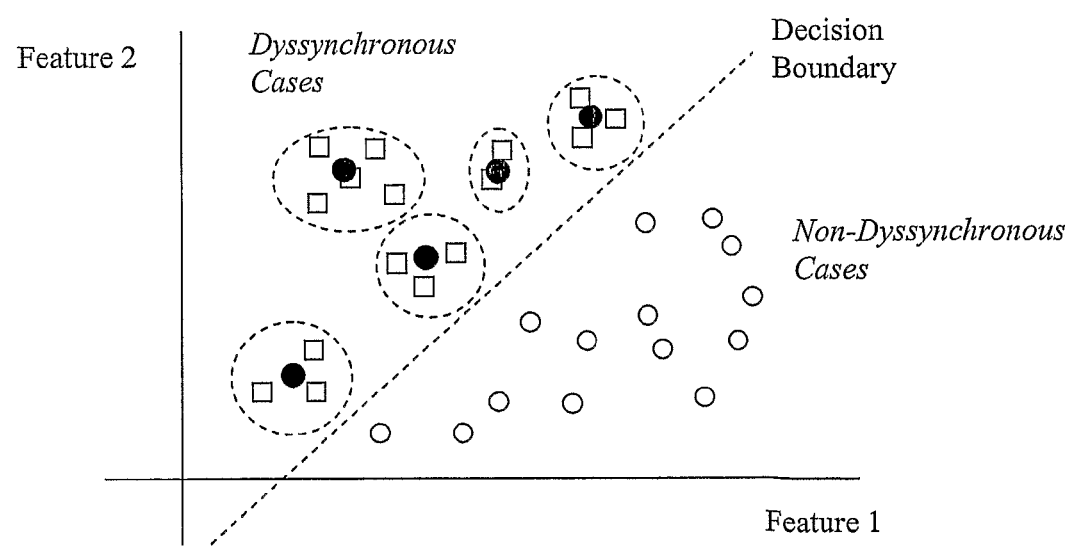
FIG. 14 shows an example of subclass centroids (filled circles) in the clusters of FIG. 13. The centroid represents the average behavior in spatio-temporal shape space for the corresponding cluster.
Figure 15:
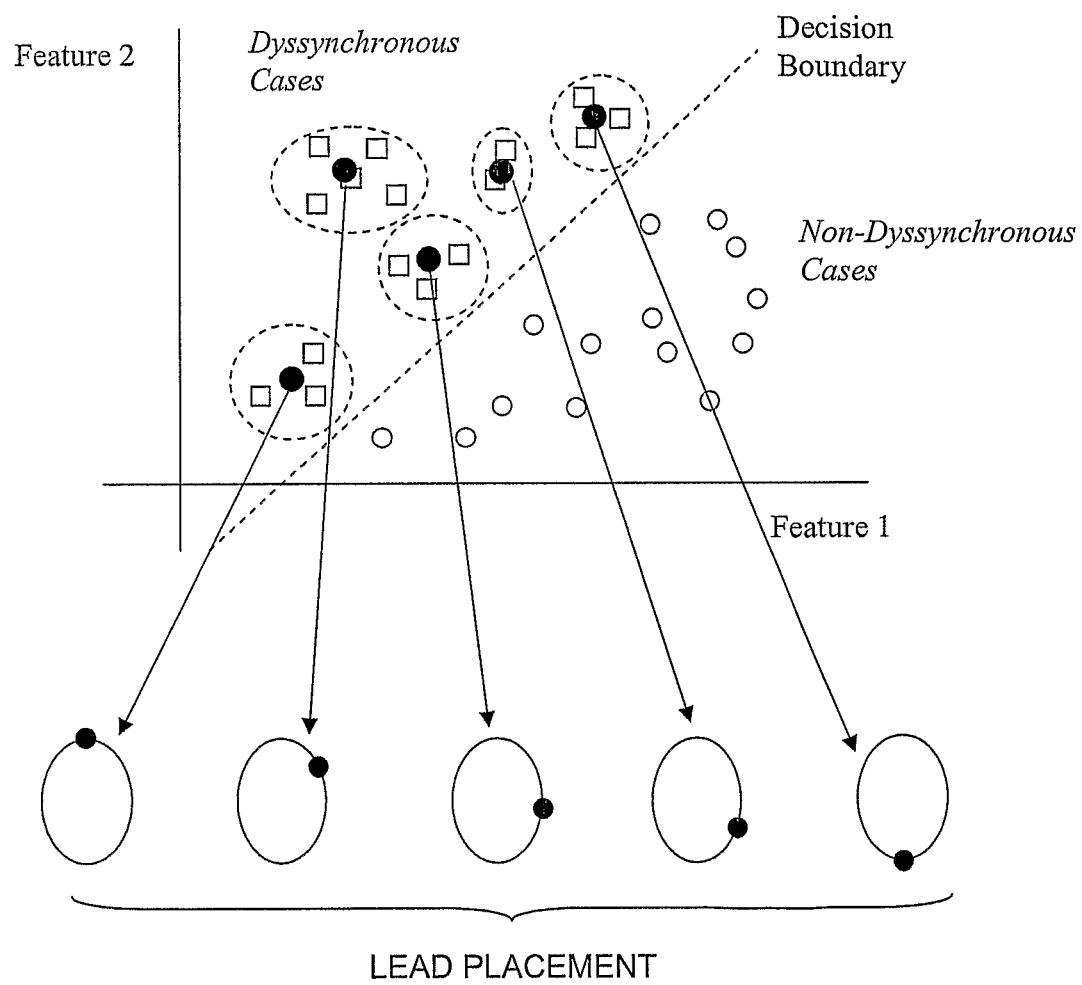
FIG. 15 shows an exemplary association of proper lead placement to each cluster (i.e., subclass), as represented by its centroid. The black circle on the corresponding ellipse suggests an exemplary lead location on the left ventricle for the corresponding cluster (i.e., subclass).

FIGS. 12-15 depict a 2D feature space for purposes of illustrating an exemplary sub-classification process with respect to the dyssynchronous class. The actual feature space dimensionality can vary with the specific application and demands of the problem. An exemplary implementation may begin with 180 (complex) dimensions. FIG. 12 depicts and example of a top-level pattern classification between dyssynchronous and non-dyssynchronous classes.

A clustering operation can be performed, for example, on the dyssynchronous samples (i.e., cases) in the dyssynchronous feature space to identify natural subclasses of dyssynchrony. The primary effort will be to acquire enough training data to populate the space to a density sufficient to render two or more clusters (i.e., subclasses) detectable (e.g., see FIG. 13). Once a sufficient amount of training data is acquired, the results of the clustering operation may produce more reliable subclasses. Any of a number of recognized approaches for clustering data (e.g., sliced inverse regression and other algorithms) will suffice for this purpose. For additional information on algorithms for clustering data, for example, see, Anil K. Jain and Richard C. Dubes, Algorithms for Clustering Data, Prentice Hall College Division (March 1988). The contents of the Jain 3 document are fully incorporated herein by reference.

Each subclass within the dyssynchronous class represents a set of cases projecting to a neighborhood in the Fourier feature space. Because these cases are found to be near one another in the feature space, it can be assumed that they represent similar behavior over the cardiac cycle. The centroid of a cluster (i.e., subclass) can be taken as a representative of the cluster's behavior (see FIG. 14). Because the feature space representation varies smoothly with perturbations on the contour shape (i.e., muscle wall) over time, members of the cluster, under reasonable assumptions on the tightness or compactness of the cluster will exhibit similar behavior. In particular, the clusters may be correlated to regions of the heart or, for example, the LV.

This correlation can be accomplished because the region of the heart muscle exhibiting dyssynchronous activity will be nearly the same for a given cluster. Thus, subclasses of dyssynchrony relate to clusters. This indicates that cases from a common cluster will benefit from similar lead placement with respect to subsequent CRT. The feature vector corresponding to the centroid of each cluster can be used to (re)construct a moving contour representation of the corresponding heart wall activity. It is then straightforward for an experienced cardiologist to identify the dyssynchronous regions of the heart muscle, indicating thereby the most efficacious location(s) for CRT lead placement. Moreover, any case projecting to a given cluster in feature space can be expected to respond to similar lead placement. See FIG. 15 for an example of relating lead placement to dyssynchronous subclasses.

In another embodiment, identification of dyssynchronous subclasses can be extended to a nearest-neighbor form of lead placement mapping. That is, clustering can perhaps be avoided altogether (again under the assumption of sufficient data density and coverage of the feature space) by simply adopting the lead placement suggested by the nearest training sample(s) in the feature space. This may obviate the need for clustering within the dyssynchronous class. An experienced cardiologist can simply tag each training sample with corresponding lead placement(s), rather than confining this manual operation to cluster centroids alone.

Moreover, in various embodiments, if the location of dyssynchrony and, therefore, the optimal lead placement, are found to vary smoothly with location in feature space, we can interpolate appropriate lead placement(s) from those of multiple nearby training samples.

The various embodiments of methods and apparatuses associated with detection of intraventricular dyssynchrony described herein may be used, for example, as teaching tools or diagnostic aids to provide insight into patient-specific health issues. Particularly, in relating patient-specific health issues to comparable health issues that were previously classified as either dyssynchronous or non-dyssynchronous. Additionally, patient-specific health issues may be related to known characteristics of dyssynchronous and non-dyssynchronous classes. For specific health issues in patients known to have intraventricular dyssynchrony, the various embodiments of methods and apparatuses associated with sub-classification of intraventricular dyssynchrony described herein may be used, for example, as teaching tools or diagnostic aids to provide insight into patient-specific CRT. Overall, the various embodiments of methods and apparatuses described herein provide for tailored treatment or appropriate referral of patient's.

In one embodiment, classification of a patient between dyssynchronous and non-dyssynchronous classes includes cardiac boundary extraction, assignment of boundaries into dyssynchronous or non-dyssynchronous classes, selection of dyssynchronous regions, and identification of subclasses of dyssynchrony. Development of this classification process and classifier may include a database of a plurality of cardiac imaging data sets. A large collection (e.g., hundreds) of data sets may be included in the database for optimization. Notably, the amount of data sets (i.e., samples) relates to reliability and completeness of the classification and sub-classification process. Nevertheless, once a suitable reliability is achieved, additional data sets may only marginally improve reliability. As to completeness, ideally all new data sets would be added to the database. Practically, the number of data sets may be limited to capacity of the database and at some point users may selectively add new data sets based on unique patient-specific issues. Nevertheless, once the database is established and suitably reliable and complete, it provides a tool set that is readily implemented for cardiac image segmentation and may be used for teaching and as a diagnostic aid.

Delivery of appropriate CRT to patients with dyssynchrony may include: 1) clinical suspicion of the presence of dyssynchrony, 2) imaging to provide the raw data for dyssynchrony classification and subclass identification, and 3) translation of subclass information into patient-specific CRT lead placement strategies. Healthcare sites that provide care for patients suspected of having cardiac dyssynchrony, but with limited experience or facilities for cardiac imaging, could consult a core facility comprised of imaging and image segmentation/classification experts who have developed and implemented the above techniques. This core facility could provide services such as remote supervision or education/training of personnel involved in imaging procedures, analysis of imaging data obtained by the consulting center, and patient-specific treatment plans.

Additionally, individuals who are involved in diagnosis of dyssynchrony and delivery of CRT, such as general cardiologists, cardiac imaging specialists, electrophysiology technicians and nurses, cardiac surgeons, and heart failure specialists, who are not familiar with the techniques of dyssynchrony classification and personalized CRT prescription could use the database as a teaching tool to improve their understanding and recognition of dyssynchrony and treatment planning. The teaching tool could be delivered as a web-based educational product or digital video disk for self-study. Additionally, this product could be used by organizations involved in continuing medical education of cardiologists, cardiac imaging specialists, and surgeons involved in dyssynchrony detection and CRT, such as the American College of Cardiology, Heart Failure Society of America, and Society for Cardiovascular Magnetic Resonance.

Figure 16:
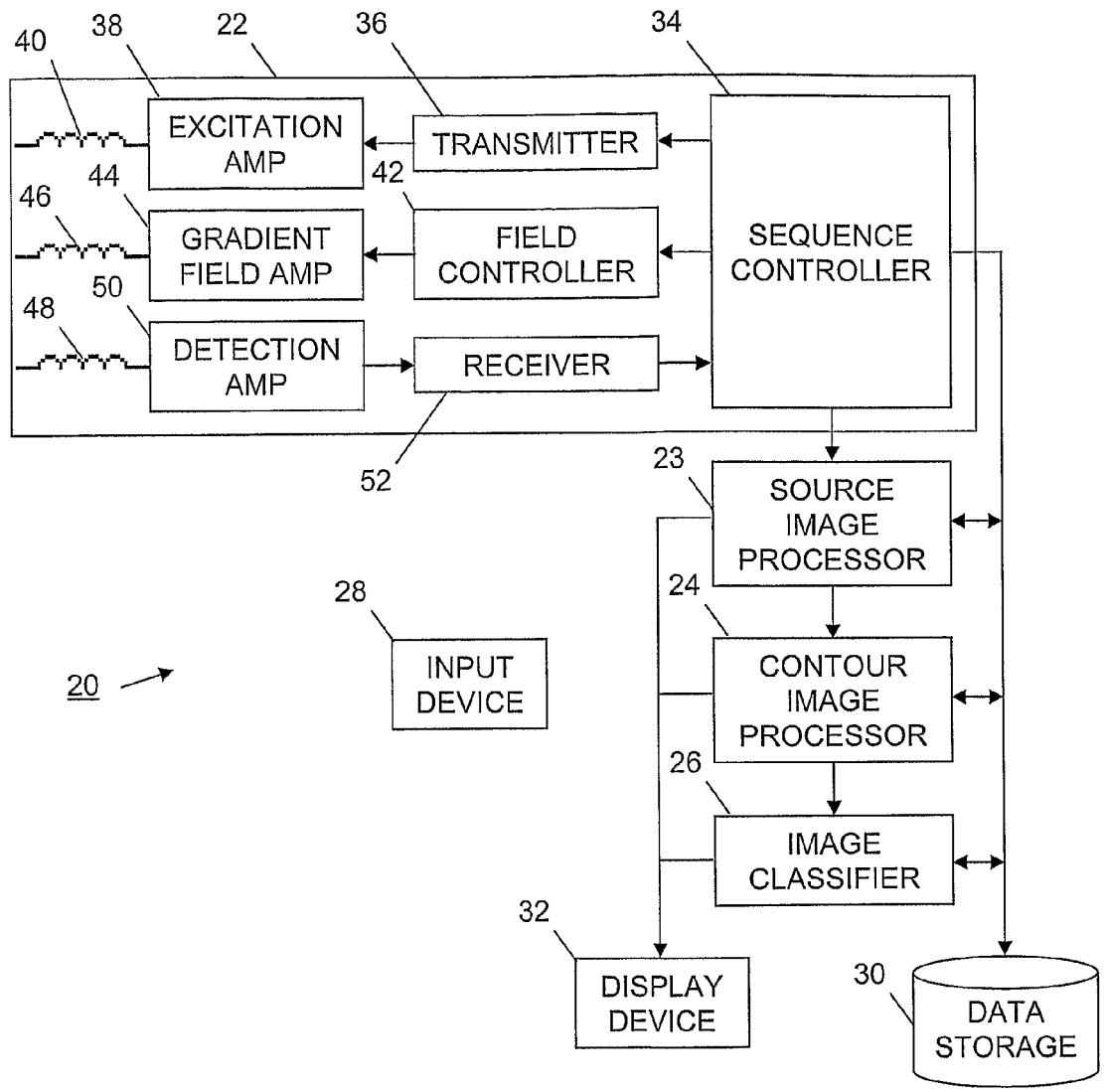
FIG. 16 is a block diagram of an exemplary embodiment of an apparatus for detecting intraventricular dyssynchrony.

With reference to FIG. 16, an exemplary embodiment of an apparatus for detecting intraventricular dyssynchrony may include a medical imaging system 20. The medical imaging system 20 may include an MRI device 22, a source image processor 23, a contour image processor 24, an image classifier 26, input device(s) 28, data storage device(s) 30, and display device(s) 32. The MRI device 22, for example, may include sequence controller(s) 34, transmitter(s) 36, excitation amplifier(s) 38, excitation coil(s) 40, field controller(s) 42, gradient field amplifier(s) 44, gradient coil(s) 46, detection coil(s) 48, detection amplifier(s) 50, and receiver(s) 52. In other embodiments, any combination of the source image processor 23, contour image processor 24, image classifier 26, input device(s) 28, data storage device(s) 30, and display device(s) 32 may be included with the MRI device 22 from a functional or physical standpoint.

The contour image processor 24 may extract muscle boundaries for each source image of a left or right ventricle of a beating heart over at least one cardiac cycle to define a corresponding series of contour shape images with contour shapes corresponding to muscle boundaries of the ventricle using a Fourier descriptor model. Each contour shape in each contour shape image may be based at least in part on image forces, external forces, and internal forces to track movement of the muscle boundaries for the ventricle over time in the series of contour shape images.

The image classifier 26 is in operative communication with the contour image processor 24 and may classify the series of contour shape images in an intraventricular dyssynchronous class or a non-dyssynchronous class. The source image processor 23 is in operative communication with the contour image processor 24 and may receive initialization information from an observer via the input device 28 as the observer views a first source image of the series of source images on the display device 32. The initialization information may define a plurality of points associated with the muscle boundaries. The MRI device 22 is in operative communication with the source image processor 23 and may generate the image data by detecting the characteristics of the subject's heart.

The sequence controller 34 may control various components of the MRI device 22 for detecting magnetic resonance signals from the part (i.e., area of interest) of an object (e.g., subject, patient, etc.) being imaged. For additional information on MRI sequencing, refer to Haacke et al., Magnetic Resonance Imaging: Physical Principles and Sequence Design, Wiley-Liss, $1^{st}$ edition, 1999. The contents of the Haacke document are fully incorporated herein by reference. The transmitter 36 may selectively generate a radio frequency (RF) pulse to cause resonance in the MRI device 22 via the excitation amplifier 38 and excitation coil 40. The gradient field amplifier 44 may selectively drive the gradient coil 46 in a known manner. The field controller 42 may control the magnetic field associated gradient field amplifier 44 and gradient coil 46. The receiver 52 may receive and detect magnetic resonance signals within the area of interest (i.e., focus area) via the detection coil 48 and detection amplifier 50. The source image processor 23 may perform image reconstruction and various calculations for presenting imaging information associated with system operation. The display device 32 may display images and information to facilitate, for example, setup and interactive operation of the MRI device 22 via the input device 28. The data storage device 30, for example, may store detected signal data and reconstructed k-space data. The data storage device 30 may also store images and statistical information generated by the contour image processor 24 and image classifier 26.

The source image processor 23 may be configured such that there is sufficient memory for storing measured data and reconstructed images. The memory may be sufficient to store the whole of N-dimensional measured data as well as reconstructed data. An MR image may be constructed from the image or k-space data corresponding to a predetermined plurality of applications of an MRI pulse sequence initiated by an RF pulse from the transmitter 36. The image may be updated by collecting image or k-space data from repetitive MRI pulse sequences. An MR image, for example, may be reconstructed by performing a series of Fourier transforms along a set of orthogonal directions in k-space.

As a general description, MRI is a well-known medical imaging method in which magnetic moments are excited at specific nuclear spin precession frequencies that are proportional to the magnetic field occurring within the magnet of the MRI device 22. Spin is a fundamental property of nature, such as electrical charge or mass. Precession is a rotational motion about an axis of a vector whose origin is fixed at the origin. The RF signals resulting from the precession of these spins are received typically using detection coils 48 in the MRI device 22 and are used to generate images of a volume of interest. A pulse sequence is a selected series of RF pulses and/or magnetic field gradients applied to a spin system to produce a signal representative of some property of the spin system. For example, SSFP is one type of pulse sequence that may be adapted to reduce sensitivity to magnetic field inhomogeneities. SSFP pulse sequences are generally used for fast imaging without excessive saturation of signals. SSFP pulse sequences are particularly useful for cardiac imaging applications. MRI pulse sequences that take advantage of SSFP (e.g., Siemens' "True-FISP", General Electric's (GE's) "FIESTA", and Philips' "Balanced Fast Field Echo (FFE)") can rapidly create images characterized by T2*/T1 contrast. The time constant that describes the return to equilibrium of the transverse magnetization, $M_{XY}$, is called the spin-spin relaxation time, T2. T1 governs the rate of recovery of the longitudinal magnetization. T2* is the spin-to-spin relaxation time composed of contributions from molecular interactions and inhomogeneities in the magnetic field. For additional information on MRI operation, refer to Stark et al., Magnetic Resonance Imaging, C. V. Mosby, $3^{rd}$ edition, 1999. The contents of the Stark document are fully incorporated herein by reference.

In various combinations, the source image processor 23, contour image processor 24, image classifier 26, input device 28, data storage device 30, and display device 32 may be provided within an operator console, a computer work station, or a computer system associated with the MRI device 22. For example, the operator console, computer work station, or computer system may be associated with the MRI device 22 in any combination and each may include one or more input devices 28, one or more data storage device 30, and one or more display devices 32. The input device(s) 28 may include any suitable input device in any suitable combination (e.g., keyboard, keypad, control panel, pointing device (e.g., mouse, touch screen, etc.)). The data storage device(s) 30 may include any suitable data storage device in any suitable combination (e.g., erasable memory devices, optical storage devices, fixed disk, removable disk, etc.). The display device(s) 32 may include any suitable combination of one or more display devices (e.g., liquid crystal display (LCD) monitor, flat panel display, high definition (HD) display, widescreen display, cathode ray tube (CRT) monitor, alphanumeric display, numeric display, light emitting diodes (LEDs), indicator lights, etc.).

In other embodiments of an apparatus for detecting intraventricular dyssynchrony, any other type of medical imaging system capable of producing short axis images of the subject's heart with cross sections of the right and left ventricles may be used in place of the medical imaging system 20 in FIG. 16. For example, the medical imaging system may include at least one of a medical radiography device, a medical tomography device, a medical sonography device, and a nuclear medicine device. More specifically, the medical imaging system may include an echo device, an MDCT device, a SPECT device, or a PET device instead of the MRI device 22 shown in FIG. 16. Any of the aspects of FIG. 16 described above may be automated, semi-automated, or manual and may be implemented through hardware, software, firmware, or combinations thereof.

Figure 17:
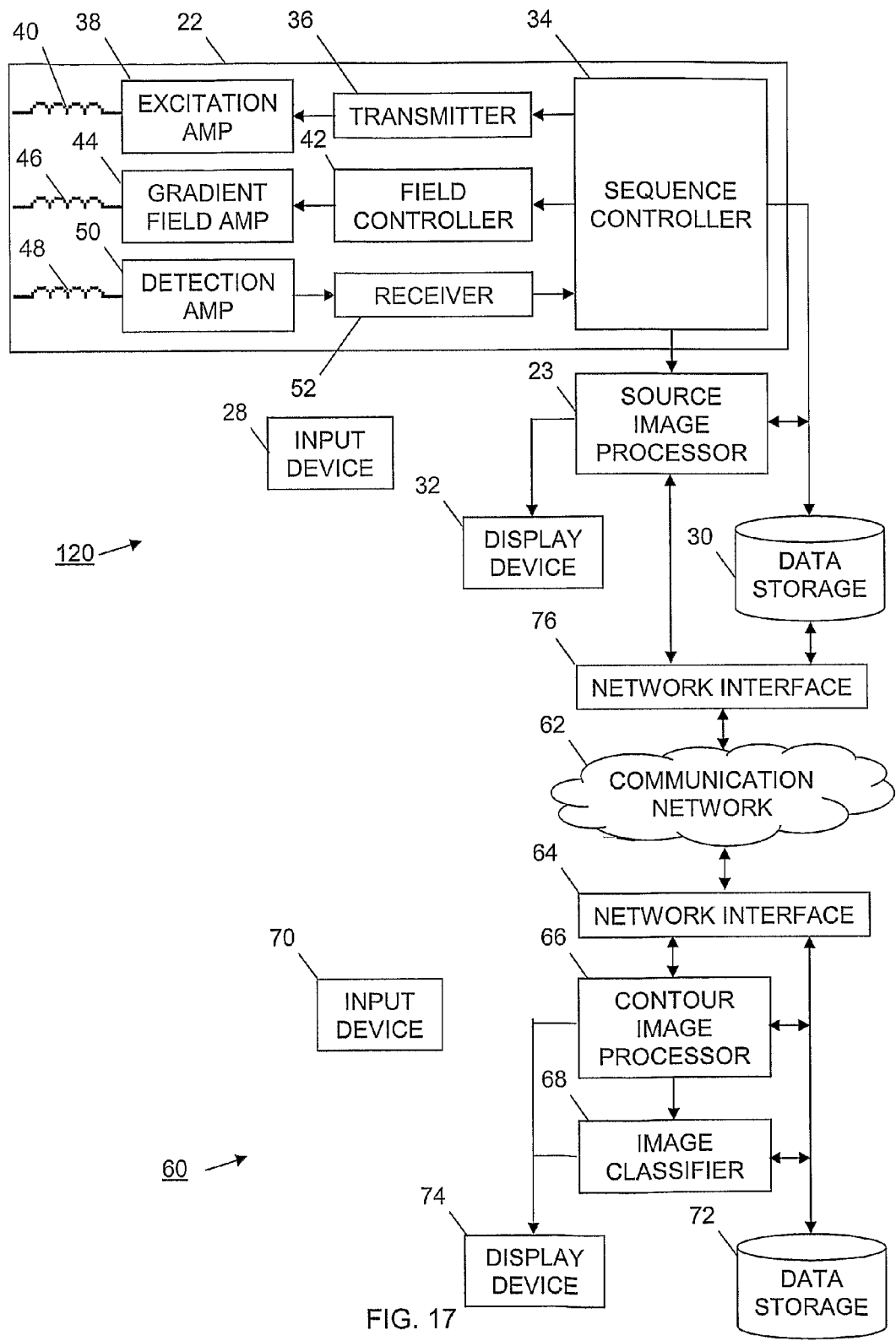
FIG. 17 is a block diagram of another exemplary embodiment of an apparatus for detecting intra-ventricular dyssynchrony in communication with an exemplary embodiment of a medical imaging system via a communication network.

With reference to FIG. 17, another exemplary embodiment of an apparatus for detecting intraventricular dyssynchrony may include a computer system 60 in communication with an exemplary embodiment of a medical imaging system 120 via a communication network 62. The computer system 60 may include a network interface 64, a contour image processor 66, an image classifier 68, input device(s) 70, data storage device(s) 72, and display device(s) 74. The medical imaging system 120 may include an MRI device 22, a source image processor 23, input device(s) 28, data storage device(s) 30, display device(s) 32, and a network interface 76. The MRI device 22 may include the same components and may operate in the same maimer as described above for FIG. 16. Likewise, the source image processor 23, input device(s) 28, data storage device(s) 30, and display device(s) 32 may operate in the same manner as described above for FIG. 16. Moreover, alternatives and options provided through other embodiments of the MRI device 22, source image processor 23, input device(s) 28, data storage device(s) 30, and display device(s) 32 described above also apply to the medical imaging system 120 depicted in FIG. 17.

The contour image processor 66 may characterize a series of source images of a left or right ventricle of a beating heart over at least one cardiac cycle as a corresponding series of contour shape images representative of movement of muscle boundaries of the ventricle over time using a Fourier descriptor model. The image classifier 68 is in operative communication with the contour image processor 66 and may classify the series of contour shape images in a in an intraventricular dyssynchronous class or a non-dyssynchronous class. The network interface 64 is in operative communication with the contour image processor 66 and is adapted to receive the plurality of source images from the medical imaging system 120 via the communication network 62.

The source image processor 23 is in operative communication with the contour image processor 66 via the network interface 64 and communication network 62. The source image processor 23 may generate the plurality of source images of the subject's heart from image data resulting from detection of certain characteristics of the subject's heart. The MRI device 22 is in operative communication with the source image processor 23 and may generate the image data by detecting the characteristics of the subject's heart.

The communication network 62 may include any combination of suitable wired and wireless communications networks (e.g., wired or wireless local area networks (LANs), wired or wireless wide area networks (WANs), the Internet, wired or wireless telephone systems (e.g., plain old telephone systems (POTS), integrated services digital networks (ISDN), cellular telephone networks, satellite telephone systems, etc.), cable television systems, satellite communication systems, etc.). The network interface 64 may be any suitable network interface compatible with the specific communication network to which it is connecting. Likewise, the network interface 76 may be any suitable network interface compatible with the specific communication network to which it is connecting. As such, the network interfaces 64, 76 need not be the same in form or function.

In other embodiments of an apparatus for detecting intraventricular dyssynchrony, any other type of medical imaging system capable of producing short axis images of the subject's heart with cross sections of the right and left ventricles may be used in place of the medical imaging system 120 in FIG. 17. For example, the medical imaging system may include at least one of a medical radiography device, a medical tomography device, a medical sonography device, and a nuclear medicine device. More specifically, the medical imaging system may include an echo device, an MDCT device, a SPECT device, or a PET device instead of the MRI device 22 shown in FIG. 17. Any of the aspects of FIG. 17 described above may be automated, semi-automated, or manual and may be implemented through hardware, software, firmware, or combinations thereof.

Figure 18:
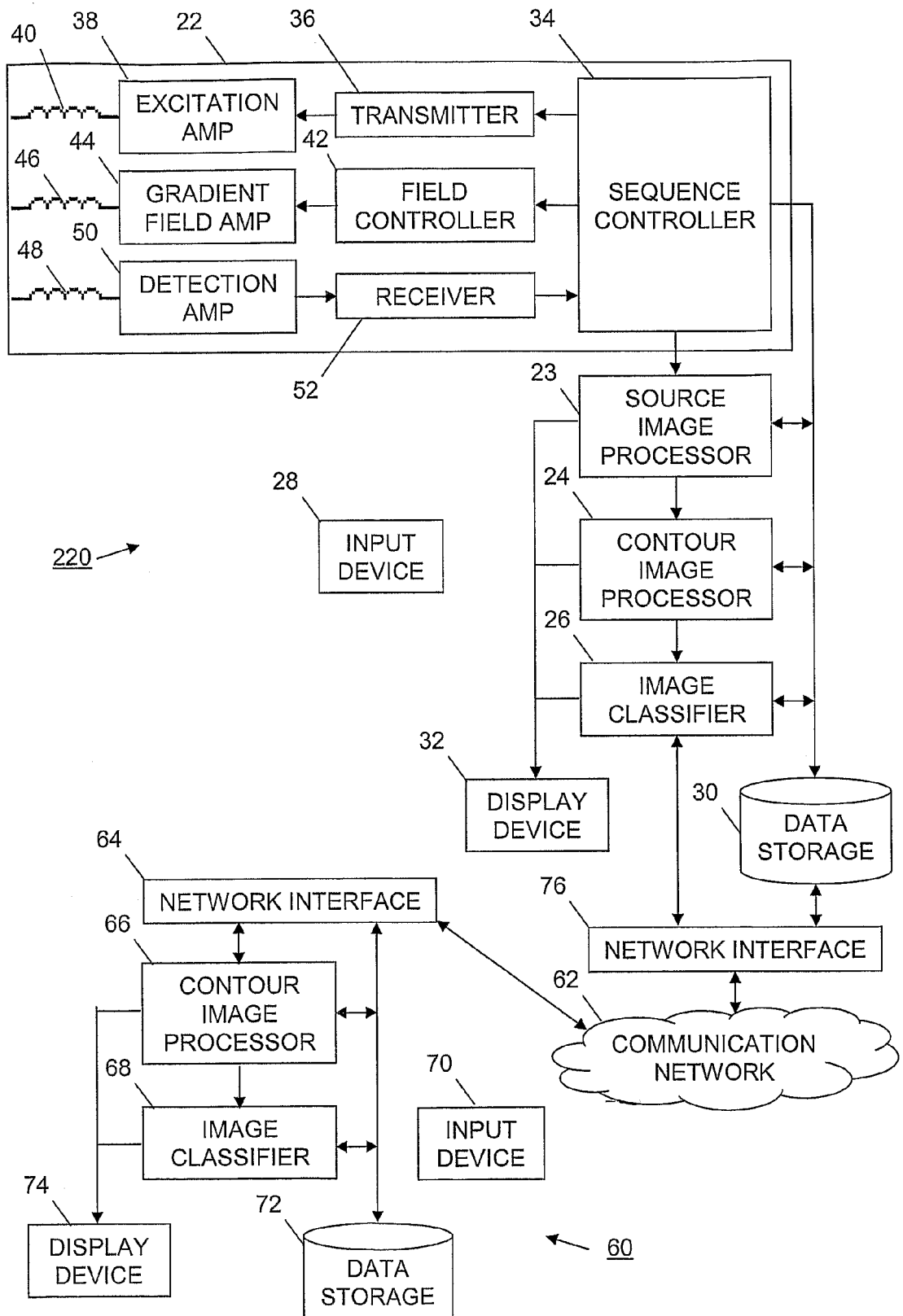
FIG. 18 is a block diagram showing the exemplary embodiment of the apparatus for detecting intraventricular dyssynchrony of FIG. 17 in communication with the exemplary embodiment of the apparatus for detecting intraventricular dyssynchrony of FIG. 16 via a communication network.

With reference to FIG. 18, the computer system 60 of FIG. 17 is shown in communication with a medical imaging system 220 (similar to the medical imaging system 20 of FIG. 16) via the communication network 62. The computer system 60 may include the same components and may operate in the same manner as described above for FIG. 17. Likewise, the communication network 62 may operate in the same manner as described above for FIG. 17. Moreover, alternatives and options provided through other embodiments of the computer system 60 and communication network 62 and described above also apply to the overall arrangement of equipment depicted in FIG. 18.

The medical imaging system 220 may include the MRI device 22, source image processor 23, contour image processor 24, image classifier 26, input device(s) 28, data storage device(s) 30, display device(s) 32, and network interface 76. The MRI device 22 may include the same components and may operate in the same manner as described above for FIG. 16. Likewise, the source image processor 23, contour image processor 24, image classifier 26, input device(s) 28, data storage device(s) 30, and display device(s) 32 may operate in the same manner as described above for FIG. 16. Additionally, the network interface 76 may operate in the same manner as described above for FIG. 17. Moreover, alternatives and options provided through other embodiments of the MRI device 22, source image processor 23, contour image processor 24, image classifier 26, input device(s) 28, data storage device(s) 30, display device(s) 32, and network interface 62 and described above also apply to the overall arrangement of equipment depicted in FIG. 18.

In other embodiments of an apparatus for detecting intraventricular dyssynchrony, any other type of medical imaging system capable of producing short axis images of the subject's heart with cross sections of the right and left ventricles may be used in place of the medical imaging system 220 in FIG. 18. For example, the medical imaging system may include at least one of a medical radiography device, a medical tomography device, a medical sonography device, and a nuclear medicine device. More specifically, the medical imaging system may include an echo device, an MDCT device, a SPECT device, or a PET device instead of the MRI device 22 shown in FIG. 18. Any of the aspects of FIG. 18 described above may be automated, semi-automated, or manual and may be implemented through hardware, software, firmware, or combinations thereof.

In still another embodiment, a medical imaging system and associated image processing logic may monitor an internal area of a subject. This may be useful for monitoring various types of internal organs, tissues, bones, and a developing fetus. In one embodiment, the apparatus includes: a contour image processor and an image classifier in operative communication with the contour image processor. The contour image processor extracting boundaries for each source image of a series of source images of the internal area over a predetermined time to define a corresponding series of contour shape images with contour shapes corresponding to boundaries within the internal area using a Fourier descriptor model. The contour image processor also deforming each contour shape in each contour shape image based at least in part on image forces, external forces, and internal forces to track movement of the boundaries within the internal area over time in the series of contour shape images. The image classifier classifying the series of contour shape images in a first class or a second class based at least in part on detection of predetermined discriminating characteristics for the first and second classes in the contour shape images.

Figure 19:
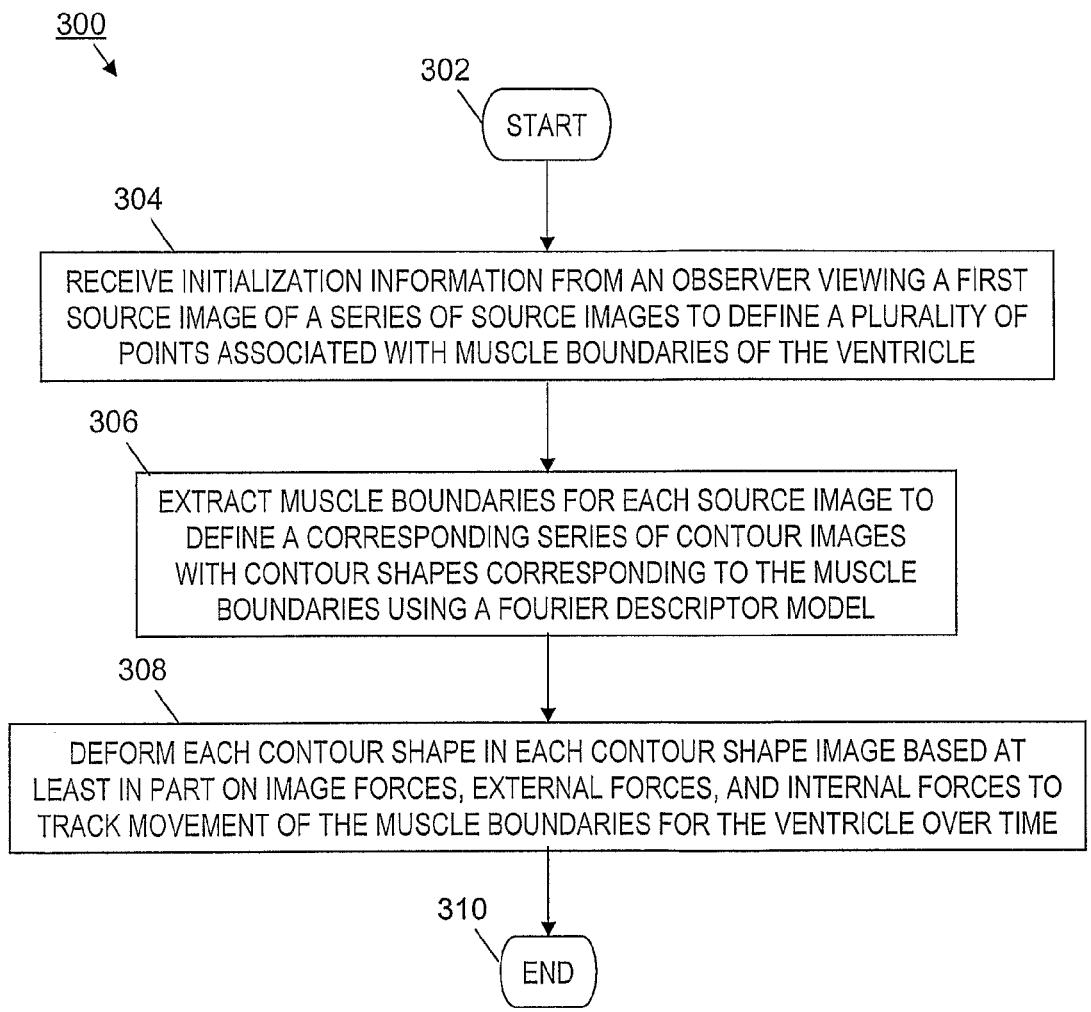
FIG. 19 is a flow chart showing an exemplary embodiment of a method of detecting intraventricular dyssynchrony.

With reference to FIG. 19, an exemplary embodiment of a method 300 of detecting intraventricular dyssynchrony begins at 302 where the process starts. Next, initialization information may be received from an observer viewing a first source image of a series of source images of a ventricle of a beating heart over at least one cardiac cycle. The initialization information may define a plurality of points associated with muscle boundaries of the ventricle (304). At 306, a Fourier descriptor model may be used to extract muscle boundaries for each source image of the series of source images to define a corresponding series of contour shape images with contour shapes corresponding to the muscle boundaries. Next, deforming each contour shape in each contour shape image may be deformed based at least in part on image forces, external forces, and internal forces to track movement of the muscle boundaries for the ventricle over time in the series of contour shape images (308). At 310, the process has reached its end.

In one embodiment, the initialization information may include at least four points. In another embodiment, the first source image may correspond to the end of diastole for the cardiac cycle. In yet another embodiment, the muscle boundaries may include an endocardial wall and an epicardial wall. In still another embodiment, the set of source images may include short-axis cine magnetic resonance images.

In one embodiment, the Fourier descriptor model may include $$s(t) = x(t) + jy(t) = \sum_{k=-N}^{N} S_k e^{jkt},$$

with $j=\sqrt{-1}$, where each complex number $S_k=a_k+jb_k$, with $a_k$, $b_k \in R$, is treated as a rotating phasor with magnitude $|S_k|=\sqrt{a_k^2+b_k^2}$ and phase angle $$\phi_k = \tan^{-1}\left(\frac{b_k}{a_k}\right).$$

In one configuration of this embodiment, each pair of descriptors $S_k$ and $S_{-k}$ may describes an ellipse. Moreover, the shapes of the muscle boundaries may be represented as a combination of N ellipses, centered at $(x_c, y_c) \equiv (a_0, b_0)$. In one configuration, N=4. In another embodiment, the image forces may include edge-based forces and texture-based forces. In one configuration of this embodiment, the edge-based forces may have a limited zone of attraction.

In another embodiment, the deforming in 308 may include sampling pixels values for the contour shapes in each contour shape image along a normal direction and at selected locations along a length of the corresponding contour shape to determine texture vectors associated with pixels of the contour shape images. The pixel value sampling may include sampling pixel values for the contour shapes using $$s_\perp(t) = \begin{bmatrix} u(t) \\ v(t) \end{bmatrix} = \sum_{k=-N}^{N} k \begin{bmatrix} a_k & -b_k \\ b_k & a_k \end{bmatrix} \begin{bmatrix} \cos kt \\ \sin kt \end{bmatrix}$$

at locations $t_i \in [0, 2\pi]$, where $1 \leq i \leq L_0$ and $L_0$ represents the length of the corresponding contour shape, to determine the texture vectors.

In another embodiment, the extracting in 306 for the first source image may be based at least in part on the initialization information. The extracting in 306 for each subsequent source image may be based at least in part on the previous contour shape image. Any of the aspects of FIG. 19 described above may be automated, semi-automated, or manual and may be implemented through hardware, software, firmware, or combinations thereof.

Figure 20:
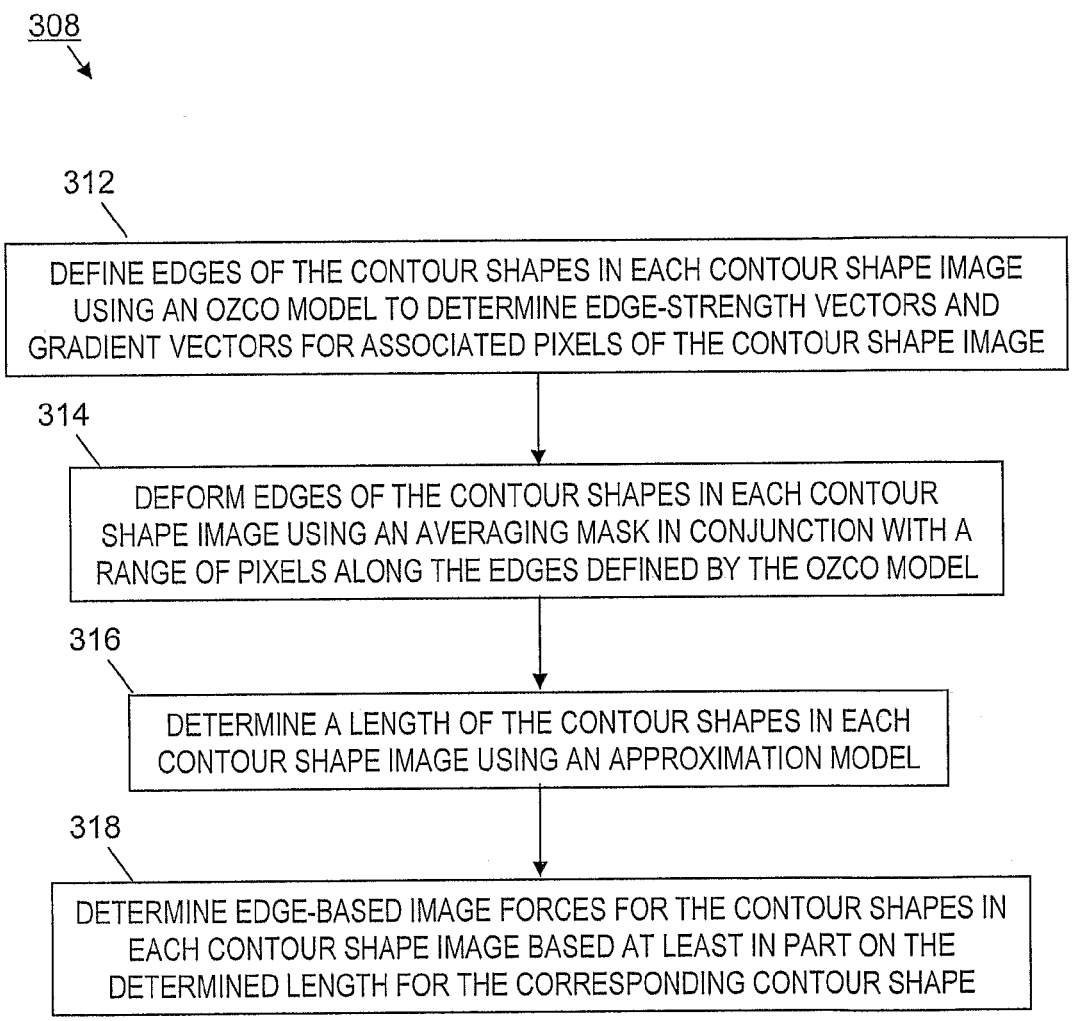
FIG. 20 is a flow chart showing an exemplary embodiment of a process for deforming contour shapes for a ventricle in a contour shape image in relation to the method of FIG. 19.

With reference to FIG. 20, an exemplary embodiment of a process 308 for deforming contour shapes for a ventricle in a contour shape image in relation to the method of FIG. 19 begins at 312 where edges of the contour shapes in each contour shape image may be detected using an OZCO model to determine edge-strength vectors and gradient vectors for associated pixels of the contour shape images. Next, edges of the contour shapes in each contour shape image may be deformed using an averaging mask in conjunction with a range of pixels along the edges defined by the OZCO model (314). At 316, a length of the contour shapes in each contour shape image may be determined using an approximation model. Next, edge-based image forces for the contour shapes in each contour shape image may be determined based at least in part on the determined length for the corresponding contour shape.

In one embodiment, the approximation model in 316 may include $$L^2 = 4\pi^2 \sum_{k=-N}^{N} k^2 |S_k|^2 = 4\pi^2 \sum_{k=-N}^{N} k^2 (a_k^2 + b_k^2),$$

where L is the length of the contour shape. In the embodiment being described, the determining in 318 may include $$F_{img}(S) = \sum_{i=1}^{L} [I_x(x(t_i; S), y(t_i; S)) \nabla x(t_i; S) + I_y(x(t_i; S), y(t_i; S)) \nabla y(t_i; S)]$$

to determine the edge-based image forces acting on the corresponding contour shape with descriptor vector S, where $I_x$ and $I_y$ are the edge-strength vector and gradient vector, respectively. The edge-strength vector may include $$\nabla x(t; S) = \begin{bmatrix} \vdots \\ \frac{\partial x(t; S)}{\partial a_k} + j \frac{\partial x(t; S)}{\partial b_k} \\ \vdots \end{bmatrix}.$$

The gradient vector may include $$\nabla y(t; S) = \begin{bmatrix} \vdots \\ \frac{\partial y(t; S)}{\partial a_k} + j \frac{\partial y(t; S)}{\partial b_k} \\ \vdots \end{bmatrix},$$

k=-N, . . . , N. Any of the aspects of FIG. 20 described above may be automated, semi-automated, or manual and may be implemented through hardware, software, firmware, or combinations thereof.

Figure 21:
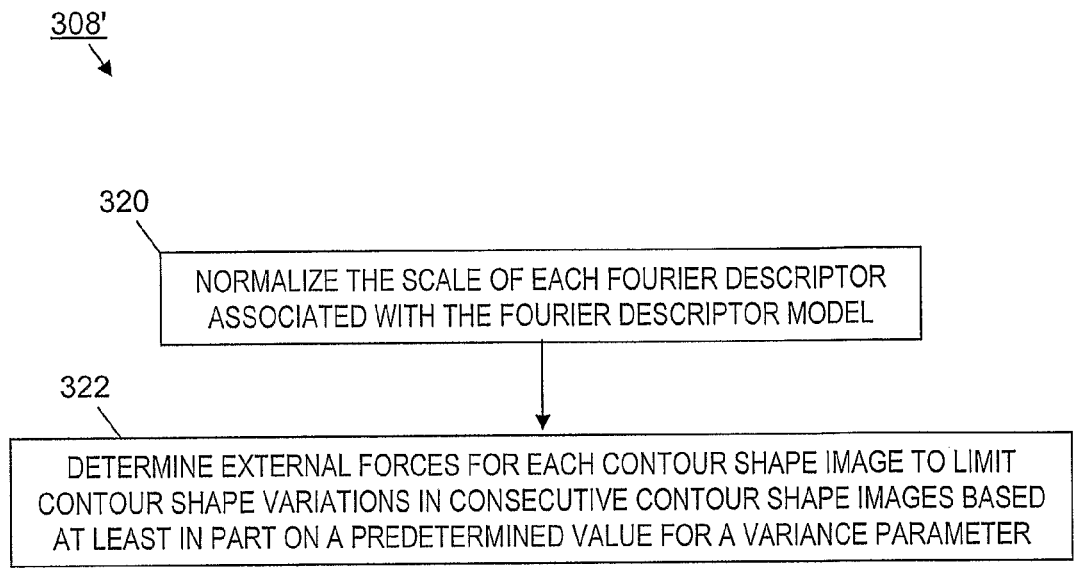
FIG. 21 is a flow chart showing another exemplary embodiment of a process for deforming contour shapes for a ventricle in a contour shape image in relation to the method of FIG. 19.

With reference to FIG. 21, another exemplary embodiment of a process 308' for deforming contour shapes for a ventricle in a contour shape image in relation to the method of FIG. 19 begins at 320 where the scale of each Fourier descriptor associated with the Fourier descriptor model may be normalized. Next, external forces for each contour shape image may be determined to limit contour shape variations in consecutive contour shape images based at least in part on a predetermined value for a variance parameter (322). The scale-normalizing for each Fourier descriptor may include $$\frac{S_k}{|S_1|}.$$

In one embodiment, the scale-normalized Fourier descriptor $$\alpha_k^{(n)} = \frac{a_k^{(n)}}{|S_1^{(n)}|}$$

may be distributed $$\alpha_k^{(n)} \approx N\left(\alpha_k^{(n-1)}, \frac{\sigma^2}{|k|}\right), k \notin \{0, 1\}.$$

In another embodiment, the scale-normalized Fourier descriptor $$\beta_k^{(n)} = \frac{b_k^{(n)}}{|S_1^{(n)}|}$$

may be distributed $$\beta_k^{(n)} \approx N\left(\beta_k^{(n-1)}, \frac{\sigma^2}{|k|}\right), k \notin \{0, 1\}.$$

In one embodiment, the determining in 322 may include determining the log likelihood of the scale-normalized Fourier descriptors $\alpha^{(n)}$ and $\beta^{(n)}$. For example, determining the log likelihood may include
ln $$P(\alpha^{(n)}, \beta^{(n)} | S^{(n-1)}) = -\sum_{\substack{k=-N \\ k \notin \{0,1\}}}^{N} \frac{(\alpha_k^{(n)} - \alpha_k^{(n-1)})^2}{2\sigma^2|k|^{-1}} - \sum_{\substack{k=-N \\ k \notin \{0,1\}}}^{N} \frac{(\beta_k^{(n)} - \beta_k^{(n-1)})^2}{2\sigma^2|k|^{-1}}.$$

In the embodiment being described, the determining of external forces in 322 may include $$F_{ext}(S) = \nabla \ln P = \begin{bmatrix} \vdots \\ \frac{\partial \ln P}{\partial a_k} + j\frac{\partial \ln P}{\partial b_k} \\ \vdots \end{bmatrix},$$

k=−N, . . . , N to determine gradient vectors for the scale-normalized Fourier descriptors, where $S=S^{(n)}$. In this embodiment, the gradient vectors include $$\frac{\partial \ln P}{\partial a_k} = -\frac{|k|}{\sigma^2}(\alpha_k^{(n)} - \alpha_k^{(n-1)})\frac{\partial \alpha_k^{(n)}}{\partial a_k} = -\frac{|k|}{\sigma^2}\frac{(\alpha_k^{(n)} - \alpha_k^{(n-1)})}{|S_1|}$$

and $$\frac{\partial \ln P}{\partial b_k} = -\frac{|k|}{\sigma^2}(\beta_k^{(n)} - \beta_k^{(n-1)})\frac{\partial \beta_k^{(n)}}{\partial a_k} = -\frac{|k|}{\sigma^2}\frac{(\beta_k^{(n)} - \beta_k^{(n-1)})}{|S_1|} \text{ for } k \notin \{0, 1\}.$$

Any of the aspects of FIG. 21 described above may be automated, semi-automated, or manual and may be implemented through hardware, software, firmware, or combinations thereof.

Figure 22:
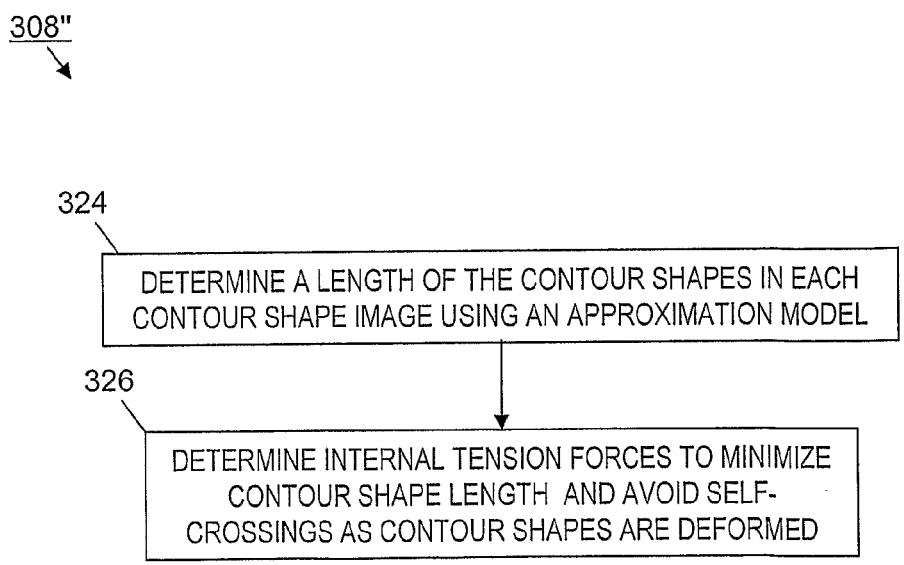
FIG. 22 is a flow chart showing yet another exemplary embodiment of a process for deforming contour shapes for a ventricle in a contour shape image in relation to the method of FIG. 19.

With reference to FIG. 22, another exemplary embodiment of a process 308″ for deforming contour shapes for a ventricle in a contour shape image in relation to the method of FIG. 19 begins at 324 where a length of the contour shapes in each contour shape image is determined using an approximation model. Next, internal tension forces may be determined to minimize contour shape length and avoid self-crossings as contour shapes are deformed. In one embodiment, the internal tension forces may be weaker than the image forces. In another embodiment, the approximation model may include $$L^2 = 4\pi^2 \sum_{k=-N}^{N} k^2|S_k|^2 = 4\pi^2 \sum_{k=-N}^{N} k^2(a_k^2 + b_k^2),$$

where L is the length of the contour shape. In yet another embodiment, the internal tension forces may include $$F_{int}(S) = -\nabla(L^2) = -\begin{bmatrix} \vdots \\ \frac{\partial(L^2)}{\partial a_k} + j\frac{\partial(L^2)}{\partial b_k} \\ \vdots \end{bmatrix}, k = -N, \dots, N.$$

Any of the aspects of FIG. 22 described above may be automated, semi-automated, or manual and may be implemented through hardware, software, firmware, or combinations thereof.

Figure 23:
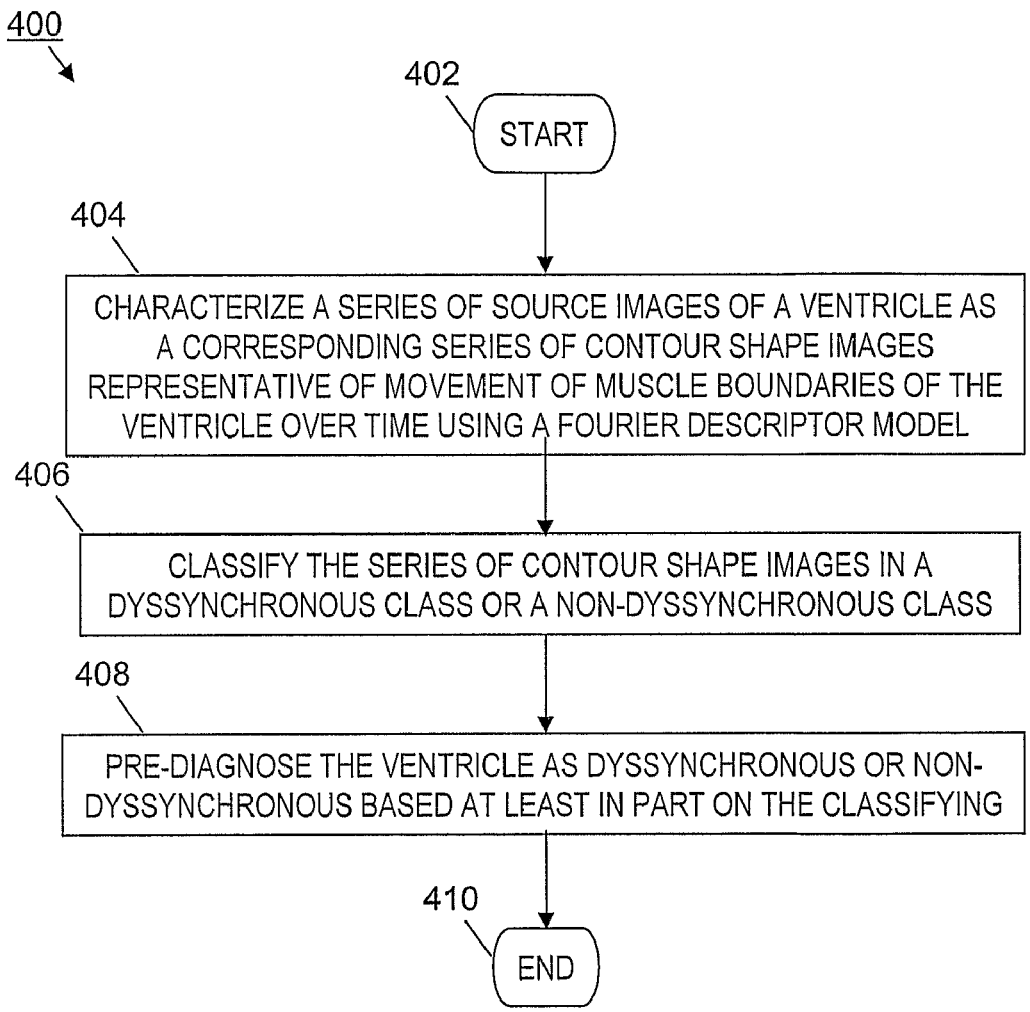
FIG. 23 is a flow chart showing another exemplary embodiment of a method of detecting intraventricular dyssynchrony.

With reference to FIG. 23, another exemplary embodiment of a method 400 of detecting intraventricular dyssynchrony begins at 402 where the process starts. Next, a series of source images of a ventricle of a beating heart over at least one cardiac cycle may be characterized as a corresponding series of contour shape images representative of movement of muscle boundaries of the ventricle over time using a Fourier descriptor model (404). At 406, the series of contour shape images may be classified in a dyssynchronous class or a non-dyssynchronous class. Next, the ventricle may be pre-diagnosed as dyssynchronous or non-dyssynchronous based at least in part on the classifying (408). At 410, the process 400 has reached its end. Any of the aspects of FIG. 23 described above may be automated, semi-automated, or manual and may be implemented through hardware, software, firmware, or combinations thereof.

Figure 24:
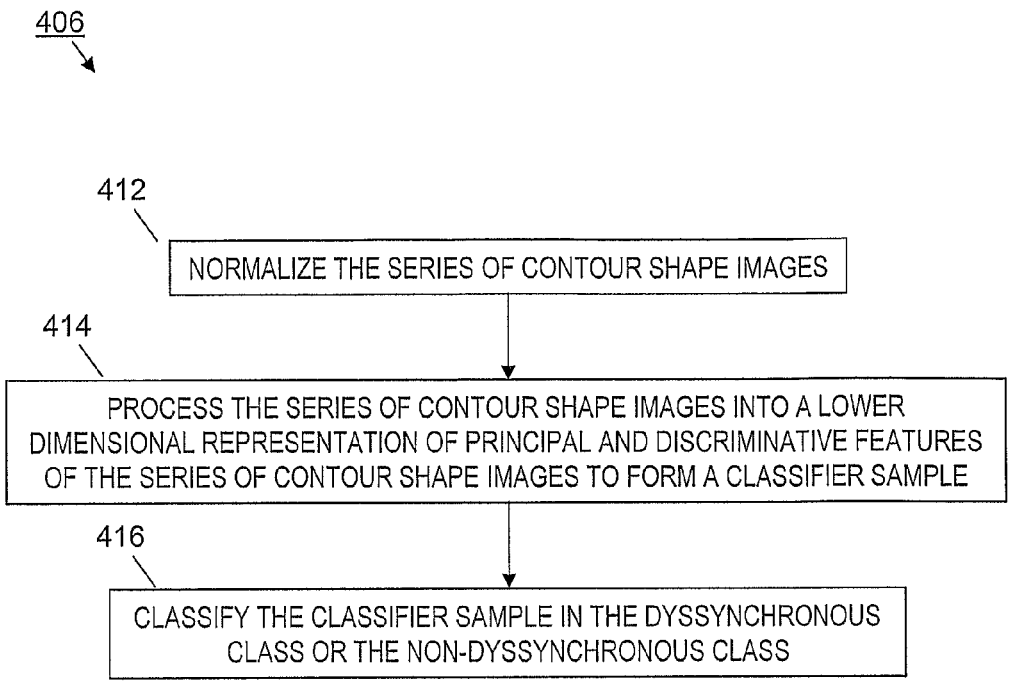
FIG. 24 is a flow chart showing an exemplary embodiment of a process for classifying a series of contour shape images in a dyssynchronous class or a non-dyssynchronous class in relation to the method of FIG. 23.

With reference to FIG. 24, an exemplary embodiment of a process 406 for classifying the series of contour shape images in a dyssynchronous class or a non-dyssynchronous class in relation to the method of FIG. 23 begins at 412 where the series of contour shape images may be normalized. Next, the series of contour shape images may be processed into a lower dimensional representation of principal and discriminative features of the series of contour shape images to form a classifier sample (414). At 416, the classifier sample may be classified in the dyssynchronous class or the non-dyssynchronous class. Any of the aspects of FIG. 24 described above may be automated, semi-automated, or manual and may be implemented through hardware, software, firmware, or combinations thereof.

Figure 25:
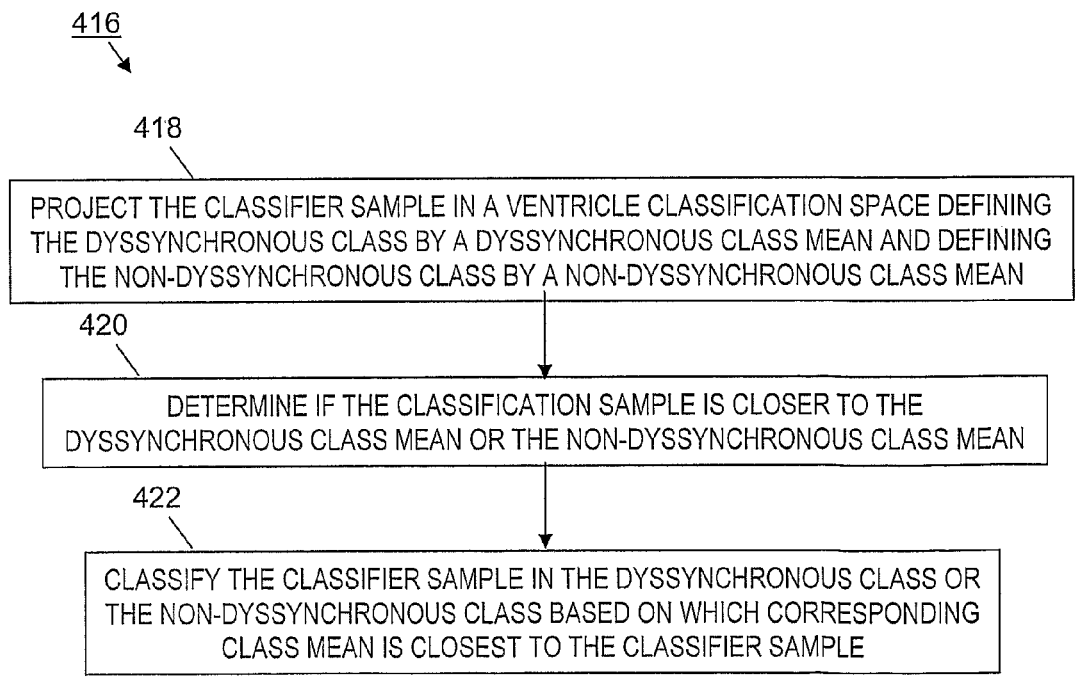
FIG. 25 is a flow chart showing an exemplary embodiment of a process for classifying a classifier sample in a dyssynchronous class or a non-dyssynchronous class in relation to the method of FIGS. 23 and 24.

With reference to FIG. 25, an exemplary embodiment of a process 416 for classifying the classifier sample in a dyssynchronous class or a non-dyssynchronous class in relation to the method of FIGS. 23 and 24 begins at 418 where the classifier sample is projected in a ventricle classification space defining the dyssynchronous class by a dyssynchronous class mean and defining the non-dyssynchronous class by a non-dyssynchronous class mean. The classification sample may be represented in dimensions corresponding to dimensions for the ventricle classification space. Next, the process may determine if the classification sample is closer to the dyssynchronous class mean or the non-dyssynchronous class mean (420). At 422, the classifier sample may be classified in the dyssynchronous class or the non-dyssynchronous class based on which corresponding class mean is closest to the classifier sample. Any of the aspects of FIG. 25 described above may be automated, semi-automated, or manual and may be implemented through hardware, software, firmware, or combinations thereof.

Figure 26:
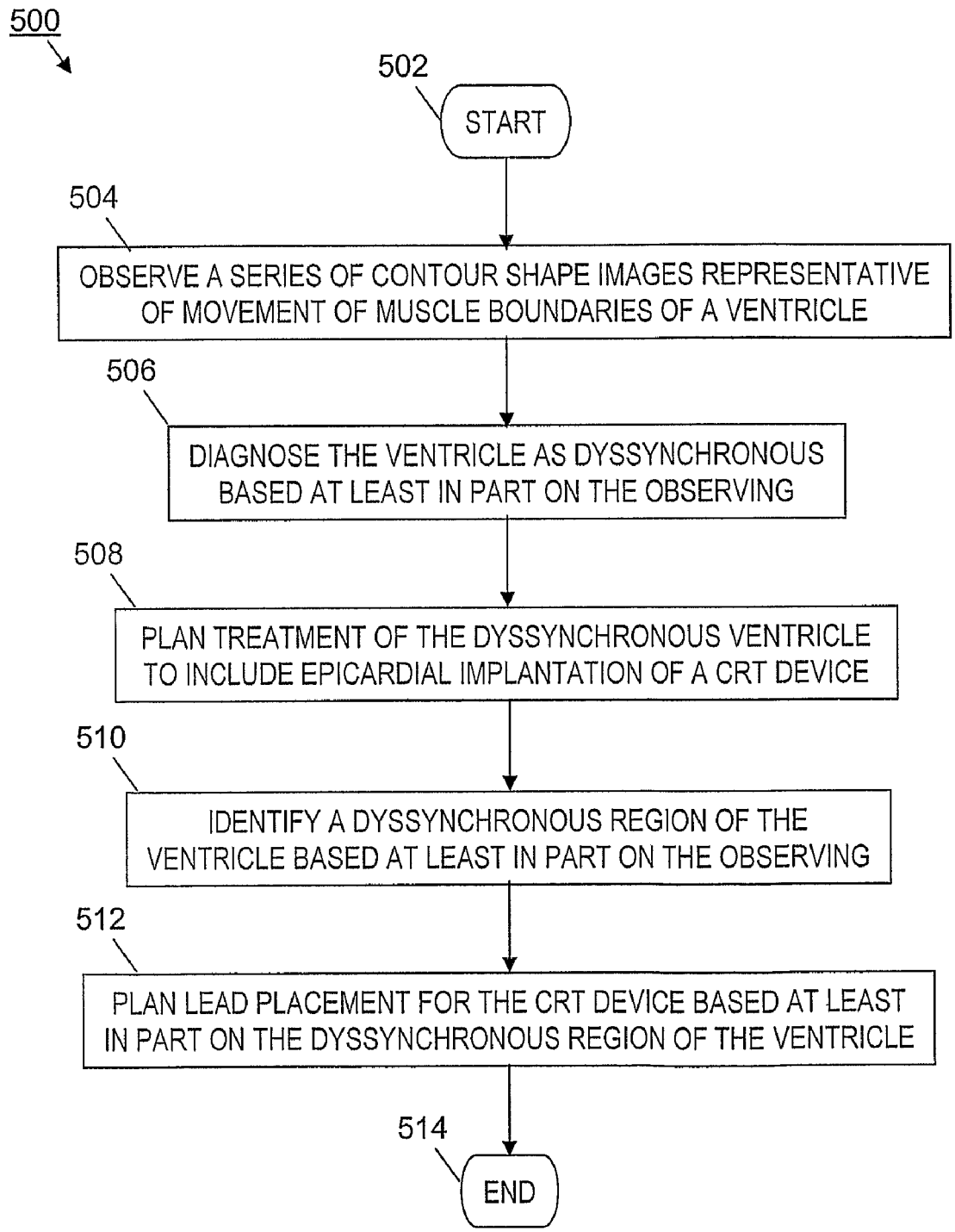
FIG. 26 is a flow chart showing yet another exemplary embodiment of a method of detecting intraventricular dyssynchrony.

With reference to FIG. 26, another exemplary embodiment of a method 500 of detecting intraventricular dyssynchrony begins at 502 where the process starts. Next, a series of contour shape images representative of movement of muscle boundaries of a ventricle of a beating heart over at least one cardiac cycle may be observed (504). The series of contour shape images being previously classified in a dyssynchronous class, for example, by an image classifier process which classifies such images between a dyssynchronous class and a non-dyssynchronous class based on certain criteria. At 506, the ventricle may be diagnosed as dyssynchronous based at least in part on the observing. Next, treatment of the dyssynchronous ventricle may be planned, including epicardial implantation of a CRT device (508). At 510, a dyssynchronous region of the ventricle may be identified based at least in part on the observing. Next, lead placement for the CRT device may be planned based at least in part on the dyssynchronous region of the ventricle.

In one embodiment, the dyssynchronous region of the ventricle may include at least one of an anteroseptal region, an inferoseptal region, an anterior region, an anterolateral region, an inferolateral region, and an inferior region. In another embodiment, the identifying in 510 may be based at least in part on identifying a cardiac segment associated with the dyssynchronous region thickening late in relation to overall myocardial thickening. Any of the aspects of FIG. 26 described above may be automated, semi-automated, or manual and may be implemented through hardware, software, firmware, or combinations thereof.

Figure 27:
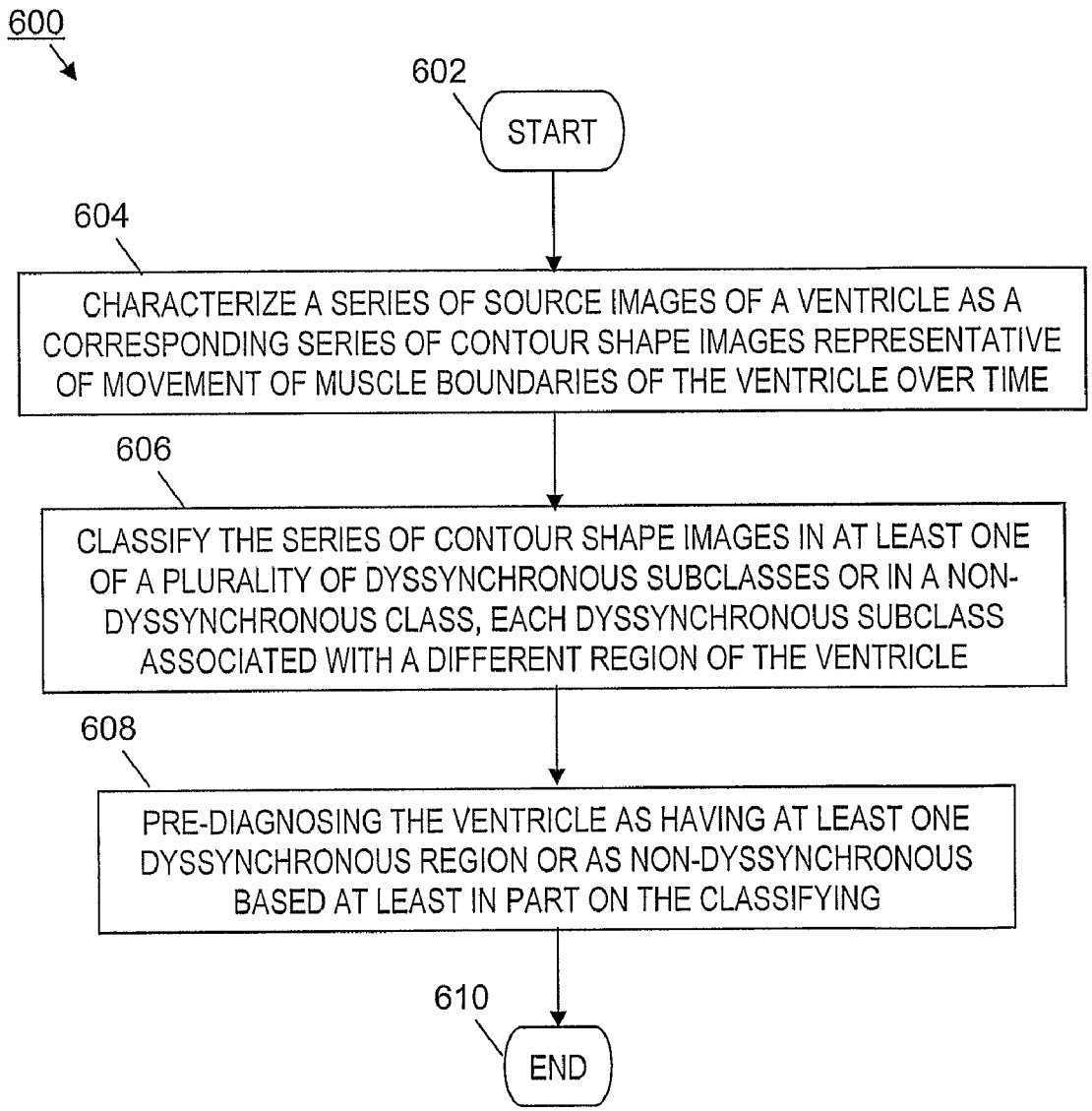
FIG. 27 is a flow chart showing still another exemplary embodiment of a method of detecting intraventricular dyssynchrony.

With reference to FIG. 27, another exemplary embodiment of a method 600 of detecting intraventricular dyssynchrony begins at 602 where the process starts. Next, a series of source images of a ventricle of a beating heart over at least one cardiac cycle may be characterized as a corresponding series of contour shape images representative of movement of muscle boundaries of the ventricle over time (604). At 606, the series of contour shape images may be classified in at least one of a plurality of dyssynchronous subclasses or in a non-dyssynchronous class. Each dyssynchronous subclass may be associated with a different region of the ventricle. Next, the ventricle may be pre-diagnosed as having at least one dyssynchronous region or as non-dyssynchronous based at least in part on the classifying. At 610, the process 600 has reached its end. Any of the aspects of FIG. 27 described above may be automated, semi-automated, or manual and may be implemented through hardware, software, firmware, or combinations thereof.

Figure 28:
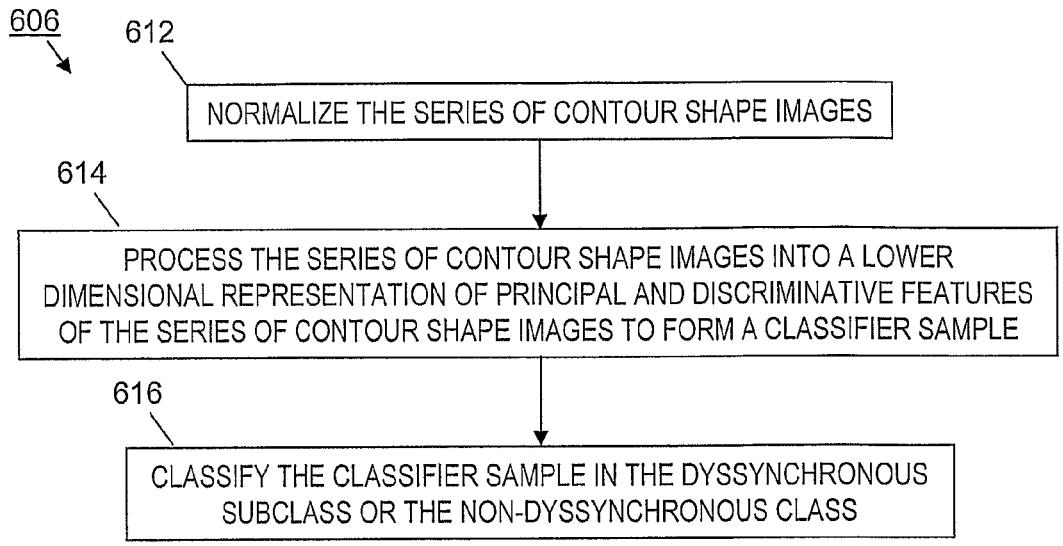
FIG. 28 is a flow chart showing an exemplary embodiment of a process for classifying a series of contour shape images in a dyssynchronous subclass or a non-dyssynchronous class in relation to the method of FIG. 27.

With reference to FIG. 28, an exemplary embodiment of a process 606 for classifying the series of contour shape images in at least one dyssynchronous subclass or a non-dyssynchronous class in relation to the method of FIG. 27 begins at 612 where the series of contour shape images may be normalized. Next, the series of contour shape images may be processed into a lower dimensional representation of principal and discriminative features of the series of contour shape images to form a classifier sample (614). At 616, the classifier sample may be classified in at least one dyssynchronous subclass or the non-dyssynchronous class. Any of the aspects of FIG. 28 described above may be automated, semi-automated, or manual and may be implemented through hardware, software, firmware, or combinations thereof.

Figure 29:
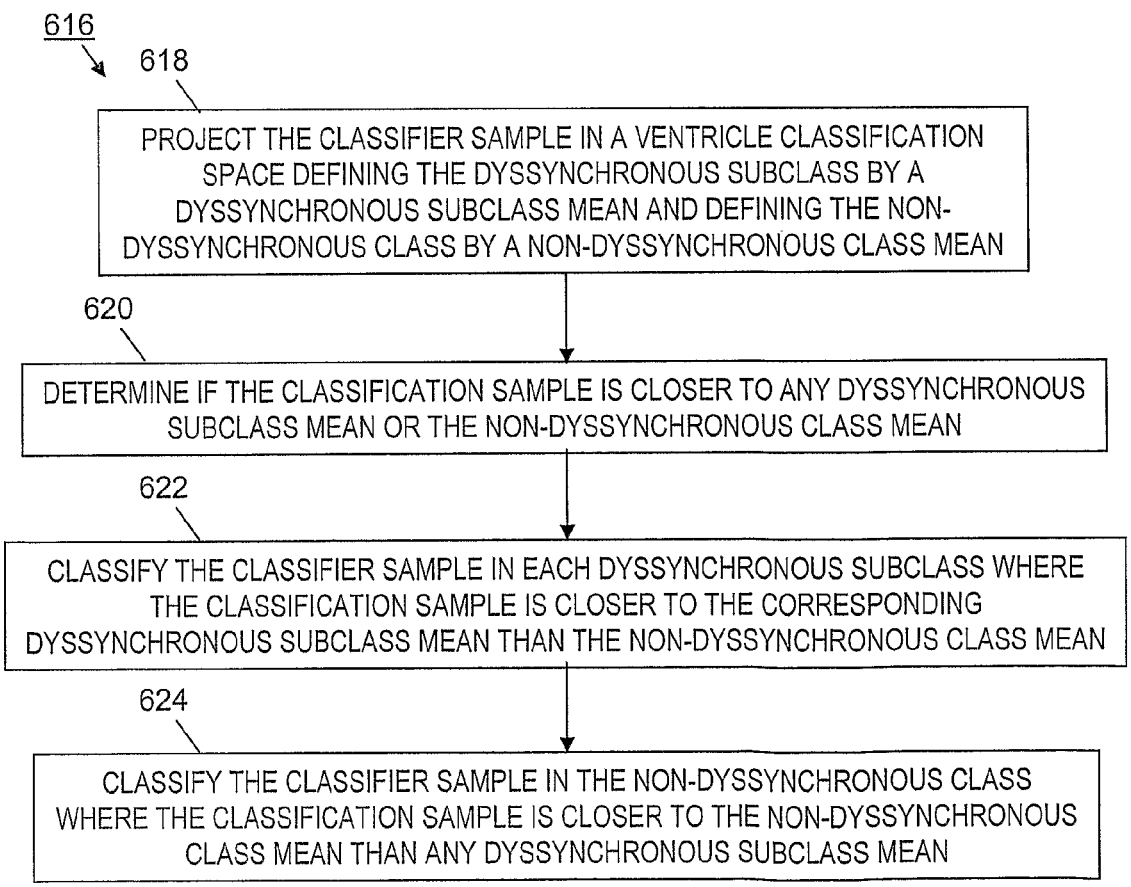
FIG. 29 is a flow chart showing an exemplary embodiment of a process for classifying a classifier sample in a dyssynchronous subclass or a non-dyssynchronous class in relation to the method of FIGS. 27 and 28.

With reference to FIG. 29, an exemplary embodiment of a process 616 for classifying the classifier sample in at least one dyssynchronous subclass or a non-dyssynchronous class in relation to the method of FIGS. 27 and 28 begins at 618 where the classifier sample is projected in a ventricle classification space defining each dyssynchronous subclass by a dyssynchronous subclass mean and defining the non-dyssynchronous class by a non-dyssynchronous class mean. The classification sample may be represented in dimensions corresponding to dimensions for the ventricle classification space. Next, the process may determine if the classification sample is closer to any dyssynchronous subclass means or the non-dyssynchronous class mean (620). At 622, the classifier sample may be classified in each dyssynchronous subclass if the classification sample is closer to the corresponding dyssynchronous subclass mean than the non-dyssynchronous class mean. Alternatively, the classifier sample may be classified in the non-dyssynchronous class if the classification sample is closer to the non-dyssynchronous class mean than any dyssynchronous subclass mean (624). Any of the aspects of FIG. 29 described above may be automated, semi-automated, or manual and may be implemented through hardware, software, firmware, or combinations thereof.

Figure 30:
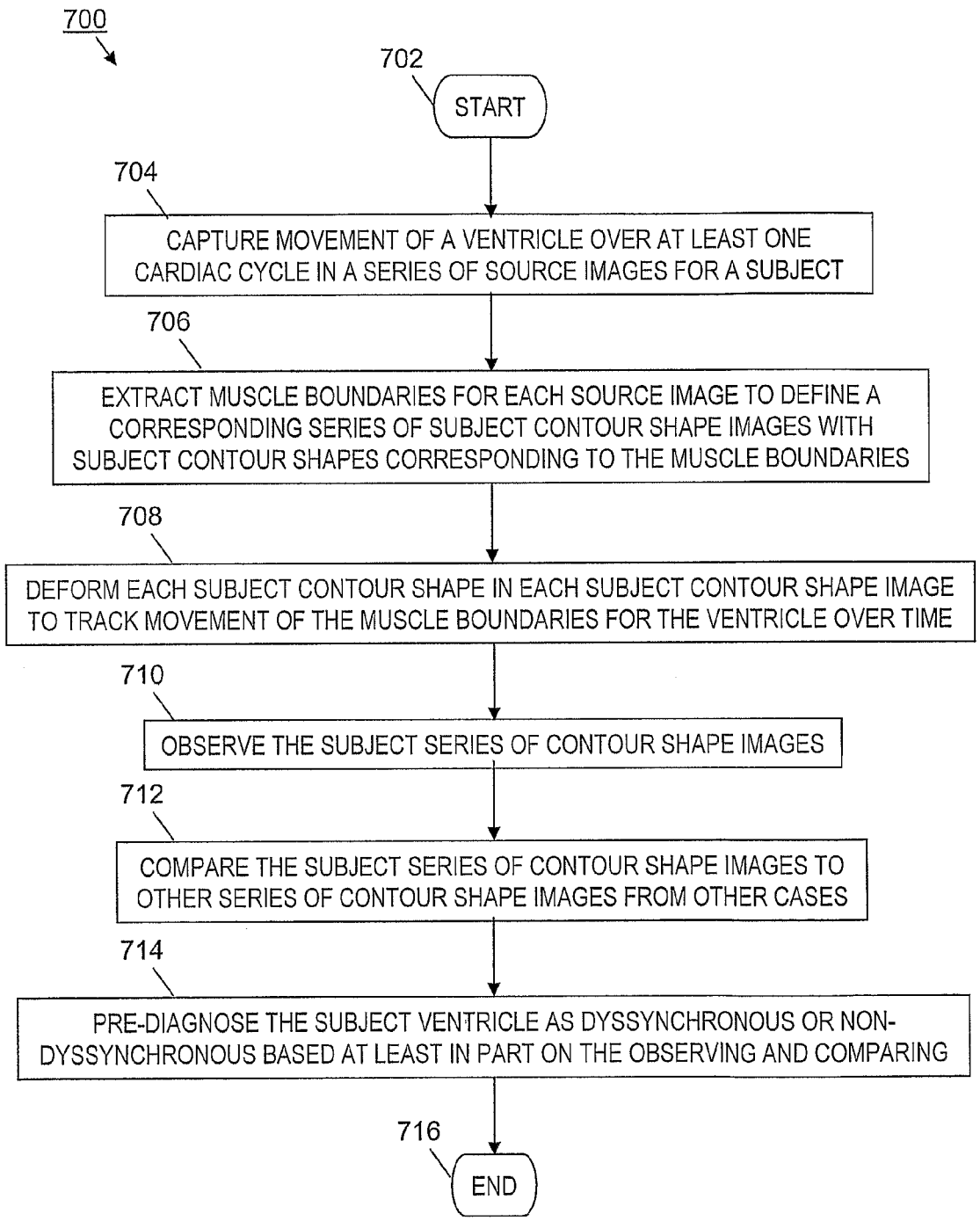
FIG. 30 is a flow chart showing still yet another exemplary embodiment of a method of detecting intraventricular dyssynchrony.

With reference to FIG. 30, another exemplary embodiment of a method 700 of detecting intraventricular dyssynchrony begins at 702 where the process starts. movement of a ventricle of a beating heart over at least one cardiac cycle may be captured in a series of source images for a subject. Next, muscle boundaries may be extracted for each source image of the series of source images to define a corresponding series of subject contour shape images with subject contour shapes corresponding to the muscle boundaries (704). At 706, each subject contour shape in each subject contour shape image may be deformed to track movement of the muscle boundaries for the ventricle over time in the subject series of contour shape images. Next, the subject series of contour shape images may be observed (708). At 710, the subject series of contour shape images may be compared to other series of contour shape images from other cases. Next, the subject ventricle may be pre-diagnosed as dyssynchronous or non-dyssynchronous based at least in part on the observing and comparing.

In another embodiment, the process 700 may be used in conjunction with teaching diagnosis of intraventricular dyssynchrony. In still another embodiment, the process 700 may be used as a diagnostic aid by a practitioner having limited experience in diagnosis of intraventricular dyssynchrony. In yet another embodiment, the process may be used as a diagnostic aid by a more general practitioner to determine whether or not referral to a specialist is advisable.

In still yet another embodiment, at least the extracting in 706 and the deforming in 708 may be performed at a different location than the capturing in 704. In this embodiment, the process may further include communicating the series of source images for the subject from a remote location to a central location via a communication network. In one embodiment, the communication network may include the Internet. In another embodiment, the process may further include communicating the subject series of contour shape images and the other series of contour shape images from the central location to the remote location via the communication network. Any of the aspects of FIG. 30 described above may be automated, semi-automated, or manual and may be implemented through hardware, software, firmware, or combinations thereof.

In still another embodiment, a method for monitoring an internal area of a subject may include: a) receiving initialization information from an observer viewing a first source image of a series of source images of the internal area over a predetermined time to define a plurality of points associated with boundaries within the internal area, b) extracting boundaries for each source image of the series of source images to define a corresponding series of contour shape images with contour shapes corresponding to the boundaries using a Fourier descriptor model, and c) deforming each contour shape in each contour shape image based at least in part on image forces, external forces, and internal forces to track movement of the boundaries within the internal area over time in the series of contour shape images.

While the invention is described herein in conjunction with one or more exemplary embodiments, it is evident that many alternatives, modifications, and variations will be apparent to those skilled in the art. For example, the method and apparatus for detecting intraventricular dyssynchrony may be used in conjunction with a variety of medical imaging modalities. Accordingly, exemplary embodiments in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof. Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112, ¶6.

The invention claimed is:

1. A method of detecting intraventricular dyssynchrony for a ventricle of a beating heart, the method including:
   a) receiving initialization information from an observer viewing a first source image of a sequence of source images of a ventricle of a beating heart over at least one complete cardiac cycle to define a single vector constructed by concatenating Fourier shape descriptors extracted from a plurality of points associated with muscle boundaries of the ventricle over time;
   b) extracting muscle boundaries for each source image of the sequence of source images to define a corresponding spatio-temporal characterization of a complete source image sequence with contour shapes corresponding to the muscle boundaries using a Fourier descriptor model; and
   c) deforming the single vector of Fourier shape descriptors representing each contour shape in the complete source image sequence based at least in part on image forces, external forces, and internal forces to track movement of the muscle boundaries for the ventricle over time in the complete source image sequence.

2. The method of claim 1 wherein the initialization information includes at least four points.

3. The method of claim 1 wherein the first source image corresponds to the end of diastole for the cardiac cycle.

4. The method of claim 1 wherein the muscle boundaries include an endocardial wall and an epicardial wall.

5. The method of claim 1 wherein the set of source images include short-axis cine magnetic resonance images.

6. The method of claim 1 wherein the Fourier descriptor model includes:

$$s(t) = x(t) + jy(t) = \sum_{k=-N}^{N} S_k e^{jkt}, \text{ with } j = \sqrt{-1},$$

where each complex number $S_k = a_k + jb_k$, with $a_k, b_k \in R$, is treated as a rotating phasor with magnitude $|S_k| = \sqrt{a_k^2 + b_k^2}$ and phase angle $$\phi_k = \tan^{-1}\left(\frac{b_k}{a_k}\right).$$

where: $x(t)$ and $y(t)$ are projections, with $t \in [0, 2\pi]$; and $a_k$ and $b_k$ are real numbers.

7. The method of claim 6 wherein each pair of descriptors $S_k$ and $S_{-k}$ describes an ellipse.

8. The method of claim 1 wherein the image forces include edge-based forces and texture-based forces.

9. The method of claim 8 wherein the edge-based forces have a limited zone of attraction.

10. The method of claim 1, the deforming in c) associated with image forces further including;
    d) defining edges of the contour shapes in the complete contour shape image sequence using an optimal zero crossing operator model to determine edge-strength vectors and gradient vectors for associated pixels of the contour shape images;
    e) deforming edges of the contour shapes in the complete contour shape sequence using an averaging mask in conjunction with a range of pixels along, the edges defined by the optimal zero crossing operator model;
    f) determining a length of the contour shapes in the complete contour shape sequence using an approximation model; and
    g) determining edge-based image forces for the contour shapes the complete contour shape sequence based at least in part on the determined length for the corresponding contour shape.

11. The method of claim 10 wherein the approximation model includes:

$$L^2 = 4\pi^2 \sum_{k=-N}^{N} k^2 |S_k|^2 = 4\pi^2 \sum_{k=-N}^{N} k^2 (a_k^2 + b_k^2),$$

where: L is the length of the contour shape; and
each complex number $S_k = a_k + jb_k$, with $a_k, b_k \in R$, is treated as a rotating phasor with magnitude $|S_k| = \sqrt{a_k^2 + b_k^2}$.

12. The method of claim 1, the deforming in c) further including:
   d) sampling pixels values for the contour shapes in each contour shape image along a normal direction and at selected locations along a length of the corresponding contour shape to determine texture vectors associated with pixels of the contour shape images.

13. The method of claim 12 wherein the sampling in d) includes sampling pixel values for the contour shapes using:

$$s\perp(t) = \begin{bmatrix} u(t) \\ v(t) \end{bmatrix} = \sum_{k=-N}^{N} k \begin{bmatrix} a_k & -b_k \\ b_k & a_k \end{bmatrix} \begin{bmatrix} \cos kt \\ \sin kt \end{bmatrix} \text{ at locations } t_i \in [0, 2\pi],$$

where $1 \leq i \leq L_0$ and $L_0$ represents the length of the corresponding contour shape, to determine the texture vectors, and where $a_k$ and $b_k$ are real numbers.

14. The method of claim 1 wherein the extracting in b) for the first source image is based at least in part on the initialization information.

15. The method of claim 14 wherein the extracting in b) for each subsequent source image is based at least in part on the previous contour shape image.

16. The method of claim 1, the deforming in c) associated with external forces further including:
   d) normalizing the scale of each Fourier descriptor associated with the Fourier descriptor model; and
   e) determining external forces for each contour shape image to limit contour shape variations in consecutive contour shape images based at least in part on a predetermined value for a variance parameter.

17. The method of claim 16 wherein the scale-normalizing for each Fourier descriptor includes:

$$\frac{S_k}{|S_1|}.$$

where: $S_k$ represents components of shape descriptors: and $|S_1|$ represents a magnitude of the largest of the components of the shape descriptors.

18. The method of claim 1, the deforming in c) associated with internal forces further including:
   d) determining a length of the contour shapes in the complete image sequence using an approximation model; and
   e) determining internal tension forces to minimize contour shape length and avoid self-crossings as contour shapes are deformed.

19. The method of claim 18 wherein the internal tension forces are weaker than the image forces.

20. The method of claim 18 wherein the approximation model includes:

$$L^2 = 4\pi^2 \sum_{k=-N}^{N} k^2 |S_k|^2 = 4\pi^2 \sum_{k=-N}^{N} k^2 (a_k^2 + b_k^2),$$

where: L is the length of the contour shape; and
each complex number $S_k = a_k + jb_k$, with $a_k, b_k \in R$, is treated as a rotating phasor with magnitude $|S_k| = \sqrt{a_k^2 + b_k^2}$.

21. A method of detecting intraventricular dyssynchrony, including:
   a) providing a spatio-temporal characterization of a complete source image sequence of a ventricle of a beating heart over at least one complete cardiac cycle as a single vector constructed by concatenating Fourier shape descriptors extracted from a corresponding sequence of contour shape images representative of movement, of muscle boundaries of the ventricle over time;
   b) classifying the single vector of Fourier shape descriptors representing the complete contour shape image sequence in a dyssynchronous class or a non-dyssynchronous class; and
   c) pre-diagnosing the ventricle as dyssynchronous or non-dyssynchmnous based at least in part on the classifying.

22. The method of claim 21, the classifying in b) further including:
   d) normalizing the complete contour Shape image sequence;
   e) processing the sequence of contour shape images into a lower dimensional representation of principal and discriminative features of the sequence of contour shape images to form a classifier sample; and
   f) classifying the classifier sample in the dyssynchronous class or the non-dyssynchronous class.

23. The method of claim 22, the classifying in f) further including:
   g) projecting the classifier sample in a ventricle classification space defining the dyssynchronous class by a dyssynchronous class mean and defining the non-dyssynchronous class by a non-dyssynchronous class mean, the classification sample being represented in dimensions corresponding to dimensions for the ventricle classification space;
   h) determining if the classification sample is closer to the dyssynchronous class mean or the non-dyssynchronous class mean; and
   i) classifying the classifier sample in the dyssynchronous class or the non-dyssynchronous class based on which corresponding class mean is closest to the classifier sample.

24. A method of detecting intraventricular dyssynchrony, including:
   a) observing a spatio-temporal characterization of a complete source image sequence of movement of muscle boundaries of a ventricle of a beating heart over at least one complete cardiac cycle, wherein the spatio-temporal characterization is provided as a single vector constructed by concatenating Fourier shape descriptors extracted from a corresponding, sequence of contour shape images representative of movement of the muscle boundaries of the ventricle over time, and wherein the single vector of Fourier shape descriptors representing the complete contour shape image sequence are classified in a dyssynchronous class;
   b) diagnosing the ventricle as dyssynchronous based at least in part on the observing;

c) planning treatment of the dyssynchronous ventricle to include epicardial implantation of a cardiac resynchronization therapy device, using a Fourier descriptor model;

d) identifying a dyssynchronous region of the ventricle based at least in part on the observing; and e) planning lead placement for the cardiac resynchronization therapy device based at least in part on the dyssynchronous region of the ventricle.

25. The method of claim 24 wherein the dyssynchronous region of the ventricle includes at least one of an anteroseptal region, an inferoseptal region an anterior region, an anterolateral region, an inferolateral region, and an inferior region.

26. The method of claim 24 wherein the identifying in d) is based at least in part on identifying a cardiac segment associated with the dyssynchronous region thickening late in relation to overall myocardial thickening.

27. A method of detecting intraventricular dyssynchrony, including:
   a) spatially-temporally characterizing a complete source image sequence of a ventricle of a beating heart over at least one complete cardiac cycle as a single vector constructed by concatenating Fourier shape descriptors extracted from a corresponding sequence of contour shape images representative of movement of muscle boundaries Of the ventricle over time;
   b) classifying the single vector of Fourier shape descriptors representing the complete contour shape image sequence in at least one of a plurality of dyssynchronous subclasses or in a non-dyssynchronous class, each dyssynchronous subclass associated with a different region of the ventricle; and
   e) pre-diagnosing the ventricle as having at least one dyssynchronous region or as non-dyssynchronous based at least in part on the classifying.

28. The method of claim 27, the classifying in b) further including:
   d) normalizing the sequence of contour shape images;
   e) processing the sequence of contour shape images into a lower dimensional representation of principal and discriminative features of the sequence of contour shape images to form a classifier sample; and
   f) classifying the classifier sample in at least one dyssynchronous subclass or the non-dyssynchronous class.

29. The method of claim 28, the classifying in f) further including:
   g) projecting the classifier sample in a ventricle classification space defining each dyssynchronous subclass by a corresponding dyssynchronous subclass mean and defining the non-dyssynchronous class by a non-dyssynchronous class mean, the classification sample being represented in dimensions corresponding to dimensions for the ventricle classification space;
   h) determining if the classification sample is closer to any dyssynchronous subclass means or the non-dyssynchronous class mean;
   i) classifying the classifier sample in each dyssynchronous subclass where the classification sample is closer to the corresponding dyssynchronous subclass mean than the non-dyssynchronous class mean; and
   j) classifying the classifier sample in the non-dyssynchronous class where the classification sample is closer to the non-dyssynchronous class mean than any dyssynchronous subclass mean.

30. A method of detecting intraventricular dyssynchrony, including:
   a) capturing movement of a ventricle of a beating heart over at least one complete cardiac cycle over time in a sequence of source images for a subject;
   b) extracting muscle boundaries for each source image of the sequence of source images to define a corresponding spatio-temporal characterization of a complete source image sequence as a single vector constructed by concatenating Fourier shape descriptors extracted from a corresponding sequence of contour shape images representative of movement of the muscle boundaries of the ventricle over time;
   c) deforming the single vector of Fourier shape descriptors representing each subject contour shape in the complete source image sequence to track movement of the muscle boundaries for the ventricle over time in the complete subject source image sequence;
   d) observing the complete subject source image sequence;
   e) comparing the complete subject source image sequence to other complete source image sequences from other cases; and
   f) pre-diagnosing the subject ventricle as dyssynchronous or non-dyssynchronous based at least in part on the observing and comparing.

31. The method of claim 30 wherein the process is used in conjunction with teaching diagnosis of intraventricular dyssynchrony.

32. The method of claim 30 wherein the process is used as a diagnostic aid by a practitioner having limited experience in diagnosis of intraventricular dyssynchrony.

33. The method of claim 30 wherein the process is used as a diagnostic aid by a more general practitioner to determine whether or not referral to a specialist is advisable.

34. The method of claim 30 wherein at least the extracting in b) and the deforming in c) are performed at a different location than the capturing in a), further including:
   g) communicating the sequence of source images for the subject from a remote location to a central location via a communication network.

35. The method of claim 34 wherein the communication network includes the Internet.

36. The method of claim 34, further including:
   h) communicating the subject sequence of contour shape images and the other sequences of contour shape images from the central location to the remote location via the communication network.

37. An apparatus for detecting intraventricular dyssynchrony, including:
   a contour image processor extracting muscle boundaries for each source image of a sequence of source images of a ventricle of a beating heart over at least one complete cardiac cycle to define a single vector constructed by concatenating Fourier shape descriptors from the extracted muscle boundaries corresponding to a spatio-temporal characterization of the complete source image sequence, images and deforming the single vector of Fourier shape descriptors representing each contour shape in the complete source image sequence based at least in part on image forces, external forces, and internal forces to track movement of the muscle boundaries for the ventricle over time in the sequence of contour shape images; and
   an image classifier, in operative communication with the contour image processor, classifying the sequence of contour shape images in a dyssynchronous class or a non-dyssynchronous class.

38. The apparatus of claim 37, farther including:
a source image processor, in operative communication with the contour image processor, receiving initialization information from an observer viewing, a first source image of the sequence of source images to define a plurality of points associated with the muscle boundaries.

39. The apparatus of claim 37 wherein the contour image processor defines edges of the contour shapes in each contour shape image using an optimal zero crossing operator model to determine edge-strength vectors and gradient vectors for associated pixels of the contour shape images, deforms edges of the contour shapes in each contour shape image using an averaging mask in conjunction with a range of pixels along the edges defined by the optimal zero crossing operator model, determines a length of the contour shapes in each contour shape image using an approximation model, and determines edge-based image forces for the contour shapes in each contour shape image based at least in part on the determined length for the corresponding contour shape.

40. The apparatus of claim 37 wherein the contour image processor normalizes the scale of each Fourier descriptor associated with the Fourier descriptor model and determines external forces for each contour shape image to limit contour shape variations in consecutive contour shape images based at least in part on a predetermined value for a variance parameter.

41. The apparatus of claim 37 wherein the contour image processor determines a length of the contour shapes in each contour shape image using an approximation model and determines internal tension forces to minimize contour shape length and avoid self-crossings as contour shapes are deformed.

42. An apparatus for detecting intraventricular dyssynchrony, including:
an image contour processor spatially-temporally characterizing a sequence of source images of a ventricle of a beating heart over at least one complete cardiac cycle as a single vector constructed by concatenating Fourier shape descriptors extracted from a corresponding sequence of contour shape images representative of movement of muscle boundaries of the ventricle over time; and
an image classifier, operative communication with the contour image processor, classifying the concatenated sequence of contour shape images in a dyssynchronous class or a non-dyssynchronous class.

43. The apparatus of claim 42 wherein the image classifier normalizes the sequence of contour shape images, processes the sequence of contour shape images into a lower dimensional representation of principal and discriminative features of the sequence of contour shape images to form a classifier sample, and classifies the classifier sample in the dyssynchronous class or the non-dyssynchronous class.

44. The apparatus of claim 43 wherein the image classifier projects the classifier sample in a ventricle classification space defining the dyssynchronous class by a dyssynchronous class mean and defining the non-dyssynchronous class by a non-dyssynchronous class mean, the classification sample being represented in dimensions corresponding to dimensions for the ventricle classification space, determines if the classification sample is closer to the dyssynchronous class mean or the non-dyssynchronous class mean, and classifies the classifier sample in the dyssynchronous class or the non-dyssynchronous class based on which corresponding class mean is closest to the classifier sample.

45. An apparatus for detecting intraventricular dyssynchrony, including:
a contour image processor spatially-temporally characterizing a complete source image sequence of a ventricle of a beating heart over at least one complete cardiac cycle as a single vector constructed by concatenating Fourier shape descriptors extracted from a corresponding sequence of contour shape images representative of movement of muscle boundaries of the ventricle over time; and
an image classifier classifying the concatenated contour shape images in at least one of a plurality of dyssynchronous subclasses or in a non-dyssynchronous class, each dyssynchronous subclass associated with a different region of the ventricle.

46. The apparatus of claim 45 wherein the contour image processor normalizes the sequence of contour shape images, processes the sequence of contour shape images into a lower dimensional representation of principal and discriminative features of the sequence of contour shape images to form a classifier sample.

47. The apparatus of claim 46 wherein the image classifier classifies the classifier sample in at least one dyssynchronous subclass or the non-dyssynchronous class.

48. The apparatus of claim 45 wherein the image classifier projects the classifier sample in a ventricle classification space defining each dyssynchronous subclass by a corresponding dyssynchronous subclass mean and defining the non-dyssynchronous class by a non-dyssynchronous class mean, the classification sample being represented in dimensions corresponding to dimensions for the ventricle classification space, determines if the classification sample is closer to any dyssynchronous subclass means or the non-dyssynchronous class mean, classifies the classifier sample in each dyssynchronous subclass where the classification sample is closer to the corresponding dyssynchronous subclass mean than the non-dyssynchronous class mean, and classifies the classifier sample in the non-dyssynchronous class where the classification sample is closer to the non-dyssynchronous class mean than any dyssynchronous subclass mean.

49. A method for monitoring an internal area of a subject, including:
a) receiving initialization information from an observer viewing a first source image of a sequence of source images of the internal area over a predetermined time to define a single vector constructed by concatenating Fourier shape descriptors extracted from a plurality of points associated with boundaries within the internal area;
b) extracting boundaries for each source image of the sequence of source images to define a corresponding spatio-temporal characterization of a complete source image sequence with contour shapes corresponding to the boundaries using a Fourier descriptor model; and
c) deforming the single vector of Fourier shape descriptors representing each contour shape in the complete source image sequence based at least in part on image forces, external forces, and internal forces to track movement of the boundaries within the internal area over time in the complete source image sequence.

50. An apparatus for monitoring an internal area of a subject, including:
a contour image processor extracting boundaries for each source image of a sequence of source images of the internal area over a predetermined time to define a single vector constructed by concatenating Fourier shape descriptors from the extracted muscle boundaries corresponding to a spatio-temporal characterization of the complete source image sequence, images and deforming the single vector of Fourier shape descriptors representing each contour shape in the complete source image sequence based at least in part on image forces, external forces, and internal forces to track movement of the boundaries within the internal area over time in the sequence of contour shape images; and an image classifier, in operative communication with the contour image processor, classifying the sequence of contour shape images in a first class or a second class based at least in part on detection of predetermined discriminating characteristics for the first and second classes in the contour shape images.

\* \* \* \* \*